US010985690B2

(12) United States Patent
Au

(10) Patent No.: US 10,985,690 B2
(45) Date of Patent: *Apr. 20, 2021

(54) CLAMP ASSEMBLY FOR SOLAR TRACKER

(71) Applicant: NEXTracker Inc., Fremont, CA (US)

(72) Inventor: Alexander W. Au, El Cerrito, CA (US)

(73) Assignee: NEXTRACKER INC., Fremont, CA (US)

(*) Notice: Subject to any disclaimer, the term of this patent is extended or adjusted under 35 U.S.C. 154(b) by 150 days.

This patent is subject to a terminal disclaimer.

(21) Appl. No.: 15/974,553

(22) Filed: May 8, 2018

(65) Prior Publication Data

US 2019/0131920 A1    May 2, 2019

Related U.S. Application Data

(63) Continuation of application No. 14/489,416, filed on Sep. 17, 2014, now Pat. No. 10,008,975, which is a
(Continued)

(51) Int. Cl.
*A47F 5/00* (2006.01)
*H02S 20/32* (2014.01)
(Continued)

(52) U.S. Cl.
CPC ............... *H02S 20/32* (2014.12); *F16L 3/02* (2013.01); *F16M 13/022* (2013.01); *F24S 25/10* (2018.05);
(Continued)

(58) Field of Classification Search
CPC ....... F16L 3/02; F24J 2002/5489; F24J 2/541; F16M 13/022; H02S 20/32; H02S 40/34;
(Continued)

(56) References Cited

U.S. PATENT DOCUMENTS

| 1,683,266 A | 9/1928 | Shipman |
| 2,156,965 A | 5/1939 | Borden |

(Continued)

FOREIGN PATENT DOCUMENTS

| KR | 10-2008-0108640 A | 12/2008 |
| KR | 10-0896332 B1 | 5/2009 |
| WO | WO 2012/076949 A1 | 6/2012 |

OTHER PUBLICATIONS

International Search Report and Written Opinion for PCT/US2013/073948, filed Dec. 9, 2013.
(Continued)

*Primary Examiner* — Todd M Epps
(74) *Attorney, Agent, or Firm* — Weber Rosselli & Cannon LLP

(57) ABSTRACT

In an example, the solar tracker has a clamp assembly that is configured to pivot a torque tube. In an example, the assembly has a support structure configured as a frame having configured by a first anchoring region and a second anchoring region. In an example, the support structure is configured from a thickness of metal material. In an example, the support structure is configured in an upright manner, and has a major plane region. In an example, the assembly has a pivot device configured on the support structure and a torque tube suspending on the pivot device and aligned within an opening of the support and configured to be normal to the plane region. In an example, the torque tube is configured on the pivot device to move about an arc in a first direction or in a second direction such that the first direction is in a direction opposite to the second direction.

14 Claims, 65 Drawing Sheets

Related U.S. Application Data continuation-in-part of application No. 14/101,273, filed on Dec. 9, 2013, now Pat. No. 9,905,717.

(60) Provisional application No. 61/735,537, filed on Dec. 10, 2012.

(51) Int. Cl.
*H02S 20/00* (2014.01)
*F16L 3/02* (2006.01)
*F16M 13/02* (2006.01)
*F24S 25/70* (2018.01)
*F24S 30/425* (2018.01)
*F24S 25/10* (2018.01)
*F24S 30/00* (2018.01)

(52) U.S. Cl.
CPC ............. *F24S 25/70* (2018.05); *F24S 30/425* (2018.05); *H02S 20/00* (2013.01); *F24S 2030/15* (2018.05); *F24S 2030/17* (2018.05); *Y02E 10/47* (2013.01); *Y02E 10/50* (2013.01); *Y10T 29/49826* (2015.01); *Y10T 29/49947* (2015.01)

(58) Field of Classification Search
CPC . H02S 40/32; H01L 31/0422; H01L 31/0522; H01L 31/051; F24S 25/70; F24S 30/425
USPC ........................ 248/122.1; 136/246; 211/1.52
See application file for complete search history.

(56) References Cited

U.S. PATENT DOCUMENTS

| | | | |
|---|---|---|---|
| 2,164,022 A | 6/1939 | Rowe | |
| 2,894,773 A | 7/1959 | Noe | |
| 3,935,987 A | 2/1976 | Foster et al. | |
| 4,023,368 A | 5/1977 | Kelly | |
| 4,061,130 A | 12/1977 | Gonzalez | |
| 4,135,493 A | 1/1979 | Kennedy | |
| 4,158,356 A | 6/1979 | Wininger | |
| 4,192,583 A | 3/1980 | Horton | |
| 4,205,657 A | 6/1980 | Kelly | |
| 4,226,502 A | 10/1980 | Gunzler | |
| 4,276,872 A | 7/1981 | Blake et al. | |
| 4,340,812 A | 7/1982 | Mori | |
| 4,372,017 A | 2/1983 | Heckethorn | |
| 4,429,952 A | 2/1984 | Dominguez | |
| 4,602,811 A | 7/1986 | Heckethorn et al. | |
| 4,704,038 A | 11/1987 | Bruchon, Jr. | |
| 4,815,585 A | 3/1989 | May | |
| 4,890,599 A | 1/1990 | Eiden | |
| 5,092,939 A | 3/1992 | Nath et al. | |
| 5,181,762 A | 1/1993 | Beumer | |
| 5,274,888 A * | 1/1994 | Payne | F16L 3/02 24/277 |
| D361,561 S | 8/1995 | Baudot | |
| 6,106,065 A | 8/2000 | Carroll | |
| 6,269,596 B1 | 8/2001 | Ohtsuka et al. | |
| 6,431,502 B1 | 8/2002 | Goodman | |
| 6,561,473 B1 | 5/2003 | Ianello | |
| D547,262 S | 7/2007 | Ullman | |
| D564,958 S | 3/2008 | Almy et al. | |
| 7,531,741 B1 | 5/2009 | Melton et al. | |
| D606,938 S | 12/2009 | Mack | |
| 7,647,924 B2 | 1/2010 | Hayden | |
| D651,969 S | 1/2012 | Turk et al. | |
| D651,970 S | 1/2012 | Turk et al. | |
| 8,419,130 B2 | 4/2013 | Bergman | |
| 8,459,249 B2 | 6/2013 | Corio | |
| D689,434 S | 9/2013 | Tilscher | |
| 8,671,930 B2 | 3/2014 | Liao | |
| 8,727,288 B2 * | 5/2014 | Ruiz | H02G 3/30 248/65 |
| D713,784 S | 9/2014 | Wildes | |
| 8,839,573 B2 | 9/2014 | Cusson et al. | |
| 8,939,648 B2 * | 1/2015 | Schneider | F16M 11/18 384/428 |
| 9,303,684 B2 * | 4/2016 | Clavijo Lumbreras | F24S 30/425 |
| 9,347,691 B2 | 5/2016 | West et al. | |
| D758,834 S | 6/2016 | Tally | |
| 9,413,287 B2 * | 8/2016 | Hartelius | F24S 25/13 |
| 9,466,749 B1 * | 10/2016 | Au | F24S 25/33 |
| 10,008,975 B2 * | 6/2018 | Au | F24S 25/10 |
| 10,222,446 B2 | 3/2019 | Au | |
| 2002/0078945 A1 | 6/2002 | Funger et al. | |
| 2002/0179138 A1 | 12/2002 | Lawheed | |
| 2003/0034029 A1 | 2/2003 | Shingleton | |
| 2003/0070368 A1 | 4/2003 | Shingleton | |
| 2003/0226412 A1 | 12/2003 | Rumminger et al. | |
| 2005/0284467 A1 | 12/2005 | Patterson | |
| 2006/0086382 A1 | 4/2006 | Plaisted | |
| 2007/0144575 A1 | 6/2007 | Mascolo et al. | |
| 2007/0176059 A1 * | 8/2007 | Roscetti | F16B 2/065 248/122.1 |
| 2008/0040990 A1 | 2/2008 | Vendig et al. | |
| 2008/0168981 A1 | 7/2008 | Cummings et al. | |
| 2008/0230047 A1 | 9/2008 | Shugar et al. | |
| 2008/0308091 A1 | 12/2008 | Corio | |
| 2009/0025708 A1 | 1/2009 | Shingleton | |
| 2009/0032014 A1 | 2/2009 | Meydbray | |
| 2009/0159778 A1 * | 6/2009 | Yeh | H02S 20/00 250/203.4 |
| 2010/0101632 A1 | 4/2010 | Kats et al. | |
| 2010/0147286 A1 | 6/2010 | Xiang et al. | |
| 2010/0212714 A1 | 8/2010 | Rothschild et al. | |
| 2010/0263297 A1 | 10/2010 | Liebendorfer | |
| 2011/0023940 A1 | 2/2011 | Do et al. | |
| 2011/0041834 A1 | 2/2011 | Liao | |
| 2011/0073104 A1 | 3/2011 | Dopp et al. | |
| 2011/0132353 A1 | 6/2011 | Gumm et al. | |
| 2011/0278411 A1 | 11/2011 | Carbonare et al. | |
| 2012/0006386 A1 | 1/2012 | Klinga et al. | |
| 2012/0073565 A1 | 3/2012 | Grant et al. | |
| 2012/0091077 A1 | 4/2012 | Zuritis | |
| 2012/0180845 A1 | 7/2012 | Cole et al. | |
| 2013/0269752 A1 * | 10/2013 | Corio | H02S 20/00 136/246 |
| 2013/0269753 A1 * | 10/2013 | Corio | F24S 25/10 136/246 |
| 2014/0048124 A1 | 2/2014 | Park et al. | |
| 2014/0130847 A1 | 5/2014 | West et al. | |
| 2014/0216522 A1 * | 8/2014 | Au | F24S 25/70 136/246 |
| 2015/0000721 A1 * | 1/2015 | Au | H02S 20/32 136/246 |
| 2015/0000722 A1 * | 1/2015 | Au | F24S 25/65 136/246 |
| 2015/0092383 A1 | 4/2015 | Corio et al. | |
| 2015/0236636 A1 * | 8/2015 | Sade | H02S 30/10 136/246 |
| 2019/0036478 A1 * | 1/2019 | Liu | H02S 40/34 |

OTHER PUBLICATIONS

Office Action from Chinese Patent Office for Application No. 201380072577.7 dated Aug. 23, 2017.
U.S. Office Action issued in U.S. Appl. No. 15/694,647 dated Dec. 26, 2019, 18 pages.
India Office Action for application No. 4839/DELNP/2015 dated May 25, 2018, 6 pages.
Non-Final Office Action issued in U.S. Appl. No. 15/890,934 dated Apr. 25, 2019.
Notice of Allowance issued in U.S. Appl. No. 16/234,723 dated Jun. 5, 2019, 22 pages.
U.S. Office Action issued in U.S. Appl. No. 15/694,647 dated Jun. 25, 2019, 31 pages.
Advisory Action issued in U.S. Appl. No. 15/948,960 dated Sep. 12, 2019, 5 pages.
Non Final Office Action issued in U.S. Appl. No. 15/640,322 dated Sep. 25, 2019, 36 pages.

(56) References Cited

OTHER PUBLICATIONS

Office Action from Japanese Patent Office for Application No. 2015-545918 dated Jun. 9, 2017.
U.S. Office Action issued in U.S. Appl. No. 15/890,934 dated Jun. 29, 2020, 22 pages.
US Office Action issued in U.S. Appl. No. 15/948,960 dated Jun. 16, 2020.
U.S. Office Action issued in U.S. Appl. No. 15/694,647 dated Jul. 20, 2020, 19 pages.
U.S. Final Office Action issued in U.S. Appl. No. 15/640,322 dated Mar. 23, 2020, 23 pages.

* cited by examiner

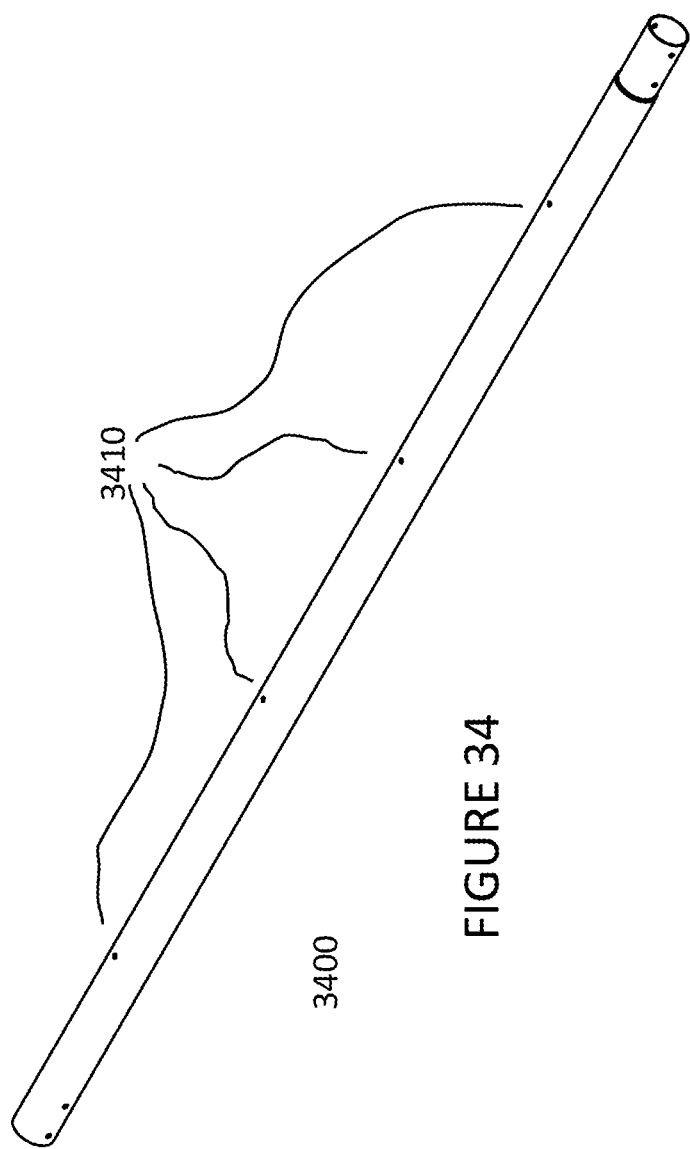
FIGURE 34
FIGURE 35

3900

3900

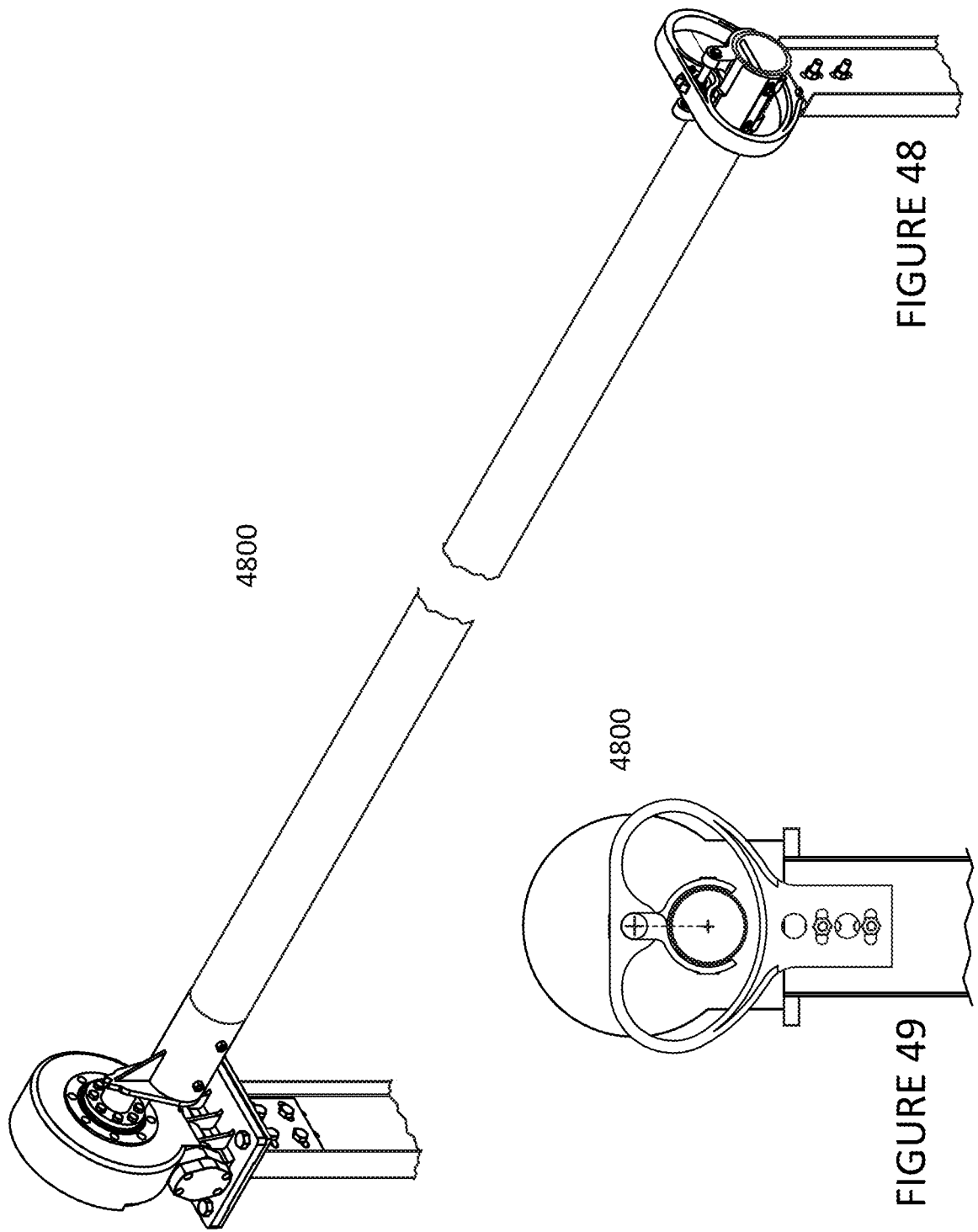

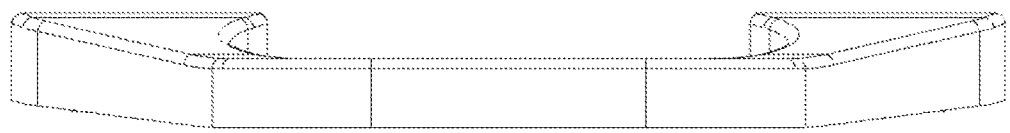
5420
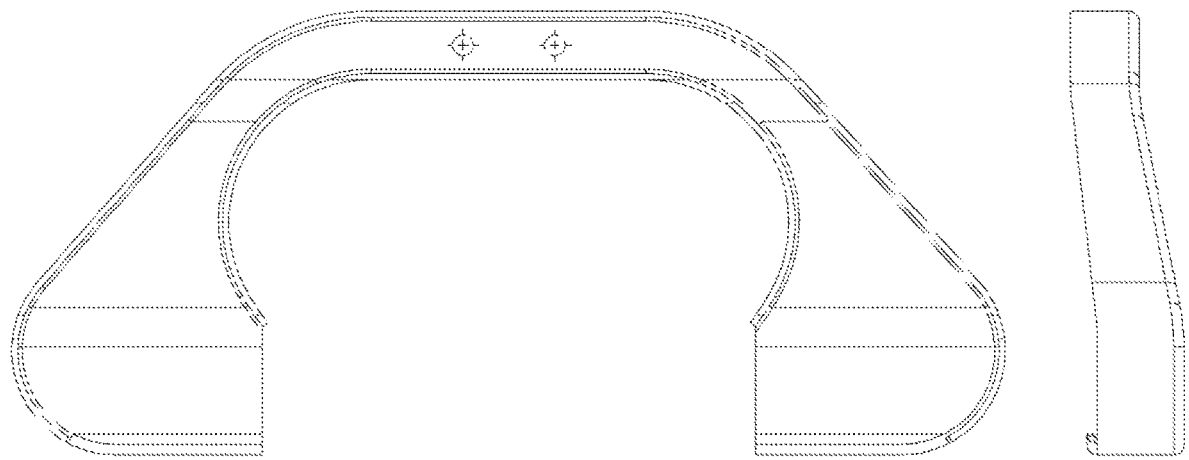
FIGURE 57

6200

6200

6210

6210

6210

6210

6900

7000

7100

CLAMP ASSEMBLY FOR SOLAR TRACKER

CROSS-REFERENCE TO RELATED APPLICATIONS

The present invention is a continuation of and claims priority to U.S. application Ser. No. 14/489,416 filed Sep. 17, 2014, which is a continuation in part of U.S. Ser. No. 14/101,273 filed Dec. 9, 2013 (now U.S. Pat. No. 9,905,717 issued Feb. 27, 2018), which claims priority U.S. Provisional Application No. 61/735,537 filed Dec. 10, 2012, each of which is incorporated by reference herein for all purposes. The present application also incorporates by reference, for all purposes, the following concurrently filed patent applications, all commonly owned: U.S. application Ser. No. 14/489,409 (entitled OFF-SET DRIVE ASSEMBLY FOR SOLAR TRACKER), filed Sep. 17, 2014 (now U.S. Pat. No. 9,766,319 issued Sep. 19, 2017), and U.S. patent Ser. No. 14/489,412 (entitled OFF SET SWIVEL DRIVE ASSEMBLY FOR SOLAR TRACKER), filed Sep. 17, 2014.

BACKGROUND

The present application relates generally to a tracking system for solar panels. More specifically, embodiments of the present invention provide tracking systems that are suitable for solar panels. In a specific embodiment, a tracking system according to the present invention is fully adjustable in at each of the pillars, among other aspects. There are other embodiments as well.

As the population of the world increases, industrial expansion has lead to an equally large consumption of energy. Energy often comes from fossil fuels, including coal and oil, hydroelectric plants, nuclear sources, and others. As an example, the International Energy Agency projects further increases in oil consumption, with developing nations such as China and India accounting for most of the increase. Almost every element of our daily lives depends, in part, on oil, which is becoming increasingly scarce. As time further progresses, an era of "cheap" and plentiful oil is coming to an end. Accordingly, other and alternative sources of energy have been developed.

Concurrent with oil, we have also relied upon other very useful sources of energy such as hydroelectric, nuclear, and the like to provide our electricity needs. As an example, most of our conventional electricity requirements for home and business use come from turbines run on coal or other forms of fossil fuel, nuclear power generation plants, and hydroelectric plants, as well as other forms of renewable energy. Often times, home and business use of electrical power has been stable and widespread.

Most importantly, much if not all of the useful energy found on the Earth comes from our sun. Generally all common plant life on the Earth achieves life using photosynthesis processes from sun light. Fossil fuels such as oil were also developed from biological materials derived from energy associated with the sun. For human beings including "sun worshipers," sunlight has been essential. For life on the planet Earth, the sun has been our most important energy source and fuel for modern day solar energy.

Solar energy possesses many characteristics that are very desirable! Solar energy is renewable, clean, abundant, and often widespread. Certain technologies have been developed to capture solar energy, concentrate it, store it, and convert it into other useful forms of energy.

Solar panels have been developed to convert sunlight into energy. As an example, solar thermal panels often convert electromagnetic radiation from the sun into thermal energy for heating homes, running certain industrial processes, or driving high grade turbines to generate electricity. As another example, solar photovoltaic panels convert sunlight directly into electricity for a variety of applications. Solar panels are generally composed of an array of solar cells, which are interconnected to each other. The cells are often arranged in series and/or parallel groups of cells in series. Accordingly, solar panels have great potential to benefit our nation, security, and human users. They can even diversify our energy requirements and reduce the world's dependence on oil and other potentially detrimental sources of energy.

Although solar panels have been used successfully for certain applications, there are still limitations. Often, solar panels are unable to convert energy at their full potential due to the fact that the sun is often at an angle that is not optimum for the solar cells to receive solar energy. In the past, various types of conventional solar tracking mechanisms have been developed. Unfortunately, conventional solar tracking techniques are often inadequate. These and other limitations are described throughout the present specification, and may be described in more detail below.

From the above, it is seen that techniques for improving solar systems are highly desirable.

SUMMARY OF THE INVENTION

The present application relates generally to a tracking system for solar panels. More specifically, embodiments of the present invention provide tracking systems that are suitable for solar panels. In a specific embodiment, a tracking system according to the present invention is fully adjustable in at each of the pillars, among other aspects. There are other embodiments as well.

In an example, the solar tracker has a clamp assembly that is configured to pivot a torque tube. In an example, the assembly has a support structure configured as a frame having configured by a first anchoring region and a second anchoring region. In an example, the support structure is configured from a thickness of metal material. In an example, the support structure is configured in an upright manner, and has a major plane region. In an example, the assembly has a pivot device configured on the support structure and a torque tube suspending on the pivot device and aligned within an opening of the support and configured to be normal to the plane region. In an example, the torque tube is configured on the pivot device to move about an arc in a first direction or in a second direction such that the first direction is in a direction opposite to the second direction.

In an example, the present invention provides a solar tracker apparatus. In an example, the apparatus comprises a center of mass with an adjustable hanger assembly configured with a clam shell clamp assembly on the adjustable hanger assembly and a cylindrical torque tube comprising a plurality of torque tubes configured together in a continuous length from a first end to a second end such that the center of mass is aligned with a center of rotation of the cylindrical torque tubes to reduce a load of a drive motor operably coupled to the cylindrical torque tube. Further details of the present example, among others, can be found throughout the present specification and more particularly below.

Various additional objects, features and advantages of the present invention can be more fully appreciated with reference to the detailed description and accompanying drawings that follow.

BRIEF DESCRIPTION OF THE DRAWINGS

FIGS. 34 and 35 are simplified side view diagrams of a torque tube according to an embodiment of the present invention.

FIGS. 48 and 49 illustrate various views of a tracker apparatus according to an embodiment of the present invention.

FIG. 57 illustrates a top view diagram, a front view diagram, and a side view diagram of the frame structure to be configured for the clamp assembly according to an example of the present invention.

DESCRIPTION OF THE SPECIFIC EMBODIMENTS

Figure 1:
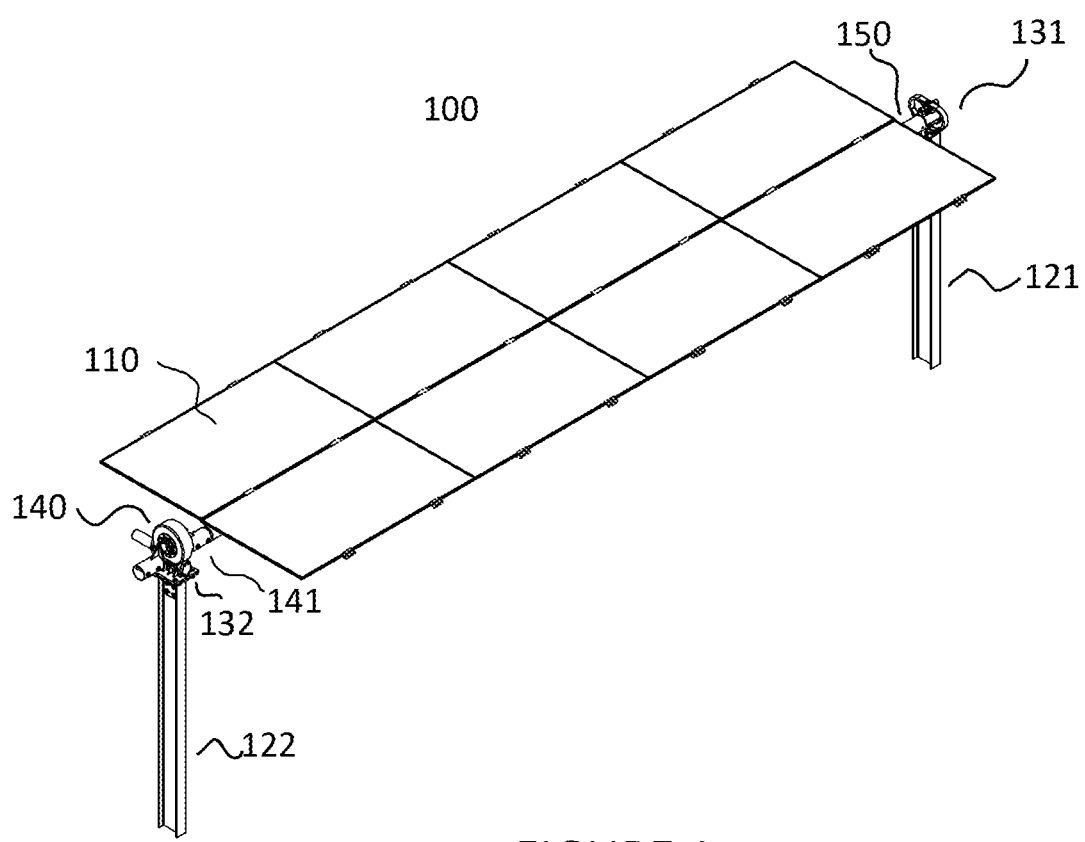
FIG. 1 is a simplified perspective view of a horizontal tracker apparatus configured with a plurality of solar modules according to an embodiment of the present invention.
Figure 2:
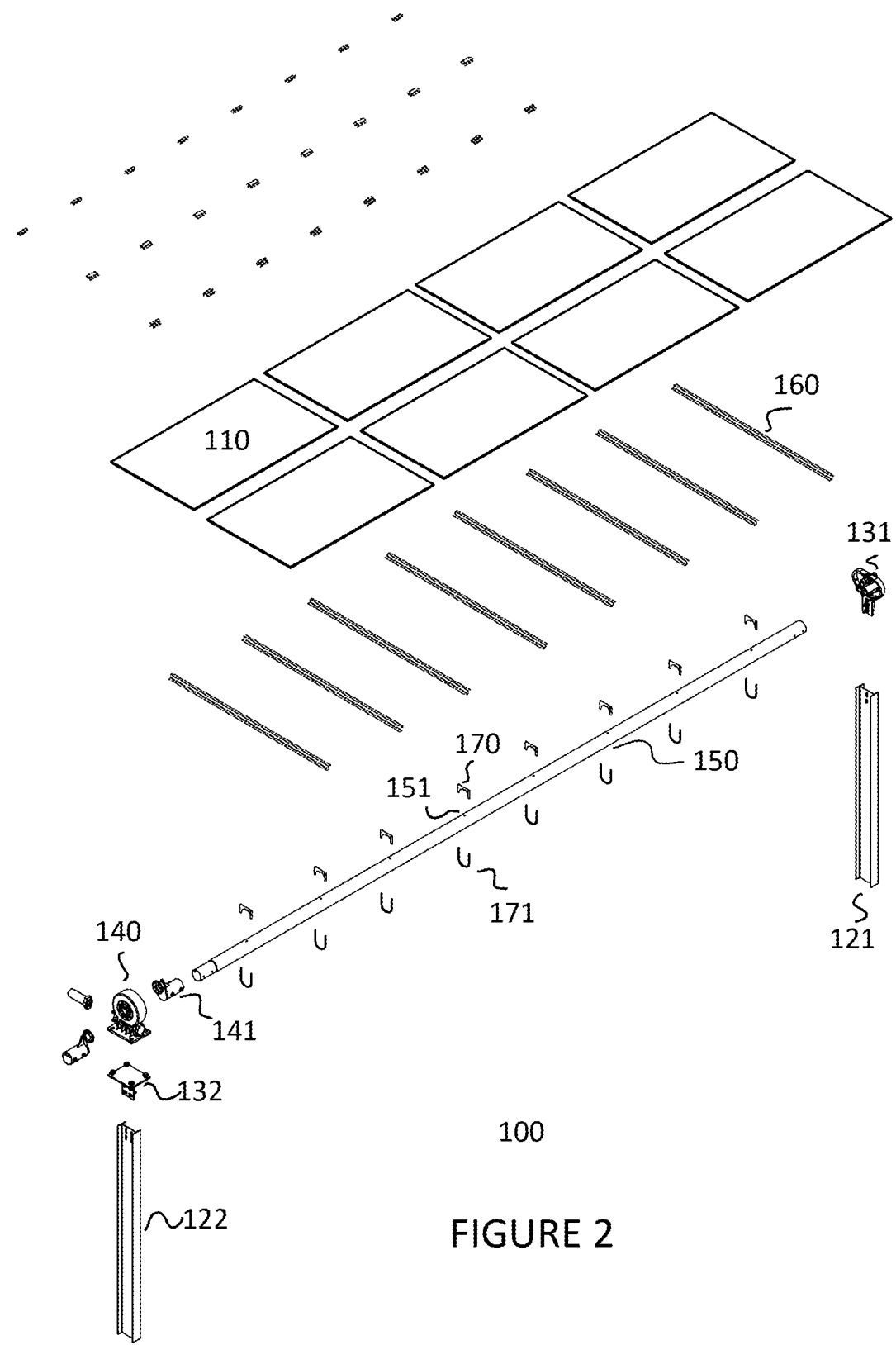
FIGS. 2 through 7 illustrate a method of assembling the horizontal tracker apparatus of FIG. 1.
Figure 3:
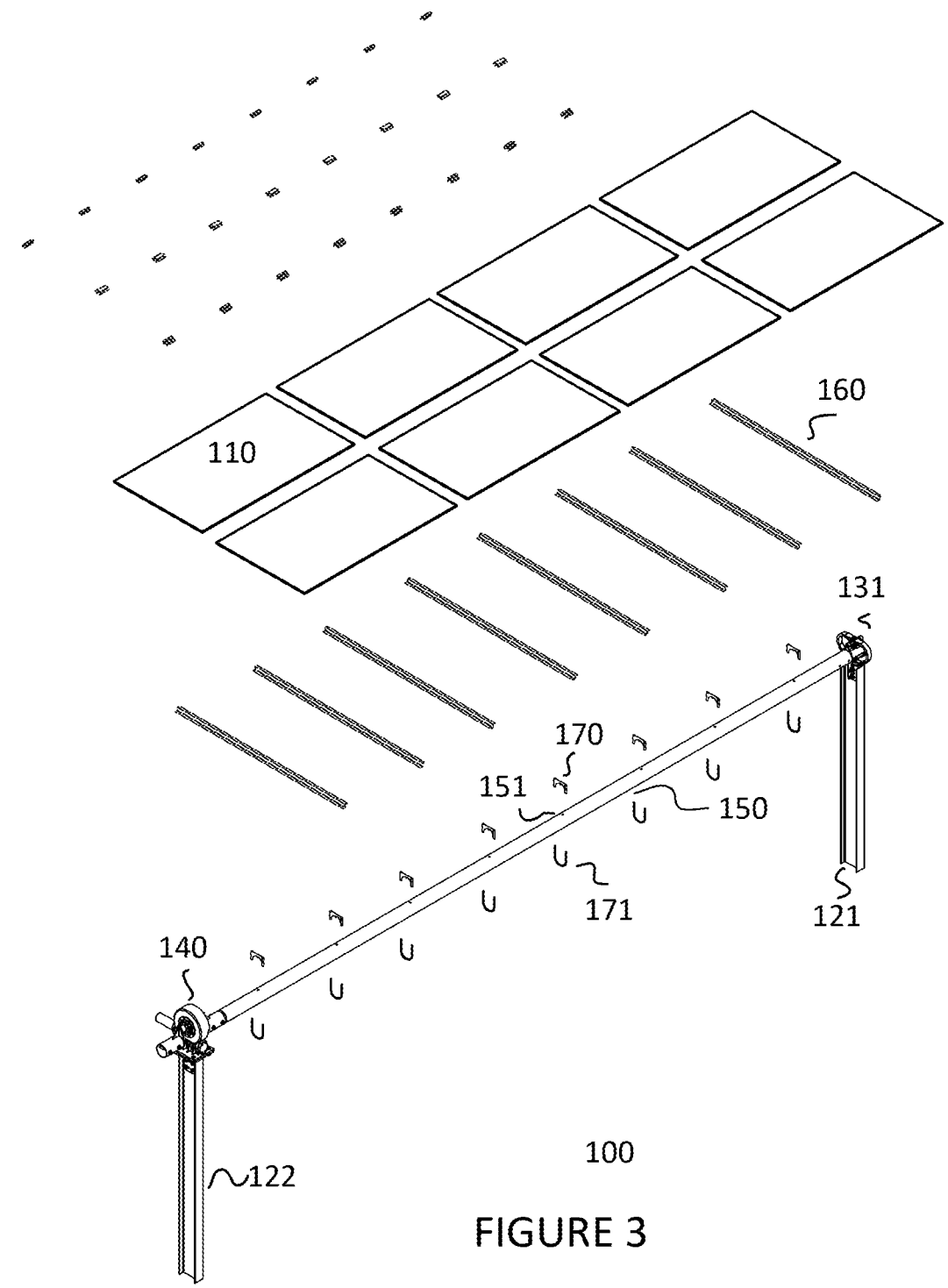
Figure 4:
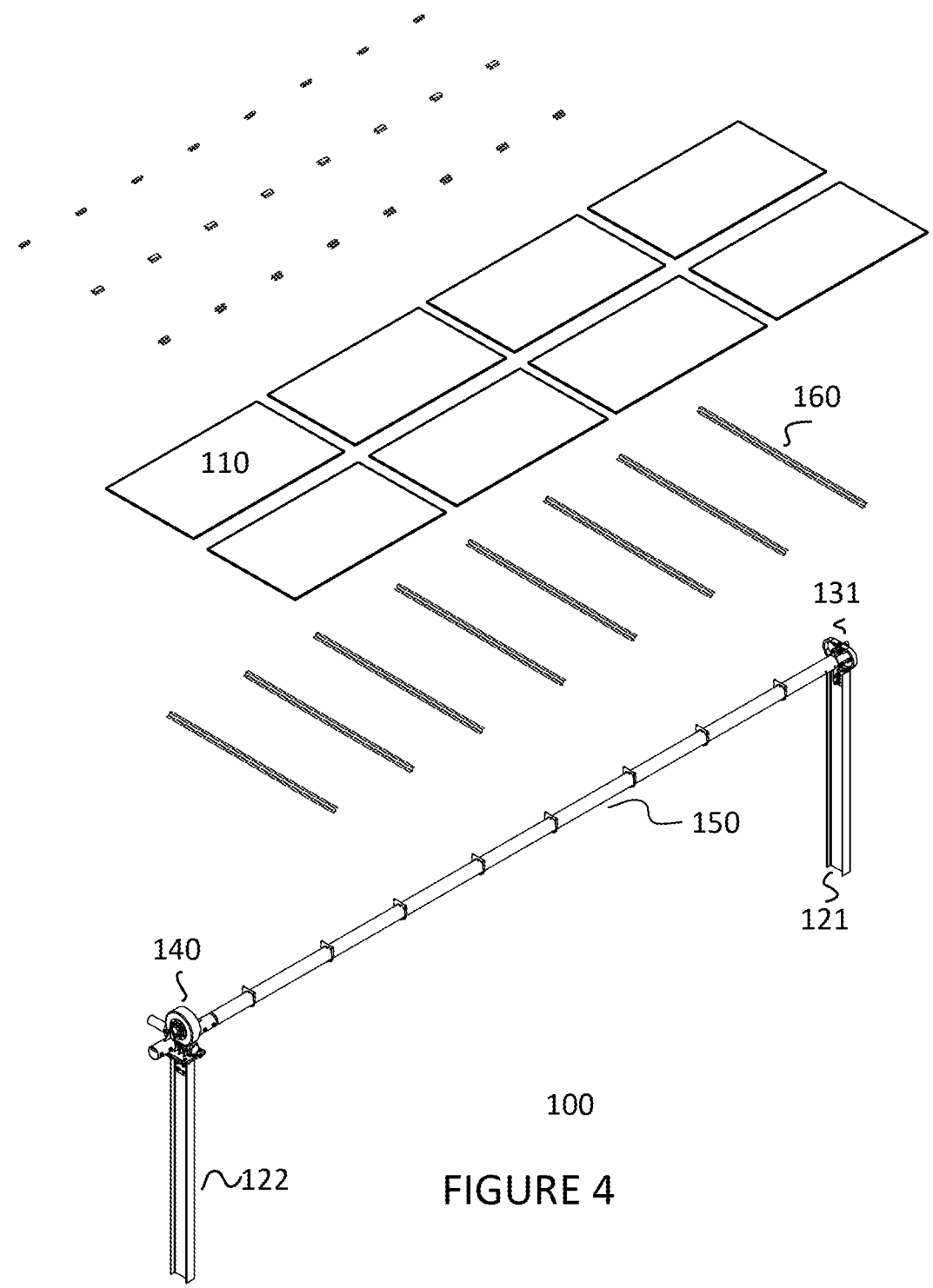
Figure 5:
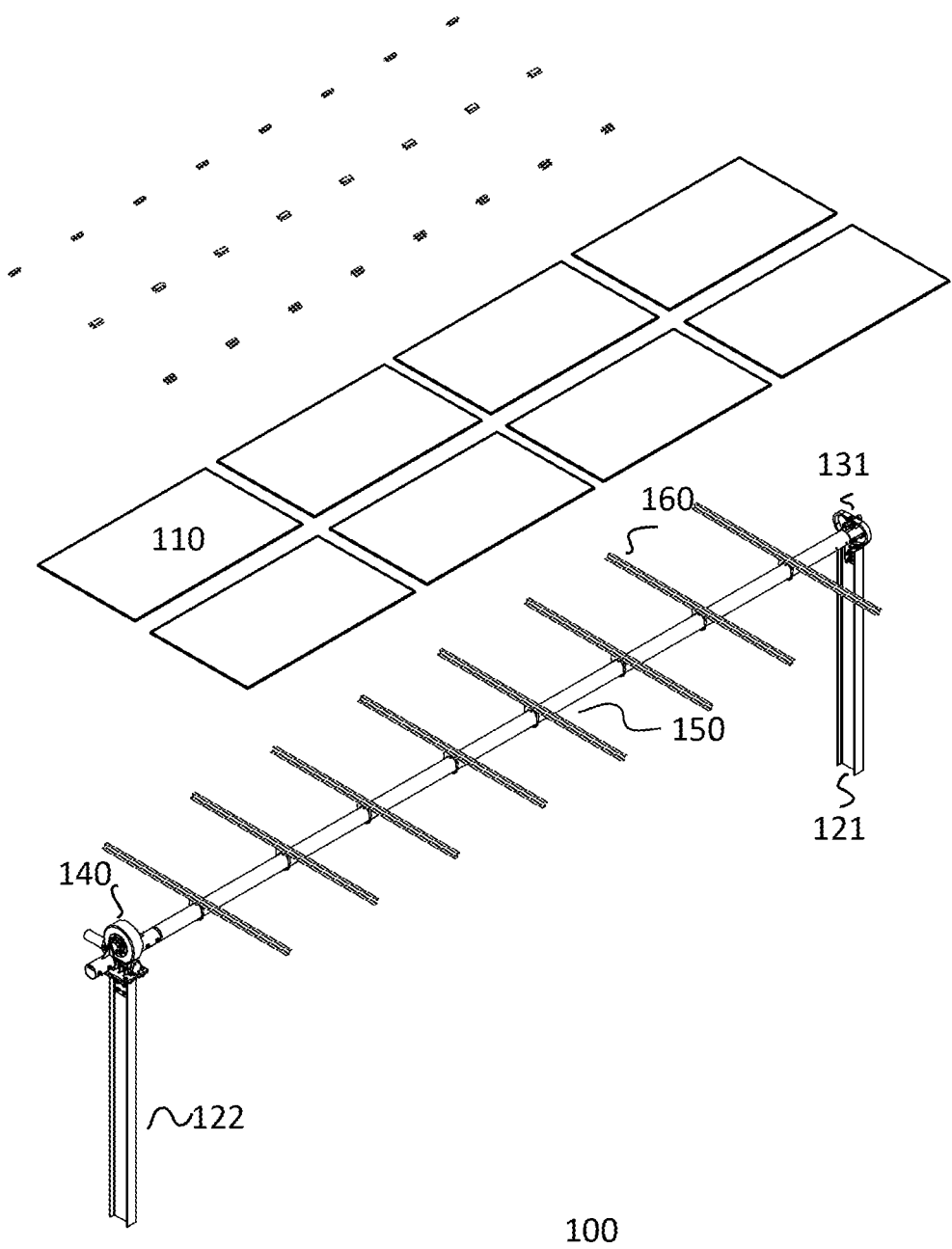
Figure 6:
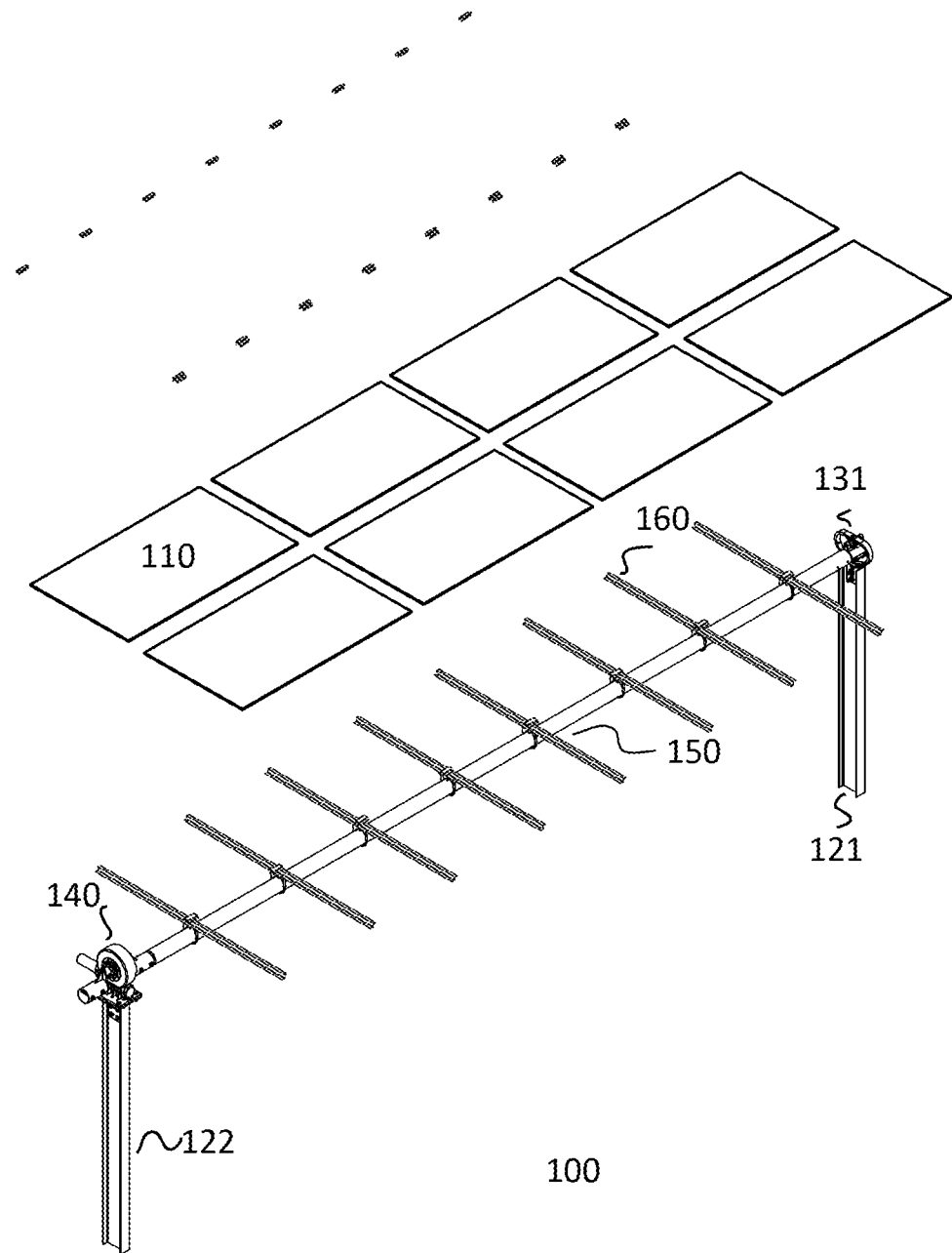
Figure 7:
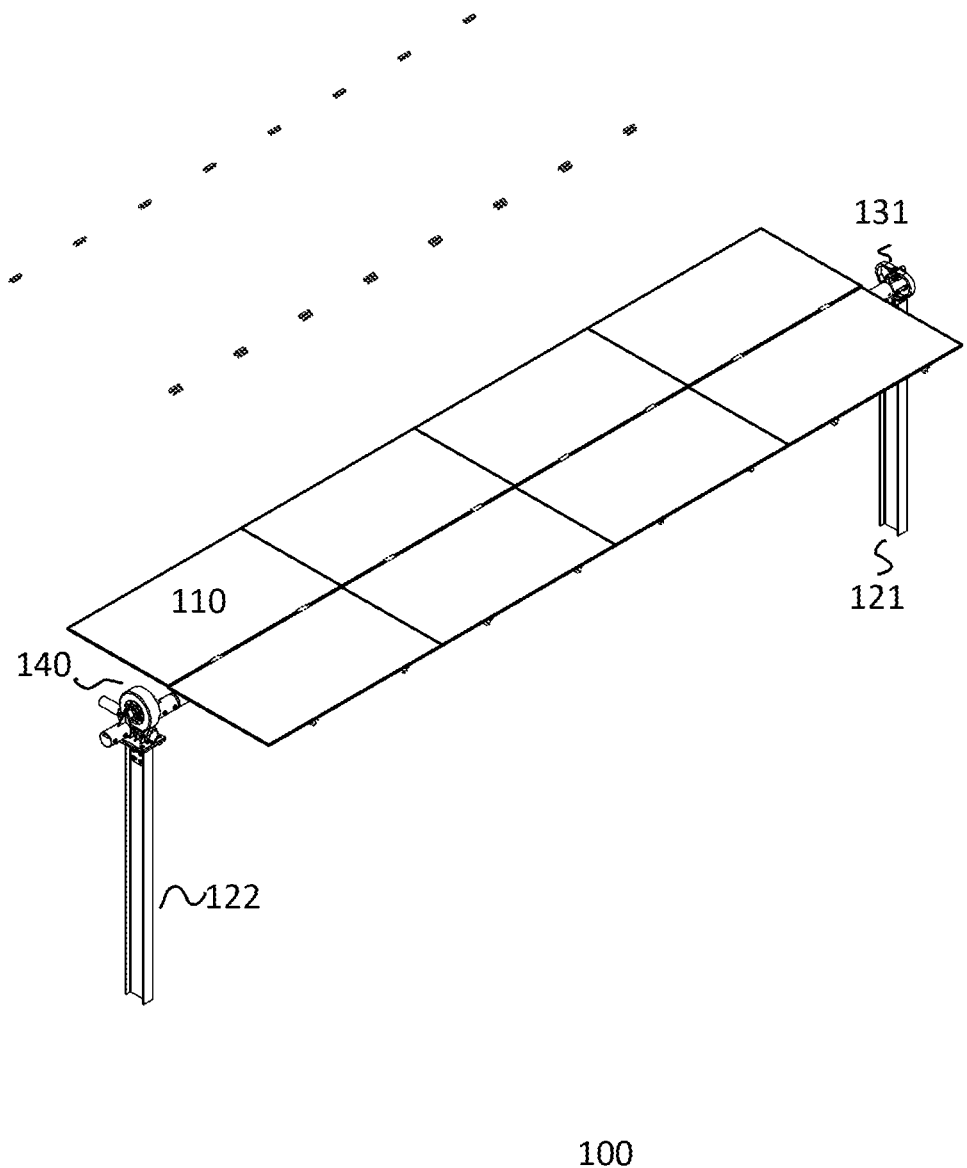

The present application relates generally to a tracking system for solar panels. More specifically, embodiments of the present invention provide tracking systems that are suitable for solar panels. In a specific embodiment, a tracking system according to the present invention is fully adjustable in at each of the pillars, among other aspects. There are other embodiments as well.

In a specific embodiment, the present invention provides a tracker apparatus for solar modules. The tracker apparatus has a first pier comprising a first pivot device and a second pier comprising a drive mount. The drive mount is capable for construction tolerances in at least three-axis, and is configured to a drive device. The drive device has an off-set clamp device coupled to a cylindrical bearing device coupled to a clamp member. The apparatus has a cylindrical torque tube operably disposed on the first pier and the second pier. The cylindrical torque tube comprises a first end and a second end, and a notch. The notch is one of a plurality of notches spatially disposed along a length of the cylindrical torque tube. The apparatus has a clamp configured around an annular portion of the cylindrical torque tube and mate with the notch to prevent movement of the clamp. The clamp comprises a support region configured to support a portion of a solar module.

In an alternative embodiment, the present invention provides an alternative solar tracker apparatus. The apparatus has a drive device, a crank coupled to the drive device and configured in an offset manner to a frame assembly. The frame assembly is coupled to a plurality of solar modules.

In an example, the apparatus has a continuous torque tube spatially disposed from a first region to a second region. The crank comprises a first crank coupled to a first side of the drive device and a second crank coupled to a second side of the drive device. The crank comprises a first crank coupled to a first side of the drive device and a second crank coupled to a second side of the drive device; and further comprises a first torque tube coupled to the first crank and a second torque tube coupled to the second crank. The crank comprises a first crank coupled to a first side of the drive device and a second crank coupled to a second side of the drive device; and further comprises a first torque tube coupled to the first crank and a second torque tube coupled to the second crank, and further comprises a first swage fitting coupling the first crank to the first torque tube and a second swage fitting coupling the second crank to the second torque tube. The apparatus also has a pier coupled to the drive device. In an example, the apparatus also has a drive mount coupled to a pier.

In an alternative embodiment, the present invention provides an alternative solar tracker apparatus. The apparatus has a center of mass with an adjustable hanger assembly configured with a clam shell clamp assembly on the adjustable hanger assembly and a cylindrical torque tube comprising a plurality of torque tubes configured together in a continuous length from a first end to a second end such that the center of mass is aligned with a center of rotation of the cylindrical torque tubes to reduce a load of a drive motor operably coupled to the cylindrical torque tube.

In an example, the drive motor is operable to move the torque tube about the center of rotation and is substantially free from a load. The center of rotation is offset from a center of the cylindrical torque tube.

In an alternative embodiment, the present invention provides a solar tracker apparatus. The apparatus has a clamp housing member configured in a upright direction. The clamp housing member comprises a lower region and an upper region. The lower region is coupled to a pier structure, and the upper region comprises a spherical bearing device. The upright direction is away from a direction of gravity. The apparatus has a clam shell clamp member coupled to the cylindrical bearing and a torque tube coupled to the spherical bearing to support the torque tube from the upper region of the clamp housing member. The torque tube is configured from an off-set position from a center region of rotation.

In an example, the apparatus is configured substantially free from any welds during assembly. Reduced welding lowers cost, improves installation time, avoids errors in installation, improves manufacturability, and reduces component count through standardized parts. The torque tube is coupled to another torque tube via a swage device within a vicinity of the clam shall clamp member. In an example, the connection is low cost, and provides for strong axial and torsional loading. The apparatus is quick to install with the pokey-yoke design. The torque tube is coupled to an elastomeric damper in line to dampen torque movement to be substantially free from formation of a harmonic waveform along any portion of a plurality of solar panels configured to the torque tube. The apparatus also has a locking damper or rigid structure to configure a solar panel coupled to the torque tube in a fixed tilt position to prevent damage to stopper and lock into a foundation-in a position that is substantially free from fluttering in an environment with high movement of air. The apparatus further comprises a controller apparatus configured in an inserter box provided in an underground region to protect the controller apparatus. The apparatus has a drive device to linearly actuate the torque tube. In an example, the apparatus uses an electrical connection coupled to a drive device. In an example, the spherical bearing allows for a construction tolerance, tracker movement, and acts as a bonding path of least resistance taking an electrical current to ground. The apparatus can be one of a plurality of tracker apparatus configured in an array within a geographic region. Each of the plurality of tracker apparatus is driven independently of each other to cause each row to stow independently at a different or similar angle.

Still further, the present invention provides a tracker apparatus comprising a clam shell apparatus, which has a first member operably coupled to a second member to hold a torque tube in place.

In an example, the apparatus also has a clamp housing operably coupled to the clam shell apparatus via a spherical bearing device such that the spherical bearing comprises an axis of rotation. The axis of rotation is different from a center of the torque tube. The apparatus further comprises a solar module coupled to the torque tube.

In an example, the invention provides a tracker apparatus comprising a plurality of torque tubes comprising a first torque tube coupled to a second torque tube coupled to an Nth torque tube, whereupon N is an integer greater than 2. Each pair of torque tubes is coupled to each other free from any welds.

In an example, each pair of torque tubes is swaged fitted together. Each of the torque tubes is cylindrical in shape. Each of the plurality of torque tubes is characterized by a length greater than 80 meters. Each of the torque tubes comprises a plurality of notches. In an example, the apparatus also has a plurality of U-bolt devices coupled respectively to the plurality of notches. Each of the plurality of torque tubes are made of steel.

In an alternative embodiment, the present invention provides a tracker apparatus having a pier member comprising a lower region and an upper region. A clamp holding member is configured to the upper region and is capable of moving in at least a first direction, a second direction opposite to the first direction, a third direction normal to the first direction and the second direction, a fourth direction opposite of the third direction, a fifth direction normal to the first direction, the second direction, the third direction, and the fourth direction, and a sixth direction opposite of the fifth direction.

In yet an alternative embodiment, the present invention provides a solar tracker apparatus. The apparatus has a clamp housing member configured in a upright direction. The clamp housing member comprises a lower region and an upper region. The lower region is coupled to a pier structure. The upper region comprises a spherical bearing device. The upright direction is away from a direction of gravity. The apparatus has a clam shell clamp member coupled to the cylindrical bearing and the clam shell clamp being suspended from the cylindrical bearing. In an example, the apparatus has a torque tube comprising a first end and a second end. The first end is coupled to the spherical bearing to support the torque tube from the upper region of the clamp housing member. The torque tube is configured from an off-set position from a center region of rotation. The apparatus has a drive device coupled to the second end such that the drive device and the torque tube are configured to be substantially free from a twisting action while under a load, e.g., rotation, wind, other internal or external forces. Further details of the present examples can be found throughout the present specification and more particularly below.

FIG. 1 is a simplified perspective view of a horizontal tracker apparatus 100 configured with a plurality of solar modules according to an embodiment of the present invention. As shown, the present invention provides a tracker apparatus 100 for solar modules. In an example, the solar modules can be a silicon based solar module, a polysilicon based solar module, a concentrated solar module, or a thin film solar module, including cadmium telluride (CdTe), copper indium gallium selenide (CuIn1-xGaxSe2 or CIGS), which is a direct bandgap semiconductor useful for the manufacture of solar cells, among others. As shown, each of the solar panels can be arranged in pairs, which form an array. Of course, there can be other variations. In an example, the first pier 121 and the second pier 122 are provided on a sloped surface, an irregular surface, or a flat surface. The first pier 121 and the second pier 122 are two of a plurality of piers provided for the apparatus 100. In example, the apparatus 100 has a solar module 110 configured in a hanging position or a supporting position.

The tracker apparatus 100 has a first pier 121 comprising a first pivot device 131 and a second pier 122 comprising a drive mount 132. In an example, the first pier 121 is made of a solid or patterned metal structure, such as a wide beam flange or the like, as shown. In an example, each of the piers is inserted into the ground, and sealed, using cement or other attachment material. Each pier is provided in generally an upright position and in the direction of gravity, although there can be variations. In an example, each of the piers is spatially spaced along a region of the ground, which may be flat or along a hillside or other structure, according to an embodiment. In an example, the first pillar comprises a wide flange beam. In an example, the first pillar and the second pillar can be off-set and reconfigurable.

In an example, the drive mount 132 is capable for construction tolerances in at least three-axis, and is configured to a drive device 140. The drive device 140 has an off-set clamp device 141 coupled to a cylindrical bearing device coupled to a clamp member.

In an example, the apparatus has a cylindrical torque tube operably disposed on the first pier and the second pier. In an example, the cylindrical torque tube comprises a one to ten inch diameter pipe made of a steel Hollow Structural Section (HSS). The cylindrical torque tube comprises a first end and a second end, and a notch. The notch is one of a plurality of notches spatially disposed along a length of the cylindrical torque tube.

In an example, the apparatus 100 has a clamp 170 configured around an annular portion of the cylindrical torque tube 150 and mate with the notch 151 to prevent movement of the clamp 170. The clamp 170 comprises a support region configured to support a portion of a solar module 110. The clamp 170 comprises a pin configured with the notch 151. The apparatus also has a rail 160 configured to the clamp 170. The rail 160 comprises a thread region configured to hold a bolt 171, which is adapted to screw into the thread and bottom out against a portion of cylindrical torque tube 150 such that the clamp 170 is desirably torqued against the cylindrical torque tube 150. The apparatus has a solar module 110 attached to the rail 160 or other attachment device-shared module claim or other devices. The cylindrical torque tube 150 is one of a plurality of torque tubes configured in as a continuous structure and extends in length for 80 to 200 meters. Each pair of torque tubes is swage fitted together, and bolted for the configuration.

In an example, the apparatus also has a center of mass of along an axial direction is matched with a pivot point of the drive device 140. The pivot point of the drive device 140 is fixed in three dimensions while rotating along the center of mass. In an example, the off-set clamp 141 comprises a crank device. The first pivot device 131 comprises a spherical bearing configured a clam-shell clamp device to secure the first end to the cylindrical torque tube 150. In other examples, the drive device 140 comprises a slew gear. The apparatus also has an overrun device configured with the first pivot device 131. The overrun device comprises a mechanical stop to allow the cylindrical torque tube 150 to rotate about a desired range. Further details of the present tracker apparatus 100 can be found throughout the present specification and more particularly below.

FIGS. 2 through 7 illustrate a method of assembling the horizontal tracker apparatus 100 of FIG. 1. As shown, the method includes disposing a first pier 121 into a first ground structure. The method also includes disposing a second pier 122 into a second ground structure. Each of the piers is one of a plurality of piers to be spatially disposed along a ground structure for one row of solar modules configured to a tracker apparatus 100.

In an example, the method includes configuring a first pivot device 131 on the first pier 121.

In an example, the method includes configuring a drive mount 132 on the second pier 122. In an example, the drive mount 132 is capable for construction tolerances in at least three-axis. In an example, the drive mount 132 is configured to a drive device 140 having an off-set clamp device 141 coupled to a cylindrical bearing device coupled to a clamp member.

In an example, the method includes assembling a cylindrical torque tube 150 and operably disposing on the first pier 121 and the second pier 122 cylindrical torque tube 150. The cylindrical torque tube 150 comprises a first end and a second end, and a notch 151. In an example, the notch 151 is one of a plurality of notches spatially disposed along a length of the cylindrical torque tube 150.

In an example, the method includes assembling a plurality of clamps spatially disposed and configured around an annular portion of the cylindrical torque tube 150. Each of the plurality of clamps is configured to mate with the notch 151 to prevent movement of the clamp 170. In an example, the clamp 170 comprises a support region configured to support a portion of a solar module 110.

In an example, the method includes attaching a rail 160 configured to each of the clamps, the rail 160 comprising a thread region configured to hold a bolt 171. The bolt 171 is adapted to screw into the thread and bottom out against a portion of cylindrical torque tube 150 such that the clamp 170 is desirably torqued against the cylindrical torque tube 150.

In an example, the method includes attaching a solar module 110 to the rail 160 or other attachment device. Further details of other examples can be found throughout the present specification and more particularly below.

Figure 8:
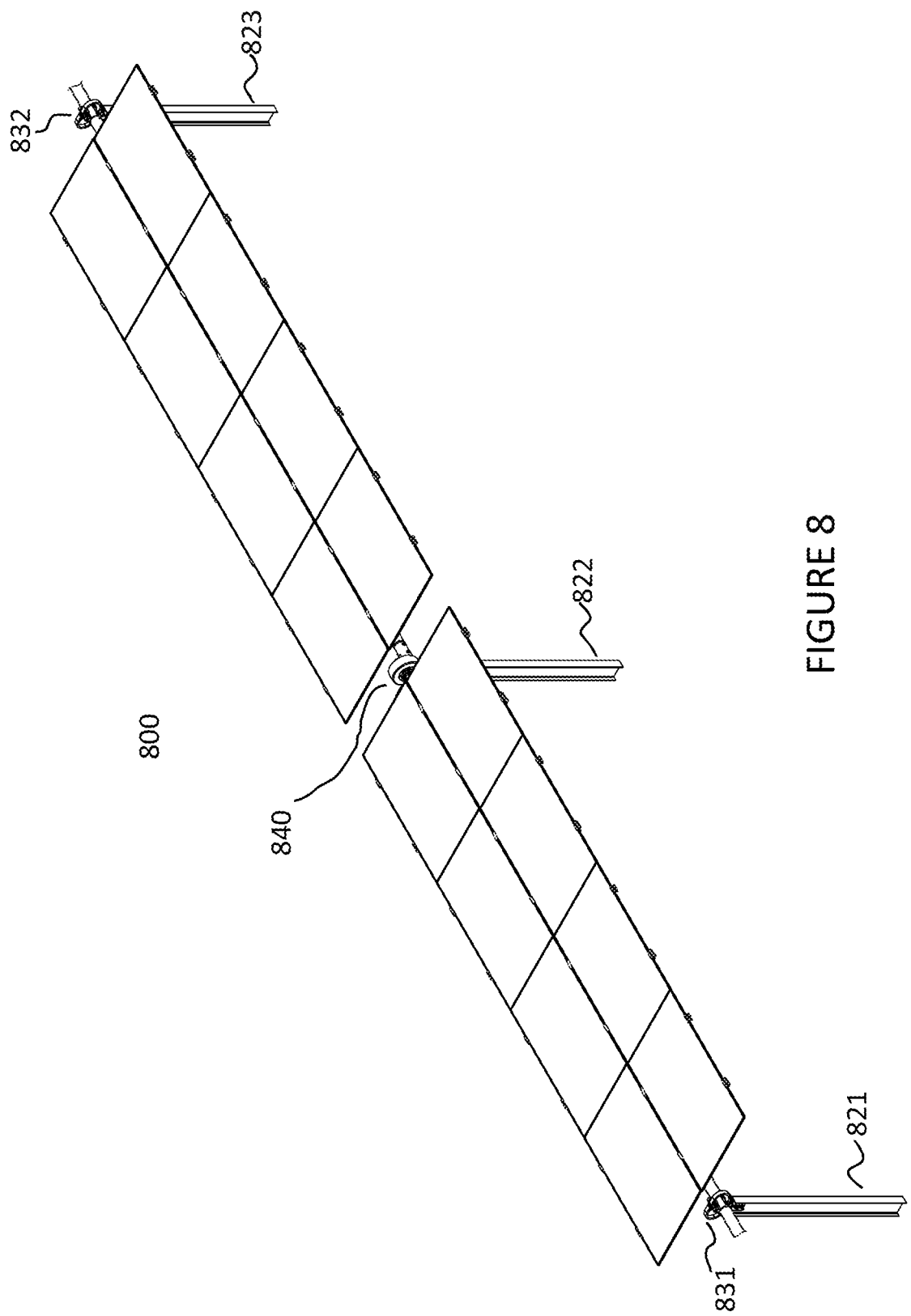
FIG. 8 is a simplified perspective view of a pair of horizontal tracker apparatus configured together with a plurality of solar panels according to an embodiment of the present invention.

FIG. 8 is a simplified perspective view of a pair of horizontal tracker apparatus 800 configured together with a plurality of solar panels according to an embodiment of the present invention. As shown is a tracker apparatus for solar modules. The tracker apparatus 800 has a first pier 821 comprising a first pivot device 831, a second pier 822 comprising a drive mount, and a third pier 823 comprising a second pivot device 832. The second pier 822 is between the first and third piers, 821 and 823, as shown in an example. Of course, additional piers can be configured on each outer side of the first and third piers 821 and 823.

In an example, the drive mount is capable for construction tolerances in at least three-axis, and is configured to a drive device 840. The drive device 840 has an off-set clamp device coupled to a cylindrical bearing device coupled to a clamp member.

In an example, the apparatus has a cylindrical torque tube operably disposed on the first pier 821 and the second pier 822, and then on the third pier 823. In an example, the cylindrical torque tube comprises a first end and a second end, and a notch. The notch is one of a plurality of notches spatially disposed along a length of the cylindrical torque tube. The apparatus has a clamp configured around an annular portion of the cylindrical torque tube and mate with the notch to prevent movement of the clamp. The clamp comprises a support region configured to support a portion of a solar module. In an example, the cylindrical torque tube is configured to the drive device 840 to rotate the cylindrical torque tube while each of the clamp members holds the tube in place. Further details of the present apparatus 800 can be found throughout the present specification and more particularly below.

Figure 9:
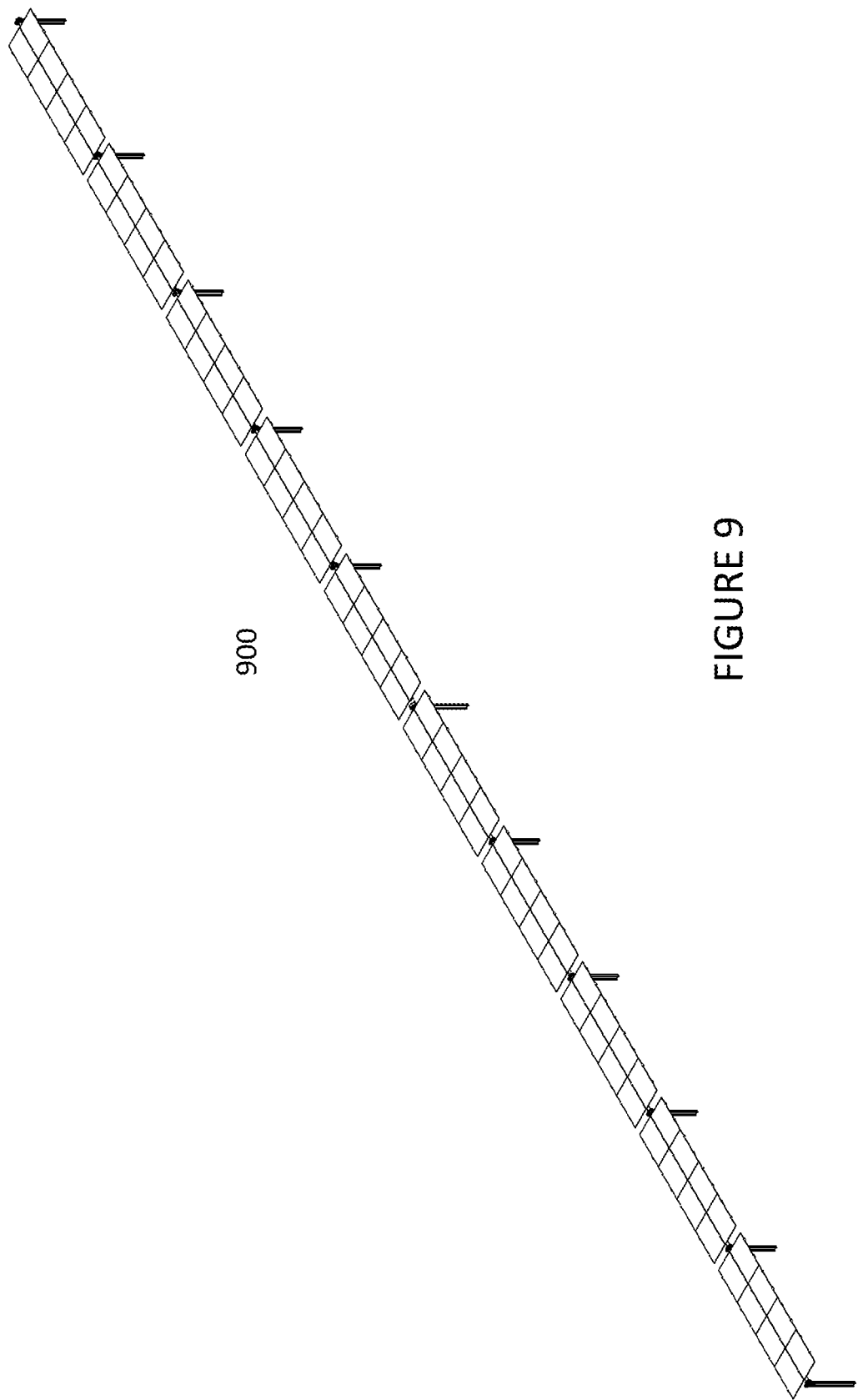
FIG. 9 is a simplified diagram of a plurality of horizontal tracker apparatus configured together according to an embodiment of the present invention.

FIG. 9 is a simplified diagram of a plurality of horizontal tracker apparatus 900 configured together according to an embodiment of the present invention. As shown is a solar tracker apparatus. The apparatus has a center of mass with an adjustable hanger assembly configured with a clam shell clamp assembly on the adjustable hanger assembly and a cylindrical torque tube comprising a plurality of torque tubes configured together in a continuous length from a first end to a second end such that the center of mass is aligned with a center of rotation of the cylindrical torque tubes to reduce a load of a drive motor operably coupled to the cylindrical torque tube. In an example, the drive motor is operable to move the torque tube about the center of rotation and is substantially free from a load. The center of rotation is offset from a center of the cylindrical torque tube.

In an example, the invention provides a tracker apparatus comprising a plurality of torque tubes comprising a first torque tube coupled to a second torque tube coupled to an Nth torque tube, whereupon N is an integer greater than 2. Each pair of torque tubes is coupled to each other free from any welds.

In an example, a single drive motor can be coupled to a center region of the plurality of torque tubes to rotate the torque tube in a desirable manner to allow each of the solar modules to track a direction of electromagnetic radiation from the sun.

In an example, each tracker apparatus comprises a torque tube coupled to an array of solar panels, as shown. Each of the tracker apparatus is coupled to each other via the torque tube, and a pivot device. Each tracker has a corresponding pair of piers, a torque tube, and one or more pivot devices, as shown. Further details of each of these elements are described in detail throughout the present specification.

Figure 10:
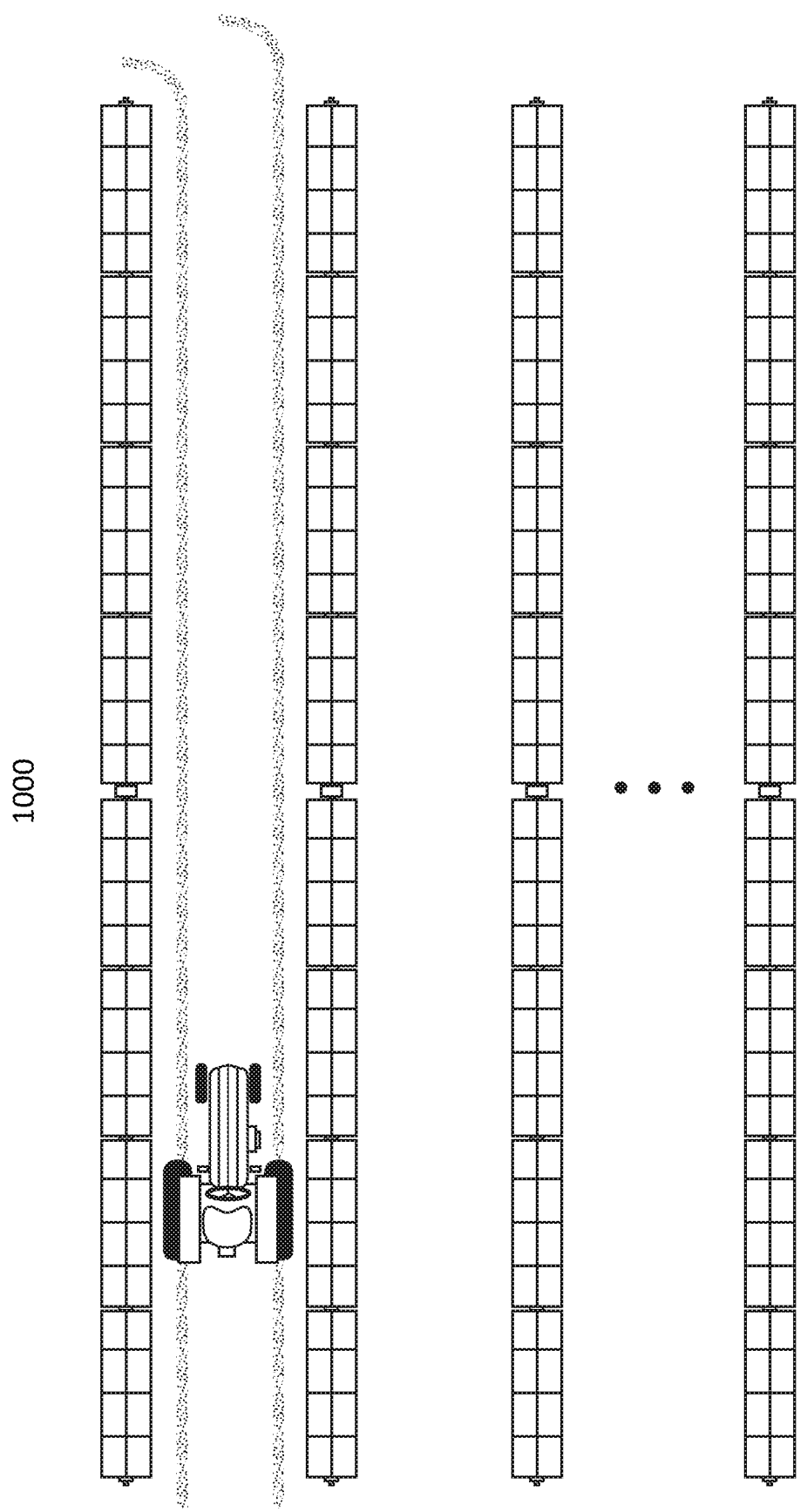
FIG. 10 is a simplified diagram of an array of a plurality of horizontal tracker apparatus configured together according to an embodiment of the present invention.

FIG. 10 is a simplified diagram of an array of a plurality of horizontal tracker apparatus configured together according to an embodiment of the present invention. As shown are an array of horizontally configured tracker devices to form a plurality of rows of tracker devices 1000 arranged in a parallel manner. Each pair of rows of trackers has an avenue, which allows for other applications. That is, row crops or other things can be provided in the avenue, which extends along an entirety of each horizontal tracker row. In an example, the plurality of tracker apparatus are configured in an array within a geographic region. Each of the plurality of tracker apparatus is driven independently of each other to cause each row to stow independently at a different or similar angle. Unlike conventional trackers, which often have mechanical device between the rows, each of the avenues is continuous from one end to the other end, as allows for a tractor or other vehicle to drive from one end to the other end in a preferred example. Of course, there can be other variations, modifications, and alternatives.

In an example, the apparatus is configured substantially free from any welds during assembly, and can be assembled using conventional tools. In an example, the torque tube is coupled to another torque tube via a swage device within a vicinity of the clam shell clamp member. In an example, the torque tube is coupled to an elastomeric damper in line to dampen torque movement to be substantially free from formation of a harmonic waveform along any portion of a plurality of solar panels configured to the torque tube.

In an example, the apparatus further comprising a locking damper or rigid structure to configure a solar panel coupled to the torque tube in a fixed tilt position to prevent damage to stopper and lock into a foundation-in a position that is substantially free from fluttering in an environment with high movement of air. In an example, the locking damper fixes each of the plurality of solar modules in a desirable angle relative to the direction of air or wind.

In an example, the apparatus has a controller apparatus configured in an inserter box provided in an underground region to protect the controller apparatus. In an example, the inserter box is made of a suitable material, which is sealed and/or environmentally suitable to protect the controller apparatus.

In operation, the apparatus has a drive device to linearly actuate the torque tube to allow for desirable positions of each of the solar modules relative to incident electromagnetic radiation. In an example, an electrical connection and source (e.g., 120V, 60 Hz, 240V) is coupled to a drive device. Of course, there can be variations.

Figure 11:
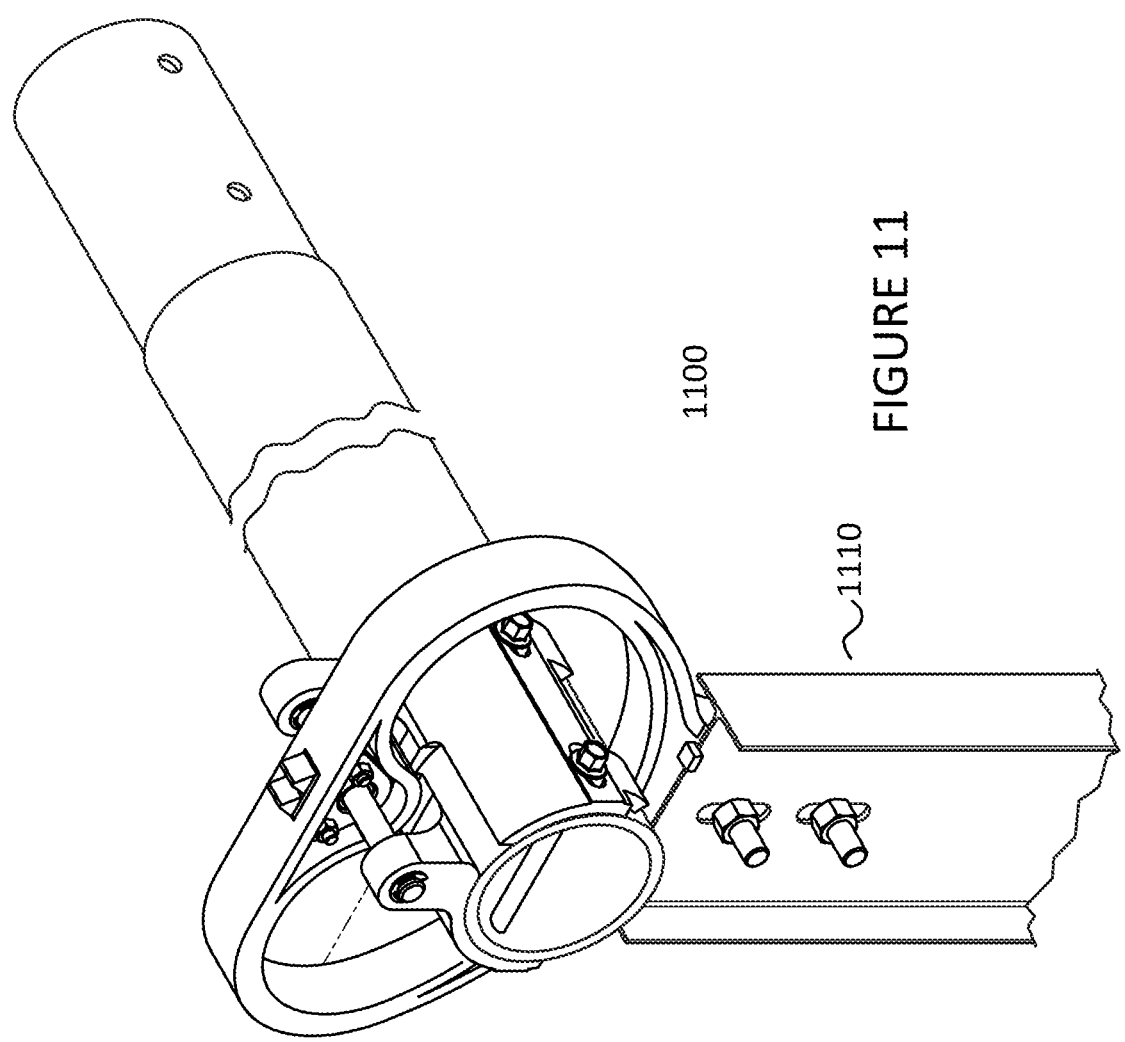
FIG. 11 is a simplified diagram of a clamp assembly for the horizontal tracker of FIG. 1 according to an embodiment of the present invention.

FIG. 11 is a simplified diagram of a clamp assembly 1100 for the horizontal tracker of FIG. 1 according to an embodiment of the present invention. As shown, the clamp assembly 1100 has a clamp housing member 1120 configured in a upright direction, which is a direction away from a direction of gravity. In an example, the clamp housing member 1120 comprises a lower region and an upper region. The lower region is coupled to a pier structure 1110. The lower region has a thickness of material comprising bolt openings, which align to openings on an upper portion of the pier structure 1110. Locking nuts and bolts are configured to hold the lower region of the clamp housing to the pier structure 1110 in an upright manner. At least a pair of openings are provided in each of the lower region of the clamp housing and the pier structure 1110, as shown.

In an example, the upper region comprises a spherical bearing device. The upper region has a tongue structure, which has an opening that houses the spherical bearing 1130 between a pair of plates 1141 and 1142, which hold the bearing 1130 in place. In an example, the spherical bearing 1130 allows for rotational, and movement in each of the three axis directions within a desirable range. Each of the plates is disposed within a recessed region on each side of the tongue structure. Each of the plates may include a fastener to hold such plate in place within the recessed region.

In an example, clamp assembly 1100 has a clam shell clamp member coupled to the spherical bearing 1130 and the clam shell clamp being suspended from the spherical bearing 1130. That is, the clam shell clamp has a first side and a second side. Each side has an upper region comprising an opening. A pin is inserted through each of the openings, while an opening of the spherical bearing 1130 is provided as a third suspension region between each of the openings, as shown.

Each side of the clam shell is shaped to conform or couple to at least one side of a portion of the torque tube 1160, as shown. Each side has one or more opens, which align to one or more openings on the portion of the torque tube 1160. A pin or bolt is inserted through each of the openings to clamp the clam shell clamp to the portion of the torque tube 1160 and surround substantially an entirety of a peripheral region of the torque tube 1160. The pin or bolt or pins or bolts also holds the torque tube 1160 in a fixed position relative to the clam shell clamp to prevent the torque tube 1160 from slipping and/or twisting within the clam shell clamp. Of course, there can be variations.

In an example, the spherical bearing 1130 allows for a construction tolerance, tracker movement, and acts as a bonding path of least resistance taking an electrical current to ground. The bonding path occurs from any of the modules, through the frame, to each of the clamp assembly 1100, to one or more piers, and then to ground.

In an example, a torque tube 1160 comprising a first end and a second end is coupled to the spherical bearing 1130 to support the torque tube 1160 from the upper region of the clamp housing member 1120. In an example, the torque tube 1160 is configured from an off-set position from a center region of rotation.

In an example, a drive device, which will be described in more detail below, is coupled to the second end such that the drive device and the torque tube 1160 are configured to be substantially free from a twisting action while under a load.

In an example, the clam shell apparatus comprising a first member 1151 operably coupled to a second member 1152 to hold a torque tube 1160 in place. In an example, the apparatus has a clamp housing operably coupled to the clam shell apparatus via a spherical bearing device 1130 such that the spherical bearing 1130 comprises an axis of rotation, which is different from a center of the torque tube 1160.

Figure 12:
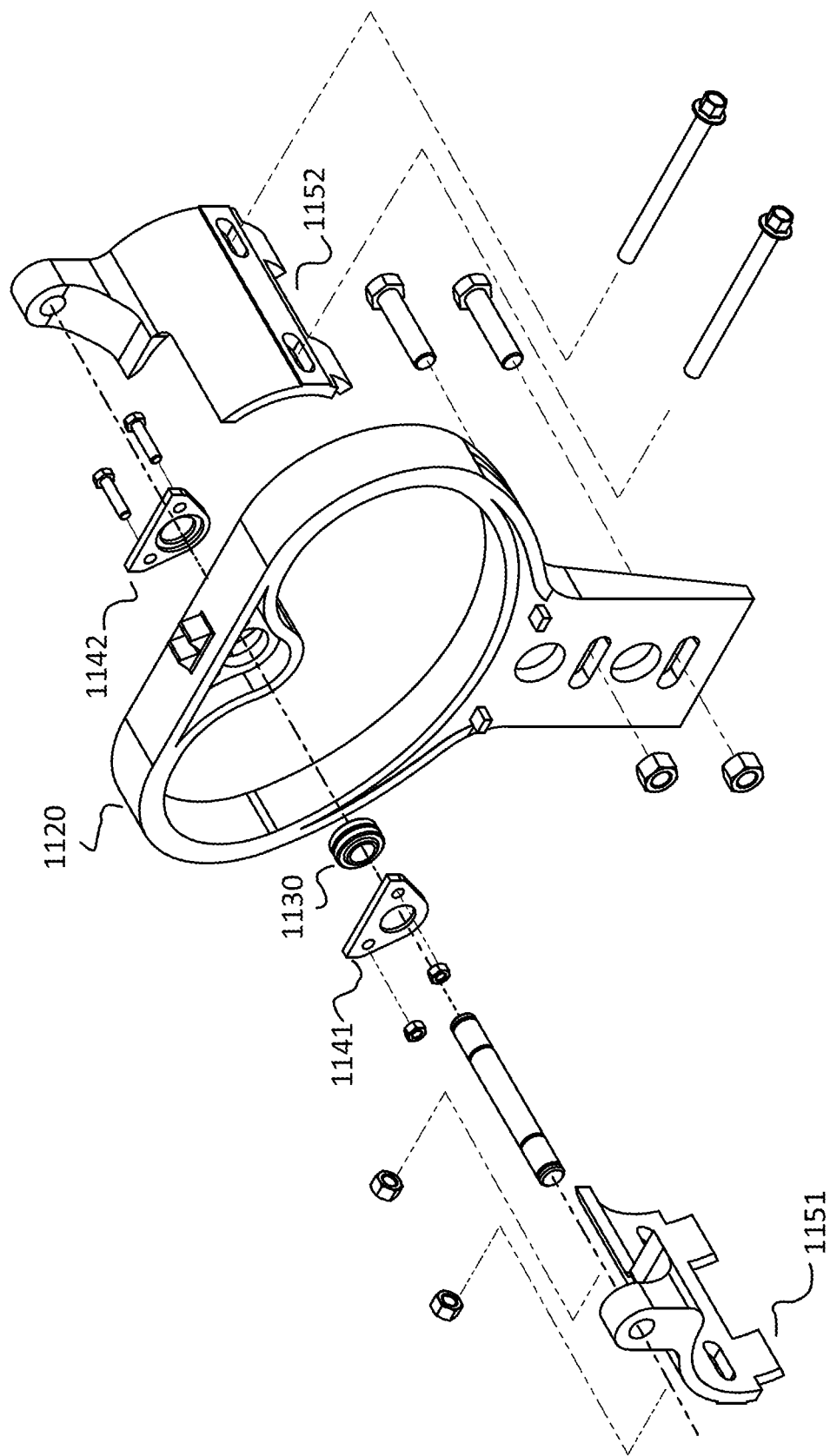
FIGS. 12 through 14 are simplified diagrams illustrating a method for assembling the clamp assembly of FIG. 11.
Figure 13:
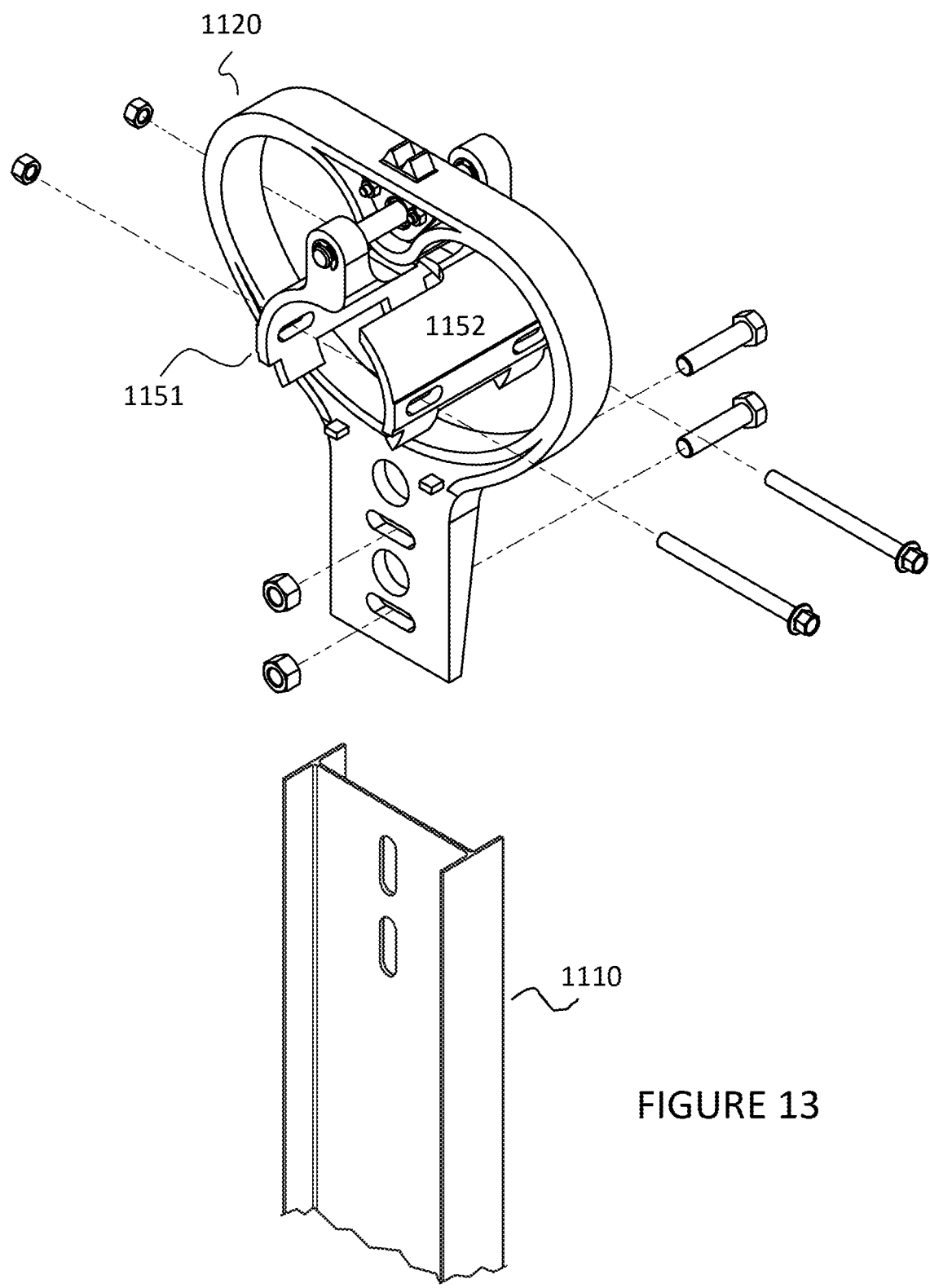
Figure 14:
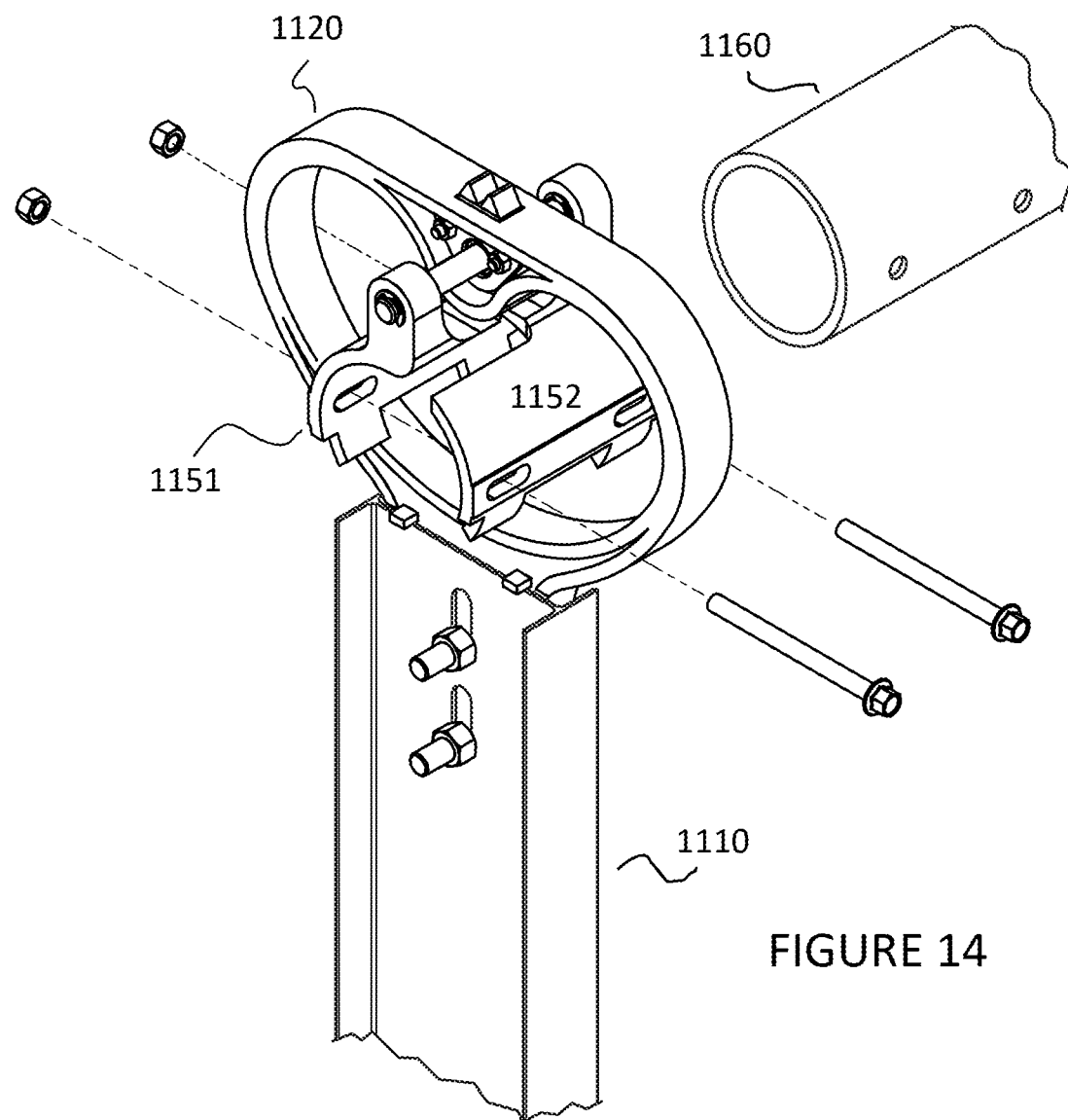

FIGS. 12 through 14 are simplified diagrams illustrating a method for assembling the clamp assembly 1100 of FIG. 11. In an example, the present method is for assembling a solar tracker apparatus. The method includes providing a clamp housing member 1120 configured in a upright direction. The clamp housing member 1120 comprises a lower region and an upper region. In an example, the lower region is coupled to a pier structure 1100. The upper region comprises a spherical bearing device. In an example, the upright direction is away from a direction of gravity. In an example, the method includes coupling a first half clam shell clamp 1151 member and a second half clam shell clamp member 1152 (collectively a clam shell clamp member) to the cylindrical bearing. The method also includes supporting a torque tube 1160 between the first half clam shell clamp 1151 and the second half clam shell clamp 1152, each of which is coupled to the spherical bearing to support the torque tube 1160 from the upper region of the clamp housing member 1120, the torque tube 1160 being configured from an off-set position from a center region of rotation.

In an example, the apparatus is configured substantially free from any welds during assembly. In an example, the torque tube 1160 is coupled to another torque tube via a swage device within a vicinity of the clam shell clamp member. In an example, the torque tube 1160 is coupled to an elastomeric damper in line to dampen torque movement to be substantially free from formation of a harmonic waveform along any portion of a plurality of solar panels configured to the torque tube 1160.

In an example, the method includes coupling a pin member to the first half clam shell clamp member 1151, the second half clam shell clamp member 1152, and the spherical bearing 1160. In an example, the method includes coupling a first member 1151 and a second member 1152 to sandwich the spherical bearing 1130 to a tongue region of the upper region of the clamp housing member 1120. In an example, the spherical bearing 1130 is configured for rotation, and movement of the pin to pivot along a solid angle region. In an example, the housing clamp member 1120 is a continuous structure made of cast or stamped or machined metal material. In an example, each of the first half clam shell member 1151 and the second half claim shell member 1152 is made of a solid continuous structure that is cast or stamped or machined metal material. In an example, the spherical bearing 1130 allows for a construction tolerance, tracker movement, and acting as a bonding path of least resistance taking an electrical current to ground. Further details of the present method and apparatus can be found throughout the present specification and more particularly below.

Figure 15:
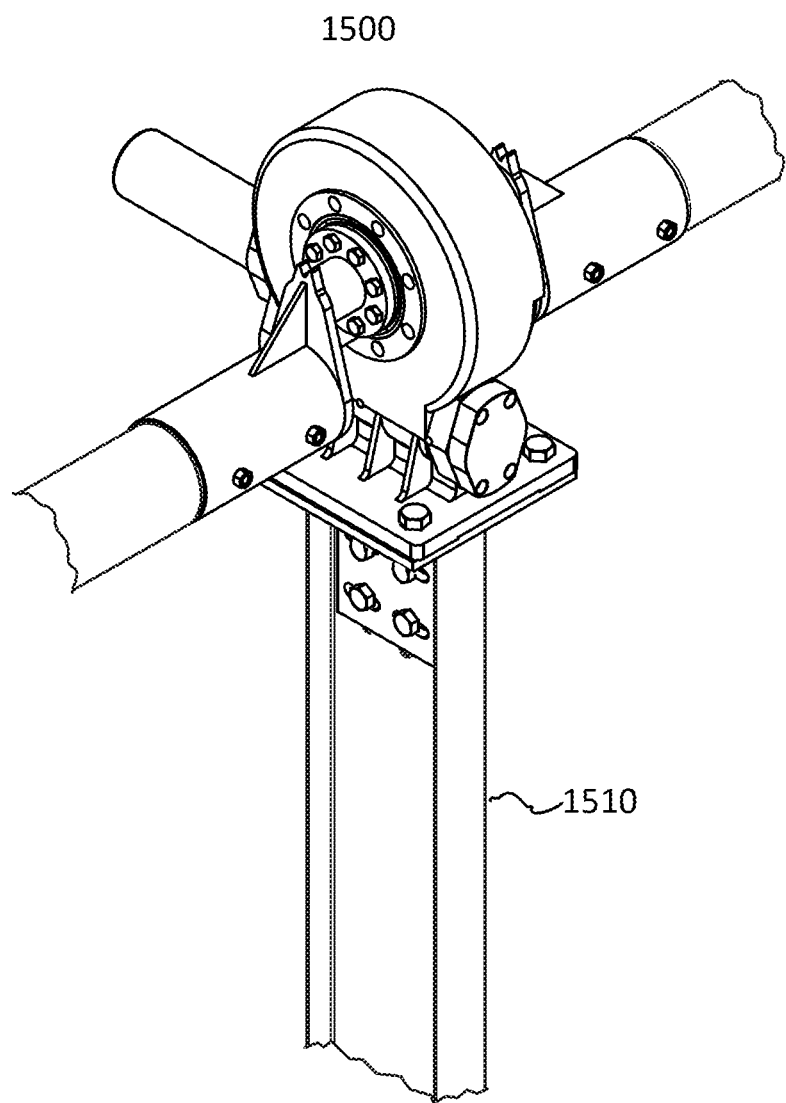
FIG. 15 is a simplified perspective diagram of a drive assembly configured on a pier member according to an embodiment of the present invention.
Figure 16:
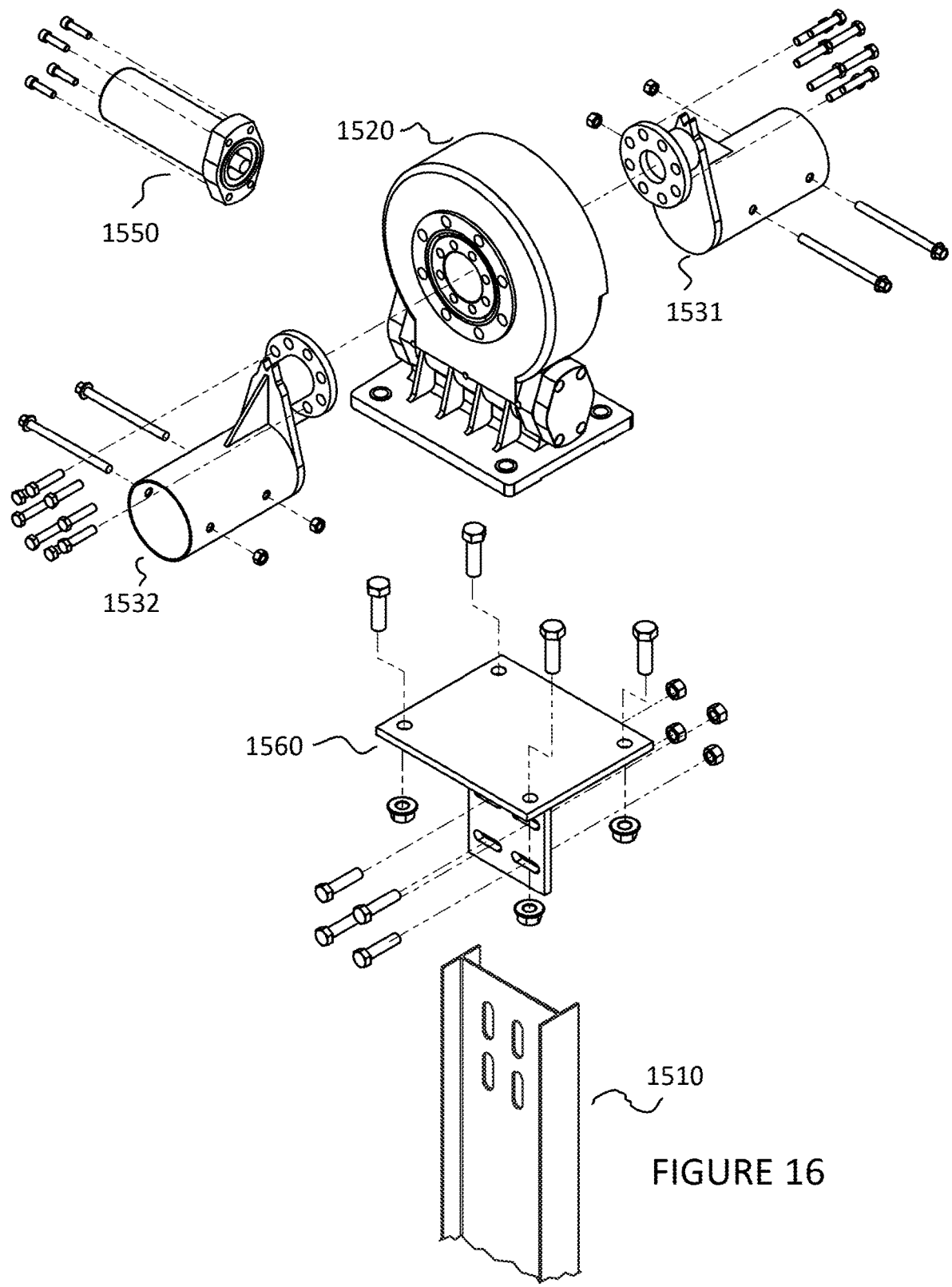
FIGS. 16 through 19 are simplified diagrams illustrating a method for assembling the drive assembly of FIG. 15.
Figure 17:
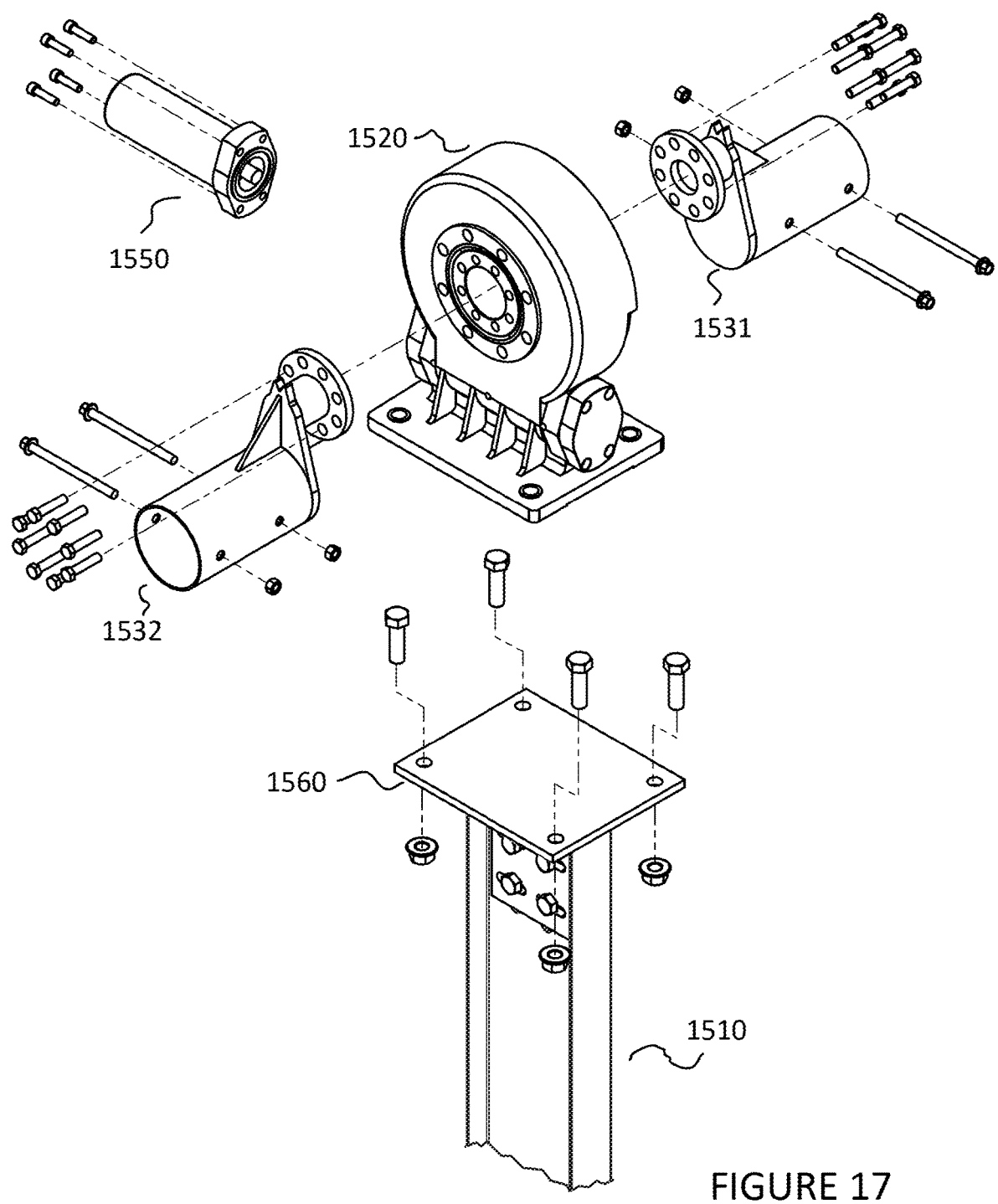
Figure 18:
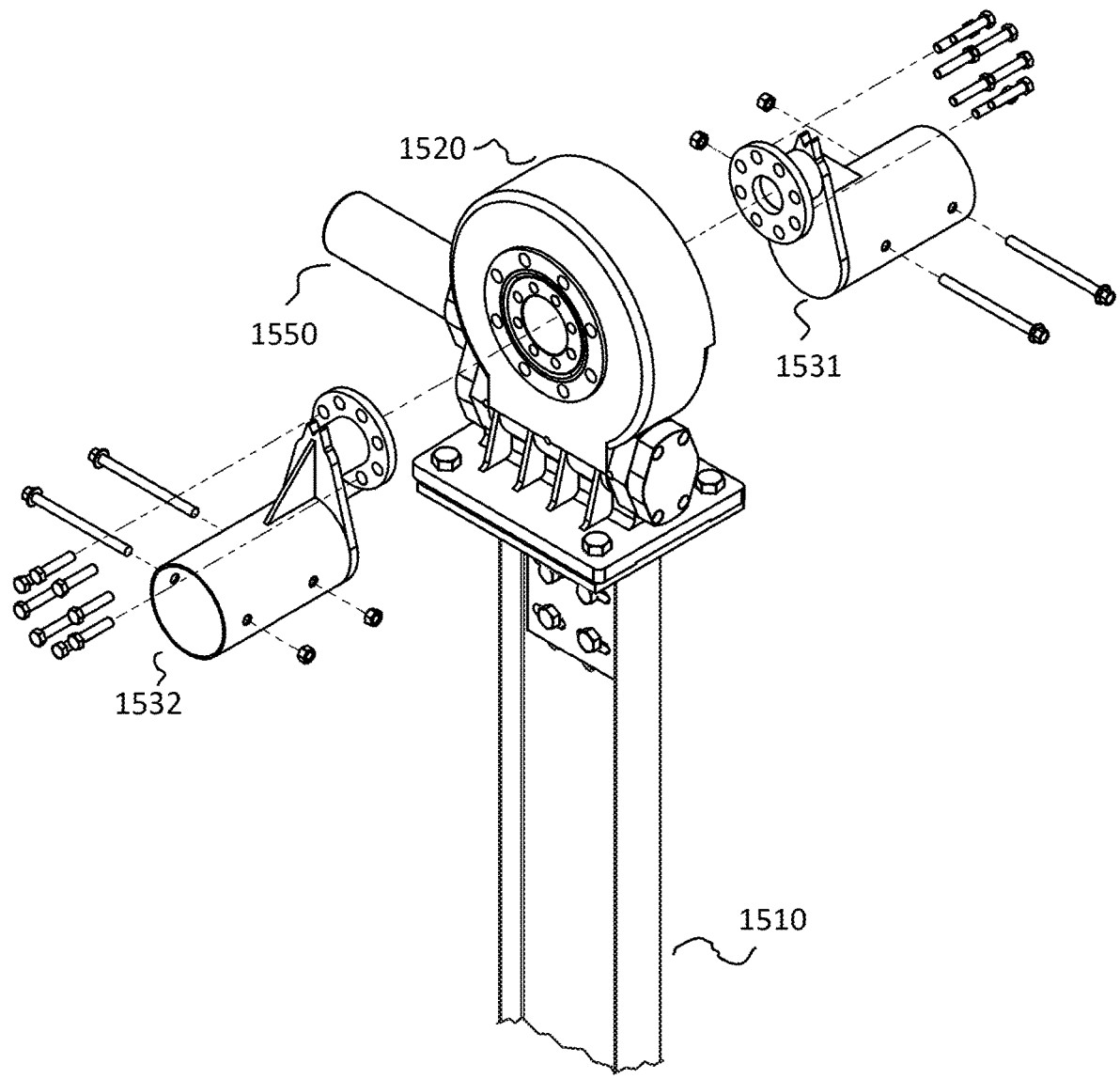
Figure 19:
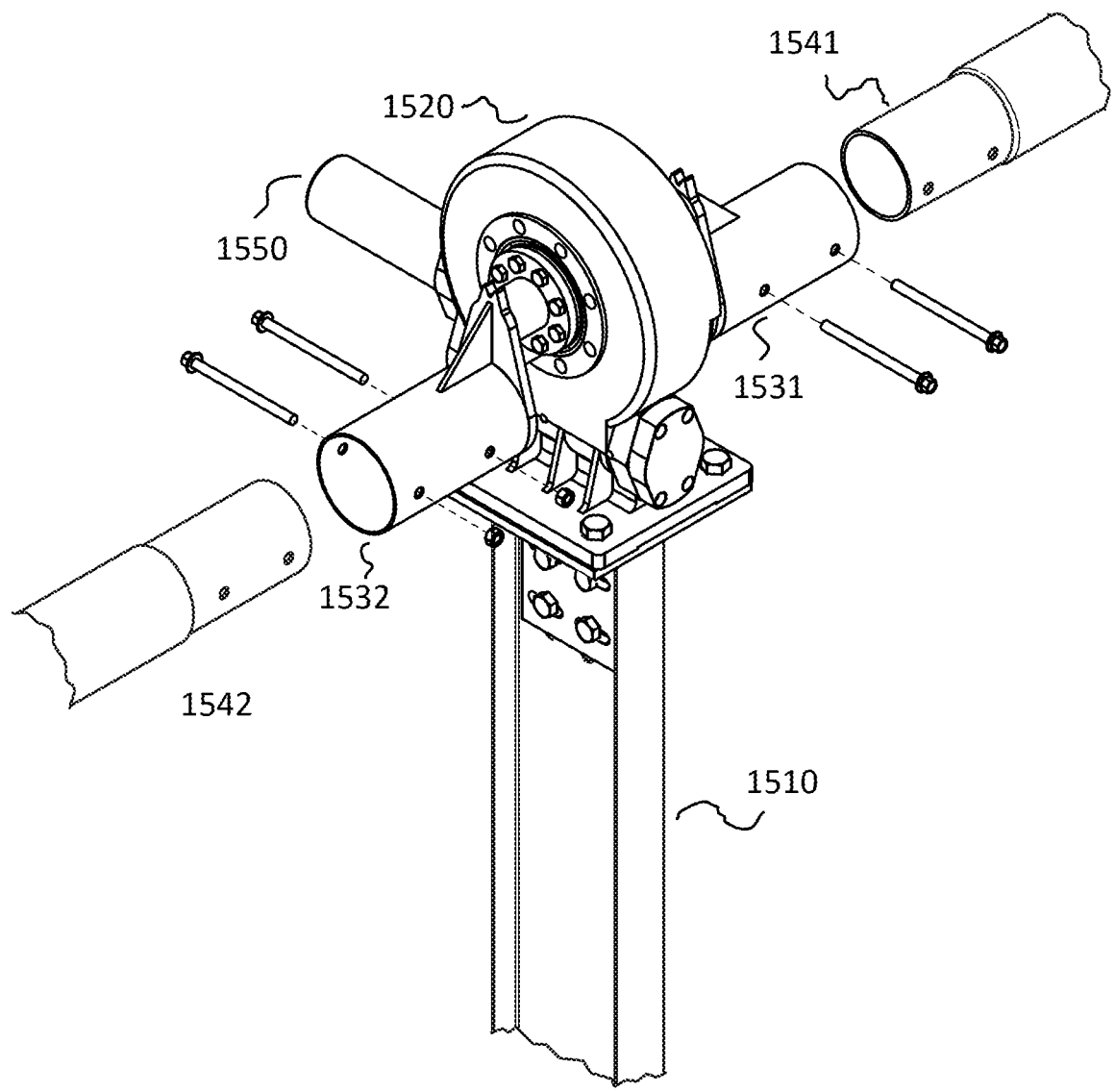

FIG. 15 is a simplified perspective diagram of a drive assembly 1500 configured on a pier member 1510 according to an embodiment of the present invention. In an example, as shown, the solar tracker apparatus comprises a drive device 1520. The drive device 1520 is coupled to an electric motor 1550, which can be DC or AC. The drive device 1520 has a shaft, which rotates around a rotational point, and drives each crank, which is described below. The drive device 1520 is provided on a support or drive mount 1560, which is configured on an upper region of a pier, which has been described. The drive device 1520 is coupled to a crank coupled to the drive device 1520 and configured in an offset manner to a frame assembly, which has a plurality of solar modules.

In an example, the drive device 1520 provides rotation to a continuous torque tube spatially disposed from a first region to a second region. The drive device 1520 has a drive line, which couples via a gear box to drive a pair of cranks. Each crank is coupled to each side of the drive device 1520, which causes rotational movement of each crank.

In an example, the crank comprises a first crank 1531 coupled to a first side of the drive device 1520 and a second crank 1532 coupled to a second side of the drive device 1520. In an example, the crank comprises a first crank 1531 coupled to a first side of the drive device 1520 and a second crank 1532 coupled to a second side of the drive device 1520. In an example, each crank has a flange having a plurality of bolt openings to couple to one side of the drive device 1520. Each crank has an arm, which is normal to each flange, and couples to cylindrical member that has one or more bolt openings. The apparatus has a first torque tube 1541 coupled to the first crank 1531 via the cylindrical member and a second torque tube 1542 coupled to the second crank 1532 via another cylindrical member. In an example, a first swage fitting is coupling the first crank 1531 to the first torque tube 1541 and a second swage fitting is coupling the second crank 1532 to the second torque tube 1542. One or more bolts are inserted through the cylindrical members to secure a portion of the torque tube in place, and keep it free from rotation or twisting within the cylindrical member, and lock it into place, as shown.

In an example, each of the cranks is made of a suitable metal material that may be cast, machined, or stamped. Each cylindrical member is made of a suitable metal material to coupled to an end of the torque tube, as shown. A swage fitting can be provided to couple or connect the end of the torque tube to each cylindrical member as shown. Of course, there can be variations. Further details of assembling the drive device can be found throughout the present specification, and more particularly below.

FIGS. 16 through 19 are simplified diagrams illustrating a method for assembling the drive assembly 1500 of FIG. 15. In an example, the method includes providing a drive device 1520, as shown. In an example, the method includes coupling the drive device 1520 via a drive line or shaft to an electric motor 1550, which can be DC or AC. The method includes coupling the drive device 1550 to a support or drive mount 1560, which is configured on an upper region of a pier, which has been described. In an example, the pier comprising a plurality of support structures coupled to a drive device support. The drive device support having a first member coupled to the plurality of support structures, and a second member coupled to the drive device 1520.

In an example, the method includes coupling the drive device 1520 a crank coupled to the drive device 1520 and configured in an offset manner to a frame assembly, which has a plurality of solar modules. In an example, the drive device 1520 has the drive line, which couples via a gear box to drive a pair of cranks. Each crank is coupled to each side of the drive device, which causes rotational movement of each crank. In an example, the crank comprises a first crank 1531 coupled to a first side of the drive device 1520 and a second crank 1532 coupled to a second side of the drive device 1520. In an example, the crank comprises a first crank 1531 coupled to a first side of the drive device 1520 and a second crank 1532 coupled to a second side of the drive device 1520. In an example, each crank has a flange having a plurality of bolt openings to couple to one side of the drive device 1520. Each crank has an arm, which is normal to each flange, and couples to cylindrical member that has one or more bolt openings. The apparatus has a first torque tube 1541 coupled to the first crank 1531 via the cylindrical member and a second torque tube 1542 coupled to the second crank 1532 via another cylindrical member. In an example, a first swage fitting is coupling the first crank 1531 to the first torque tube 1541 and a second swage fitting is coupling the second crank 1532 to the second torque tube 1542. One or more bolts are inserted through the cylindrical members to secure a portion of the torque tube in place, and keep it free from rotation or twisting within the cylindrical member, and lock it into place, as shown.

Figure 20:
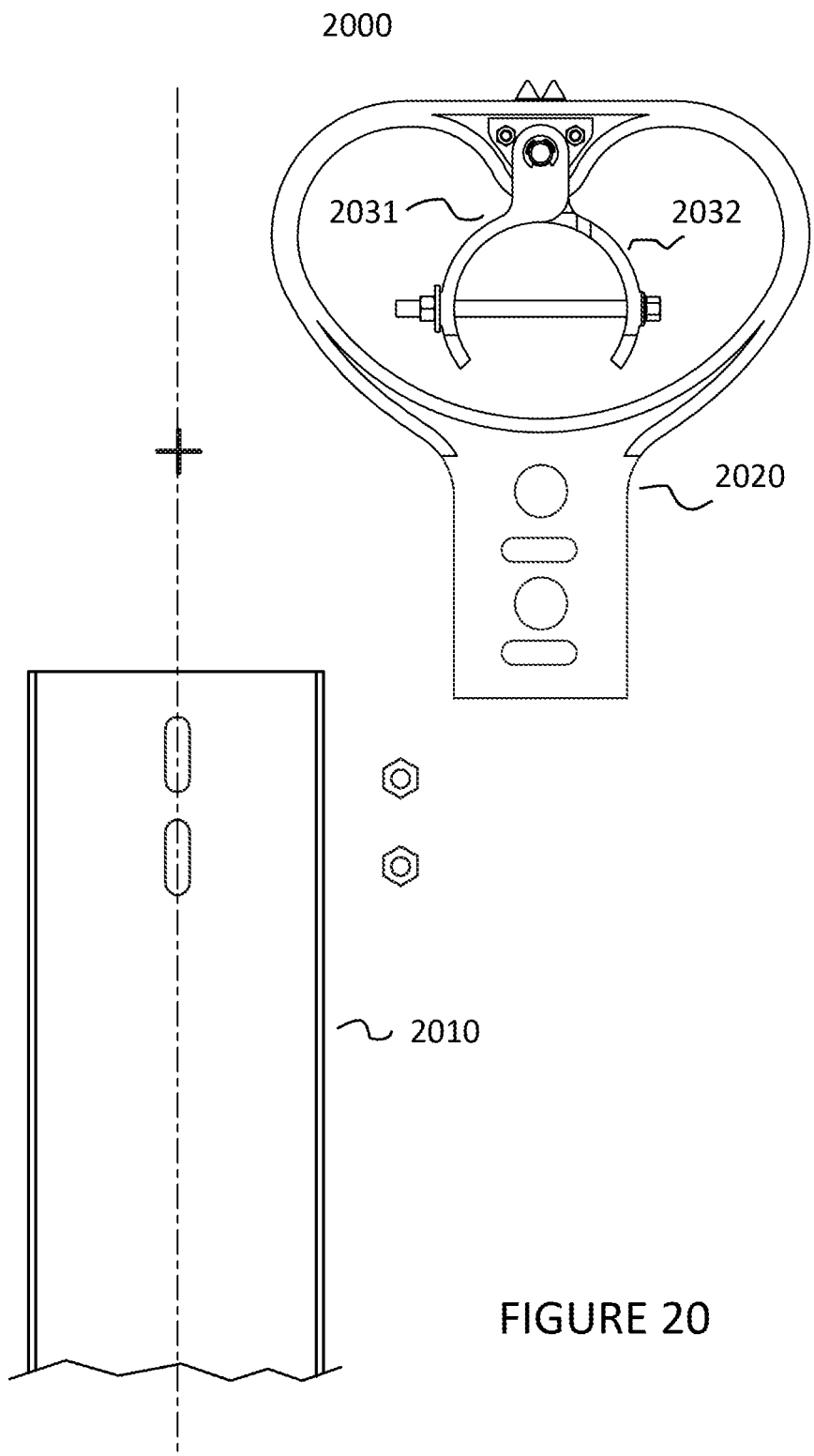
FIG. 20 is a simplified in-line view diagram illustrating a clamp assembly separate and apart from a pier member according to an embodiment of the present invention.

FIG. 20 is a simplified in-line view diagram illustrating a clamp assembly 2000 separate and apart from a pier member 2010 according to an embodiment of the present invention. As shown, the clamp assembly 2000 has a clamp housing member 2020 configured in a upright direction, which is a direction away from a direction of gravity. In an example, the clamp housing member 2020 comprises a lower region and an upper region. The lower region is coupled to a pier structure. The lower region has a thickness of material comprising bolt openings, which align to openings on an upper portion of the pier structure. Locking nuts and bolts are configured to hold the lower region of the clamp housing to the pier structure in an upright manner. At least a pair of openings are provided in each of the lower region of the clamp housing and the pier structure, as shown. Each of the openings in the lower region of the clamp housing is configured as a slot to allow for adjustment in a direction normal to the direction of the length of the pier structure. Each of the openings in the pier structure is configured as an elongated slot in the direction of the length of the pier structure to allow for adjustment in the same direction. Of course, there can be variations, where the directions of the slots are exchanged and/or combined.

In an example, the upper region comprises a spherical bearing device. The upper region has a tongue structure, which has an opening that houses the spherical bearing between a pair of plates, which hold the bearing in place. In an example, the spherical bearing allows for rotational, and movement in each of the three axis directions within a desirable range. Each of the plates is disposed within a recessed region on each side of the tongue structure. Each of the plates may include a fastener to hold such plate in place within the recessed region.

In an example, the clamp housing has a pair of openings and lower region that is designed like a heart like shape and a tongue region, which supports the spherical bearing assembly, as shown. Each lobe of the heart like shape acts as a stop for movement of the torque tube in a lateral rotational movement in either direction depending upon the spatial orientation of the lobe. Further details of the clamp housing can be found further below.

In an example, clamp assembly 2000 has a clam shell clamp member coupled to the spherical bearing and the clam shell clamp being suspended from the spherical bearing. That is, the clam shell clamp has a first side and a second side. Each side has an upper region comprising an opening. A pin is inserted through each of the openings, while an opening of the spherical bearing is provided as a third suspension region between each of the openings, as shown.

Each side of the clam shell is shaped to conform or couple to at least one side of a portion of the torque tube, as shown. Each side has one or more opens, which align to one or more openings on the portion of the torque tube. A pin or bolt is inserted through each of the openings to clamp the clam shell clamp to the portion of the torque tube and surround substantially an entirety of a peripheral region of the torque tube. The pin or bolt or pins or bolts also holds the torque tube in a fixed position relative to the clam shell clamp to prevent the torque tube from slipping and/or twisting within the clam shell clamp. Of course, there can be variations.

In an example, the spherical bearing allows for a construction tolerance, tracker movement, and acts as a bonding path of least resistance taking an electrical current to ground. The bonding path occurs from any of the modules, through the frame, to each of the clamp assembly, to one or more piers, and then to ground.

In an example, the clam shell apparatus comprising a first member 2031 operably coupled to a second member 2032 to hold a torque tube in place. In an example, the apparatus has a clamp housing operably coupled to the clam shell apparatus via a spherical bearing device such that the spherical bearing comprises an axis of rotation, which is different from a center of the torque tube.

Figure 21:
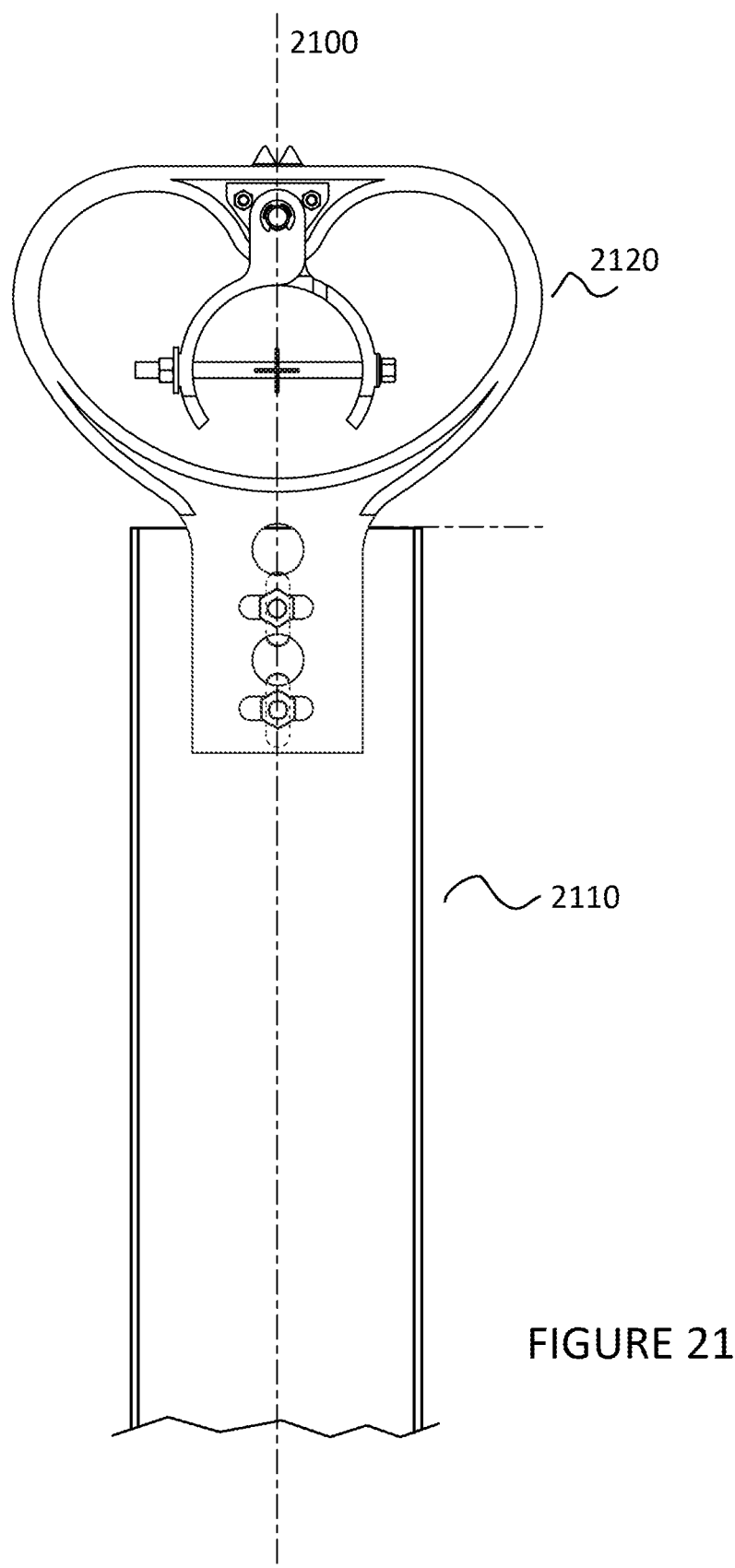
FIG. 21 is a simplified in-line view diagram illustrating a clamp assembly coupled to a pier member according to an embodiment of the present invention.

FIG. 21 is a simplified in-line view diagram illustrating a clamp assembly 2100 coupled to a pier member 2110 according to an embodiment of the present invention. As shown, a pair of nuts and bolts holds the pier structure to the clamp housing 2120 along the dotted line.

Figure 22:
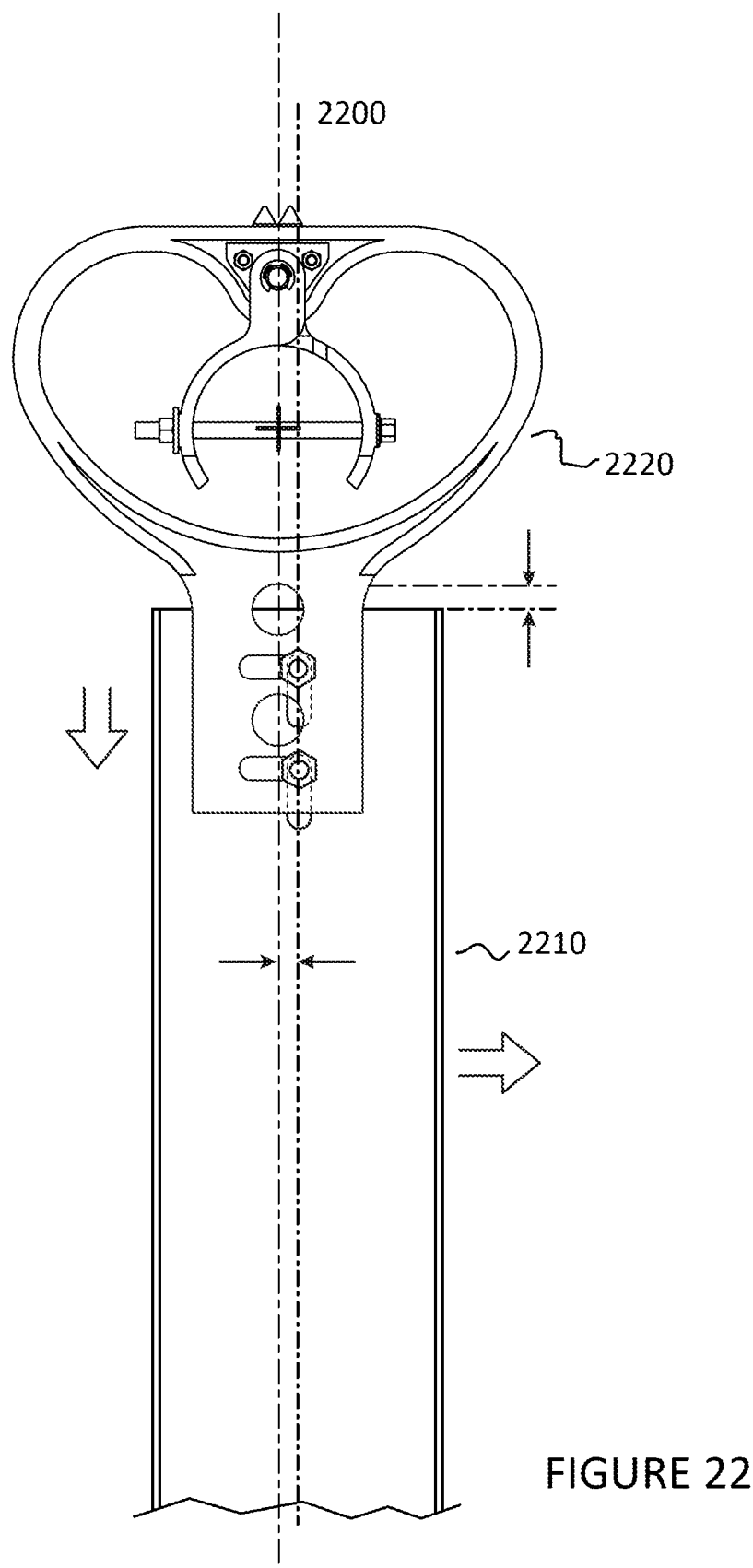
FIG. 22 is a simplified in-line view diagram illustrating a clamp assembly coupled to a pier member in a first orientation according to an embodiment of the present invention.

FIG. 22 is a simplified in-line view diagram illustrating a clamp assembly 2200 coupled to a pier member 2210 in a first orientation according to an embodiment of the present invention. As shown, the clamp housing 2220 can be off-set in a vertical and lateral manner using the slots in each of the pier and housing structure 2220 facing the in-line view of the torque tube.

Figure 23:
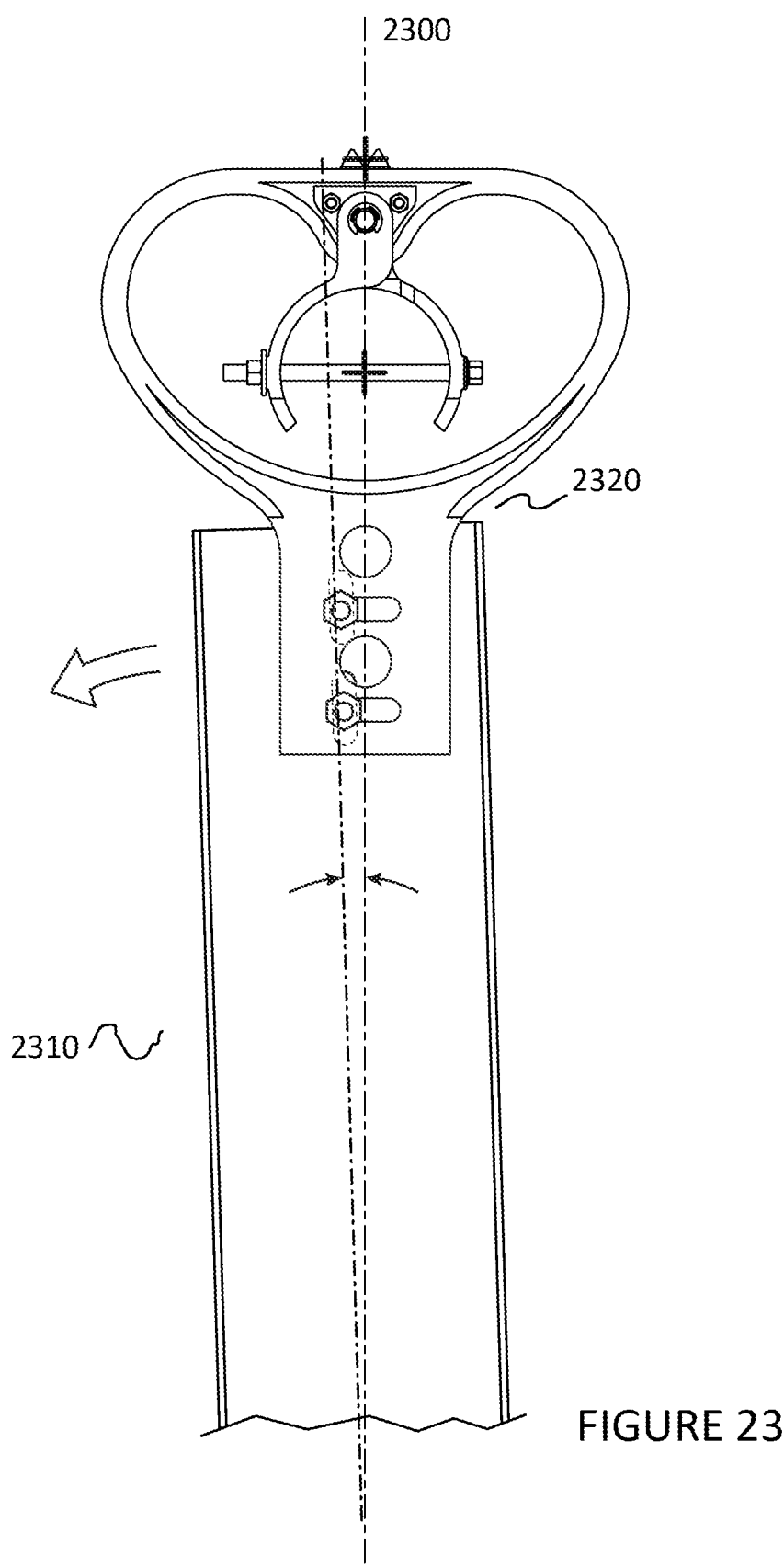
FIG. 23 is a simplified in-line view diagram illustrating a clamp assembly coupled to a pier member in a second orientation according to an embodiment of the present invention.

FIG. 23 is a simplified in-line view diagram illustrating a clamp assembly 2300 coupled to a pier member 2310 in a second orientation according to an embodiment of the present invention. As shown, the clamp housing 2320 can be adjusted in a rotational manner (in either direction) using the same slots in each of the pier and housing structures facing the in-line view of the torque tube.

Figure 24:
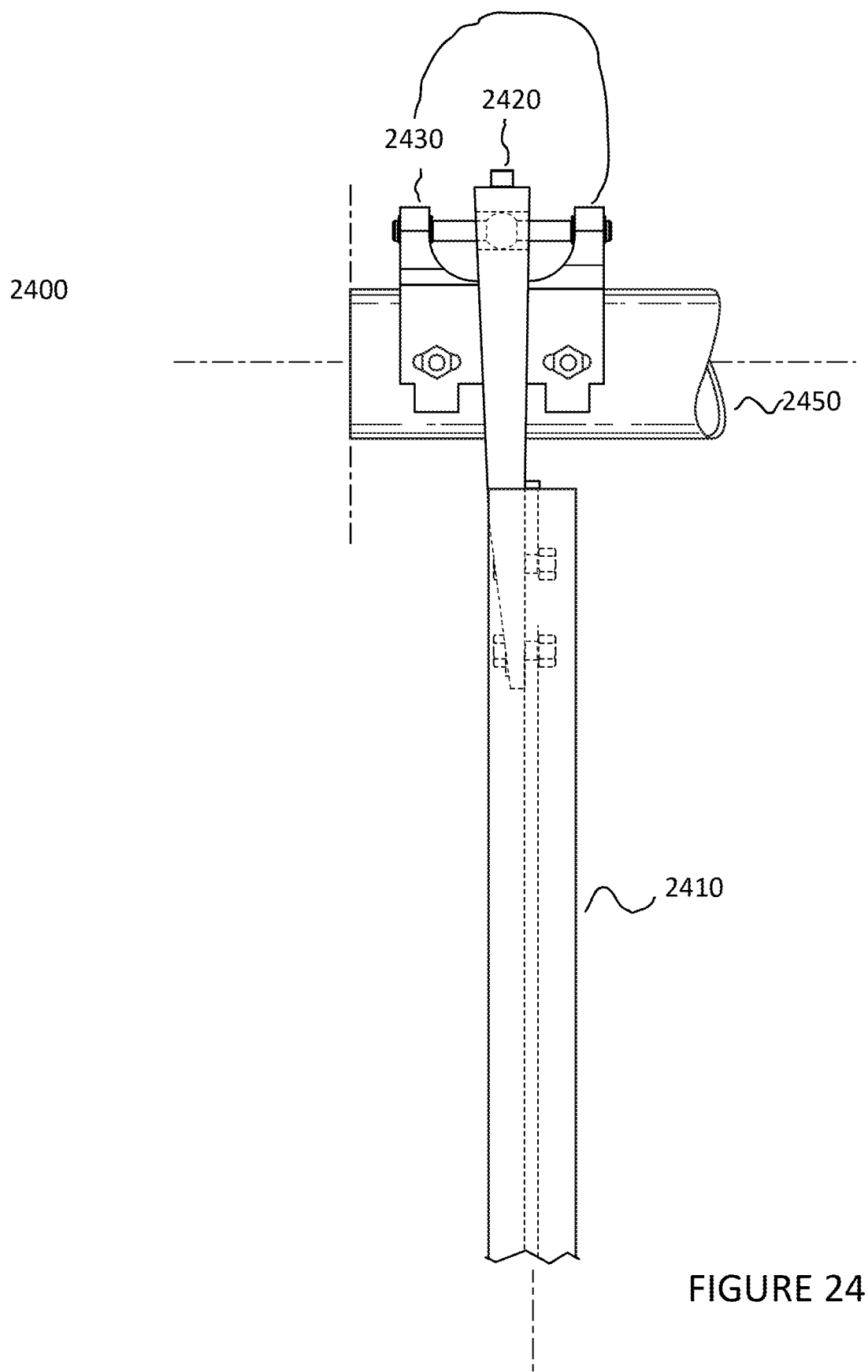
FIG. 24 is a simplified side view diagram illustrating a clamp assembly coupled to a pier member in a first orientation according to an embodiment of the present invention.

FIG. 24 is a simplified side view diagram illustrating a clamp assembly 2400 coupled to a pier member 2410 in a first orientation according to an embodiment of the present invention. As shown, the housing 2420 and pier structure, along with the torque tube 2450, are arranged in a normal orientation using the pins configuring the torque tube 2450 to the clam shell clamp member 2430. As shown, the clamp member 2430 has an elongated opening to allow each of the pins to be adjusted in place, which allows the relationship of the clamp and torque tube 2450 to be adjusted.

Figure 25:
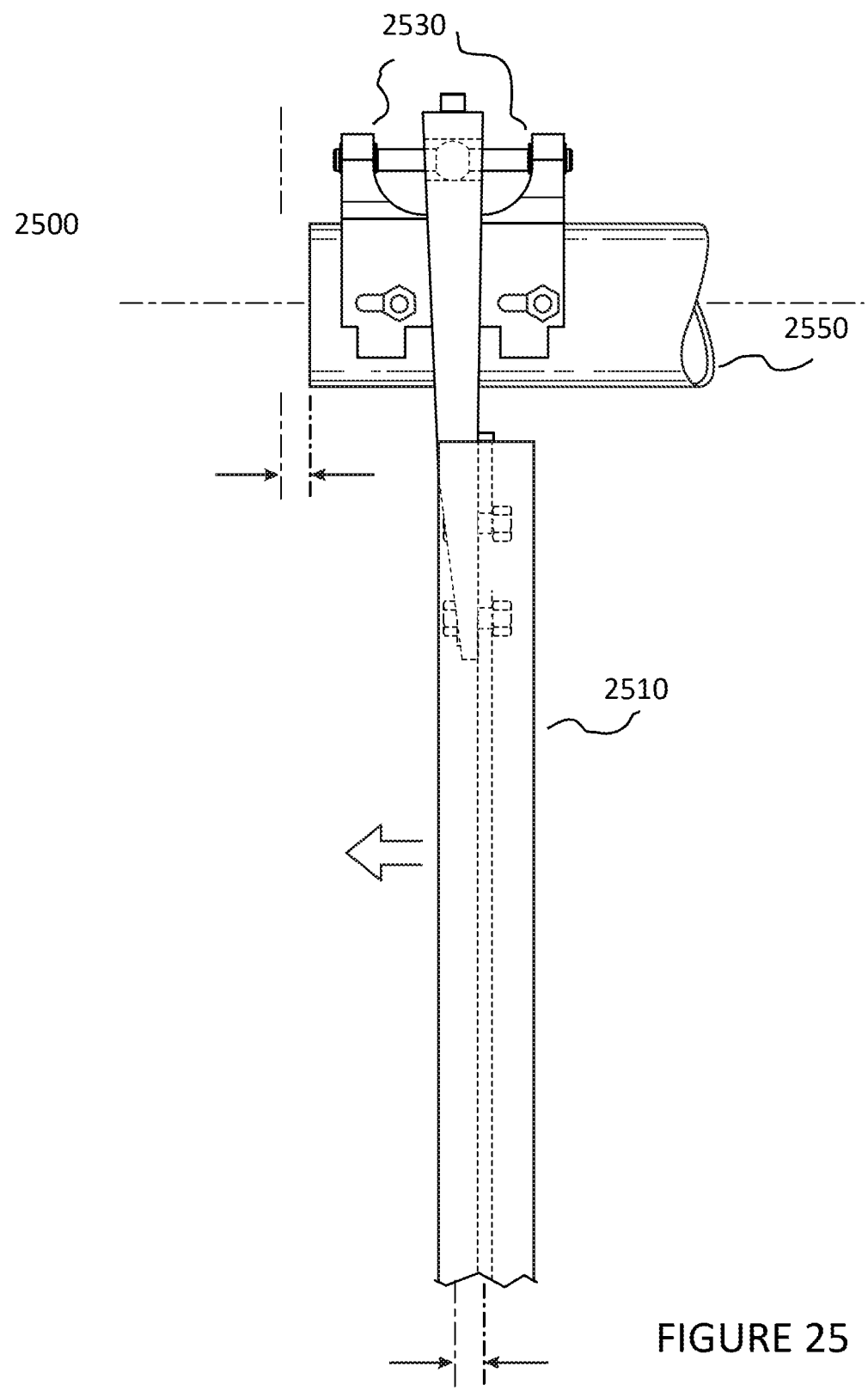
FIG. 25 is a simplified side view diagram illustrating a clamp assembly coupled to a pier member in a second orientation according to an embodiment of the present invention.

FIG. 25 is a simplified side view diagram illustrating a clamp assembly 2500 coupled to a pier member 2510 in a second orientation according to an embodiment of the present invention. As shown, the torque tube 2550 is shifted in an in-line direction (either way) using the slots in the clamp, while the torque tube 2550 has a smaller opening for the pin, which does not allow for any adjustment, in an example.

Figure 26:
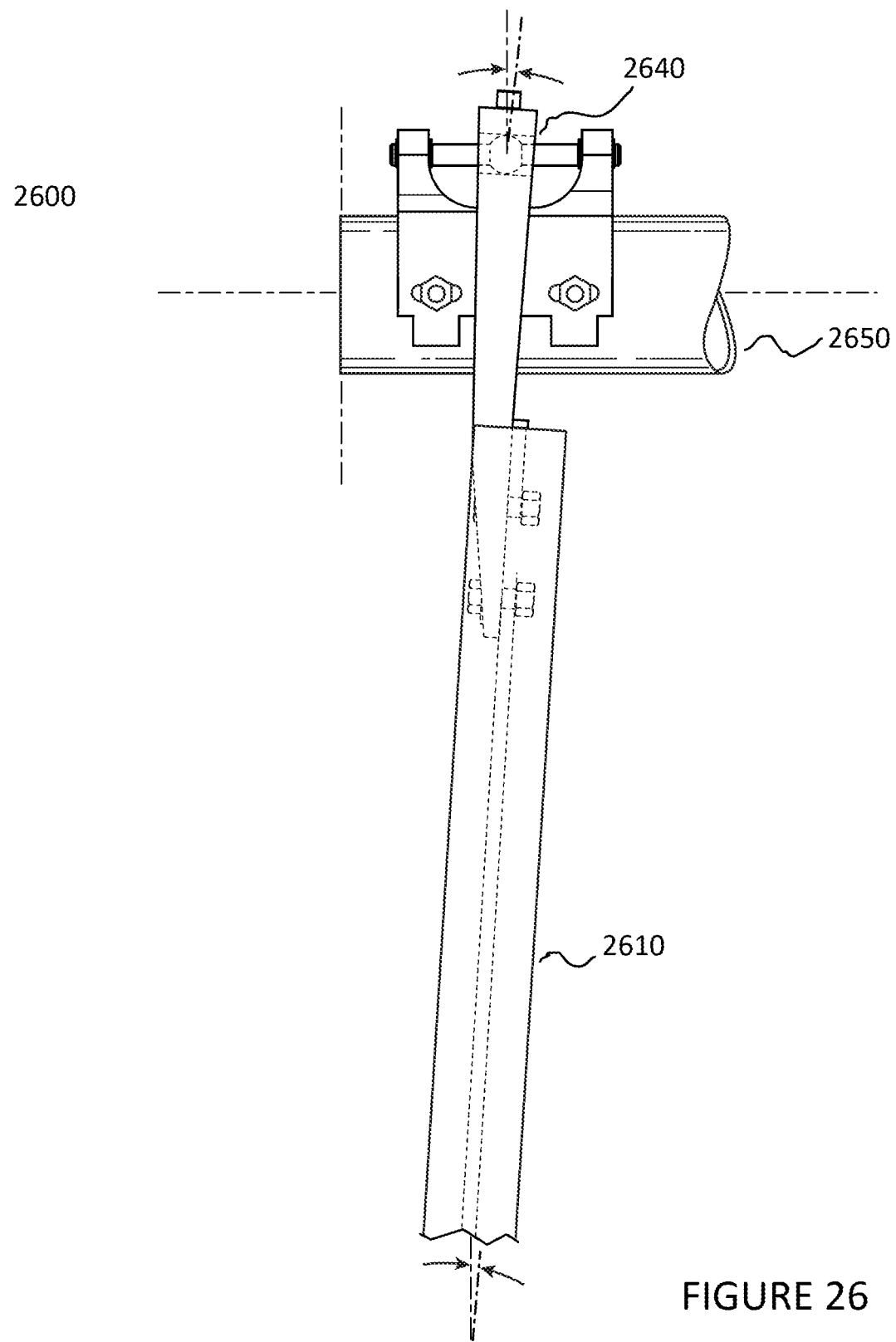
FIG. 26 is a simplified side view diagram illustrating a clamp assembly coupled to a pier member in a third orientation according to an embodiment of the present invention.

FIG. 26 is a simplified side view diagram illustrating a clamp assembly 2600 coupled to a pier member 2610 in a third orientation according to an embodiment of the present invention. As shown, the torque tube 2650 can be rotated or adjusted relative to the direction of the length of the pier using the movement of the spherical bearing assembly 2640, explained and shown. As shown, the torque tube 2650 is parallel to the direction of gravity in an example.

Figure 27:
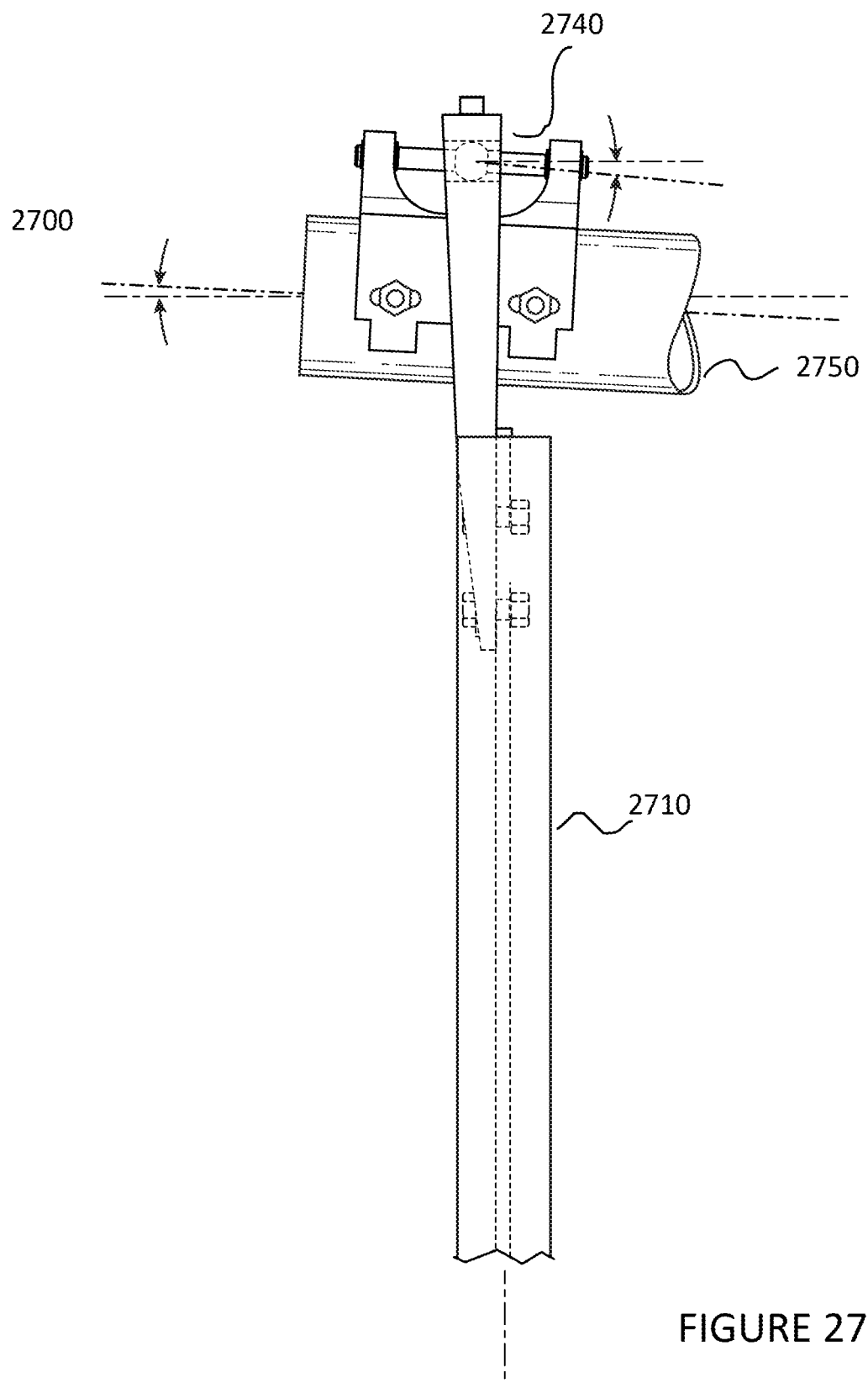
FIG. 27 is a simplified side view diagram illustrating a clamp assembly coupled to a pier member in a fourth orientation according to an embodiment of the present invention.

FIG. 27 is a simplified side view diagram illustrating a clamp assembly 2700 coupled to a pier member 2710 in a fourth orientation according to an embodiment of the present invention. As shown, the torque tube 2750 can be rotated or adjusted relative to the direction of the length of the pier using the movement of the spherical bearing assembly 2740, explained and shown. As shown, the torque tube 2750 is not parallel to the direction of gravity in an example.

Figure 28:
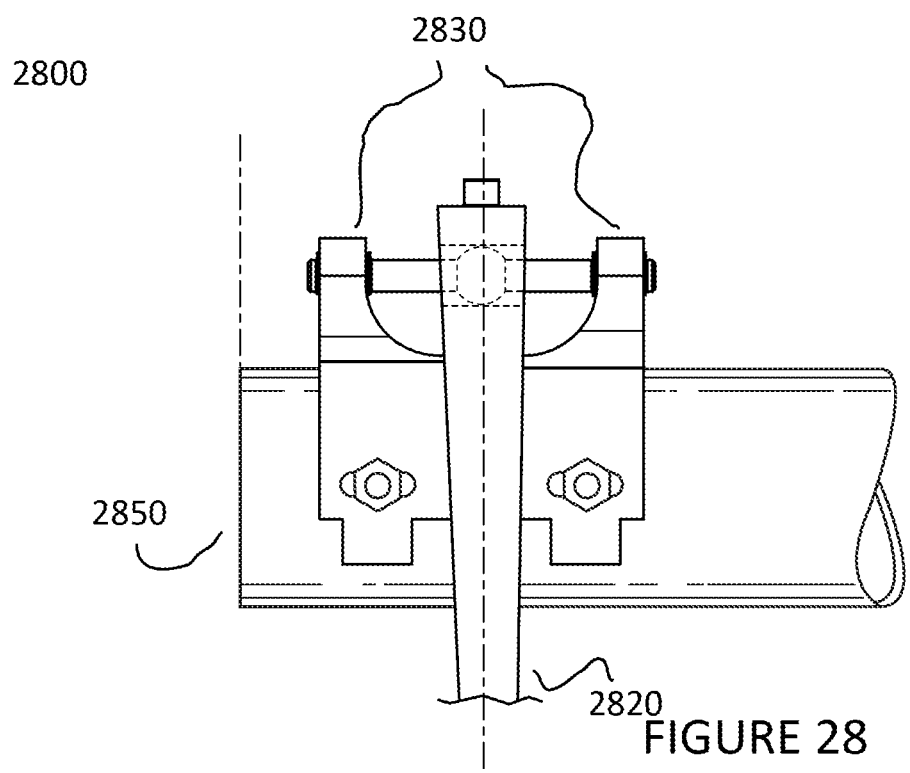
FIG. 28 is a simplified side view diagram illustrating a clamp assembly coupled to a pier member in a fifth orientation according to an embodiment of the present invention.

FIG. 28 is a simplified side view diagram illustrating a clamp assembly 2800 coupled to a pier member 2810 in a fifth orientation according to an embodiment of the present invention. As shown, the torque tube 2850, housing 2820, and clamp 2830 are aligned in this example.

Figure 29:
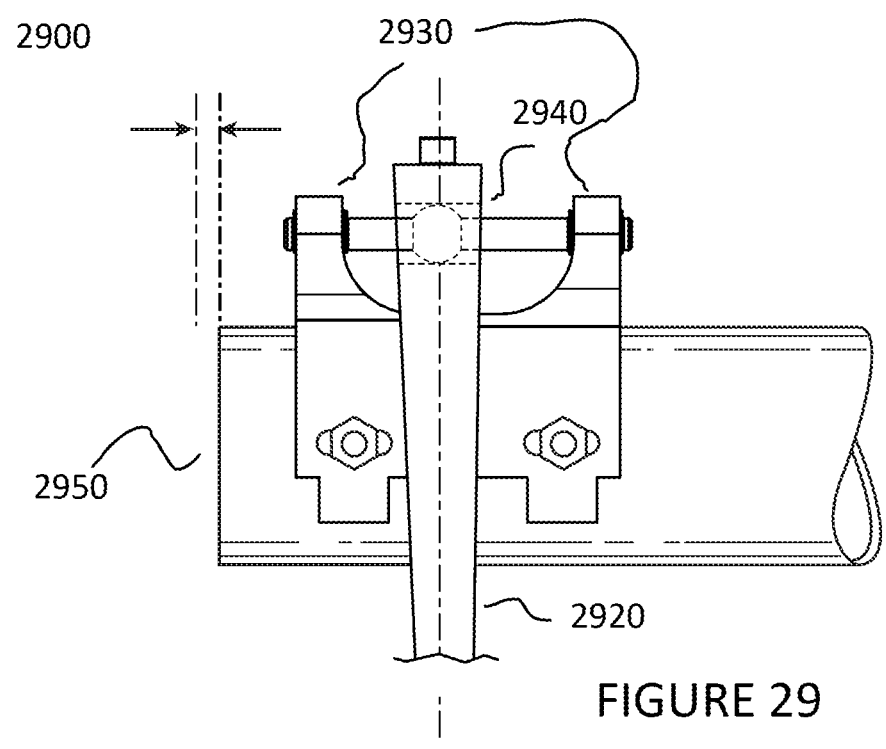
FIG. 29 is a simplified side view diagram illustrating a clamp assembly coupled to a pier member in a sixth orientation according to an embodiment of the present invention.

FIG. 29 is a simplified side view diagram illustrating a clamp assembly 2900 coupled to a pier member 2910 in a sixth orientation according to an embodiment of the present invention. As shown, the torque tube 2950, housing 2920, and clamp 2930 are aligned in this example. However, the position of the spherical bearing 2940 to pin has shifted in one direction by sliding the pin in the same direction, although the pin can be slid in the other opposite direction in other examples. In this example, pin to clamp arrangement can be moved along the pin from one spatial region to another spatial region.

Figure 30:
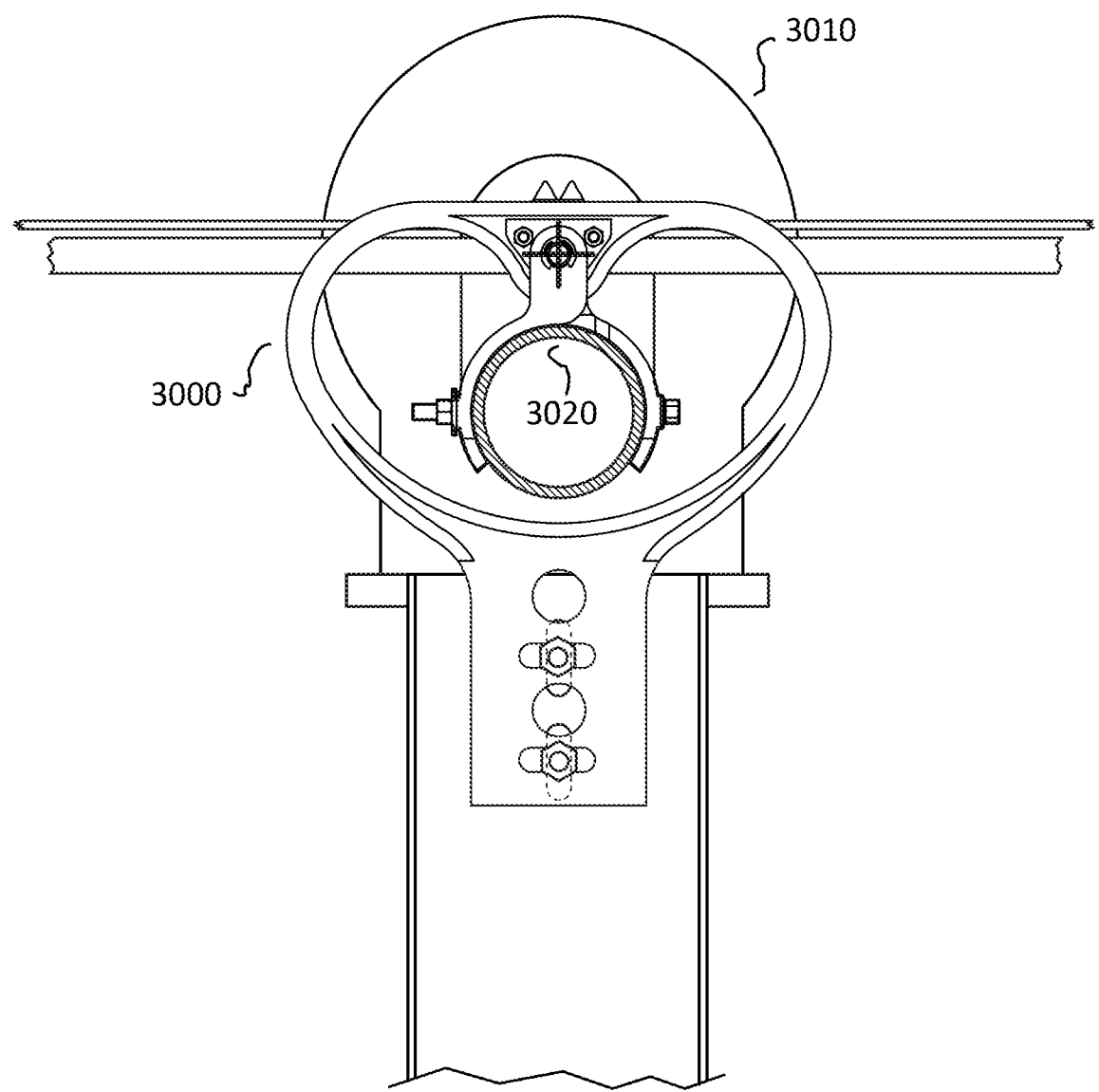
FIGS. 30 through 32 illustrate an in-line view of the clamp assembly and the drive assembly in multiple configurations according to embodiments of the present invention.
Figure 31:
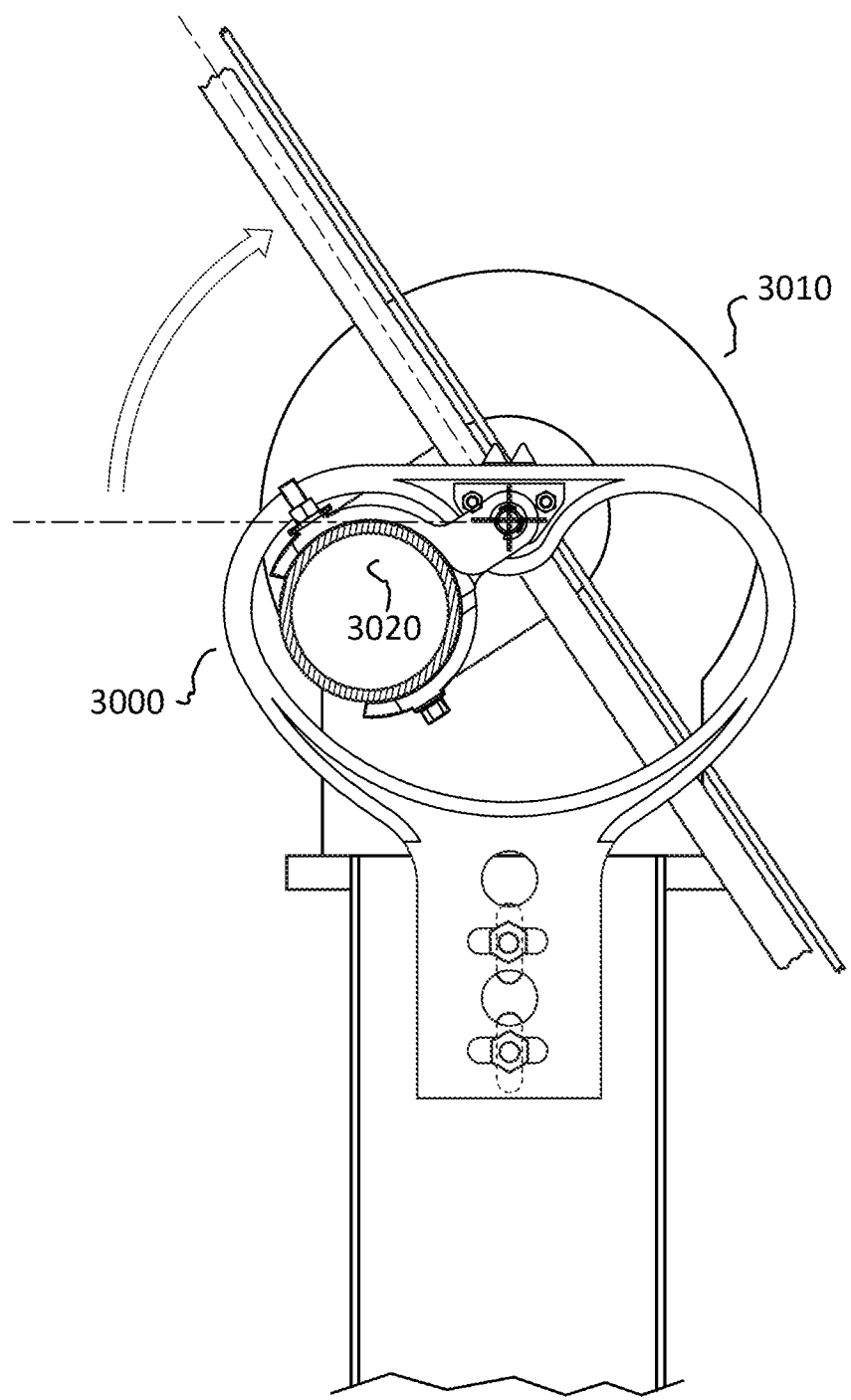
Figure 32:
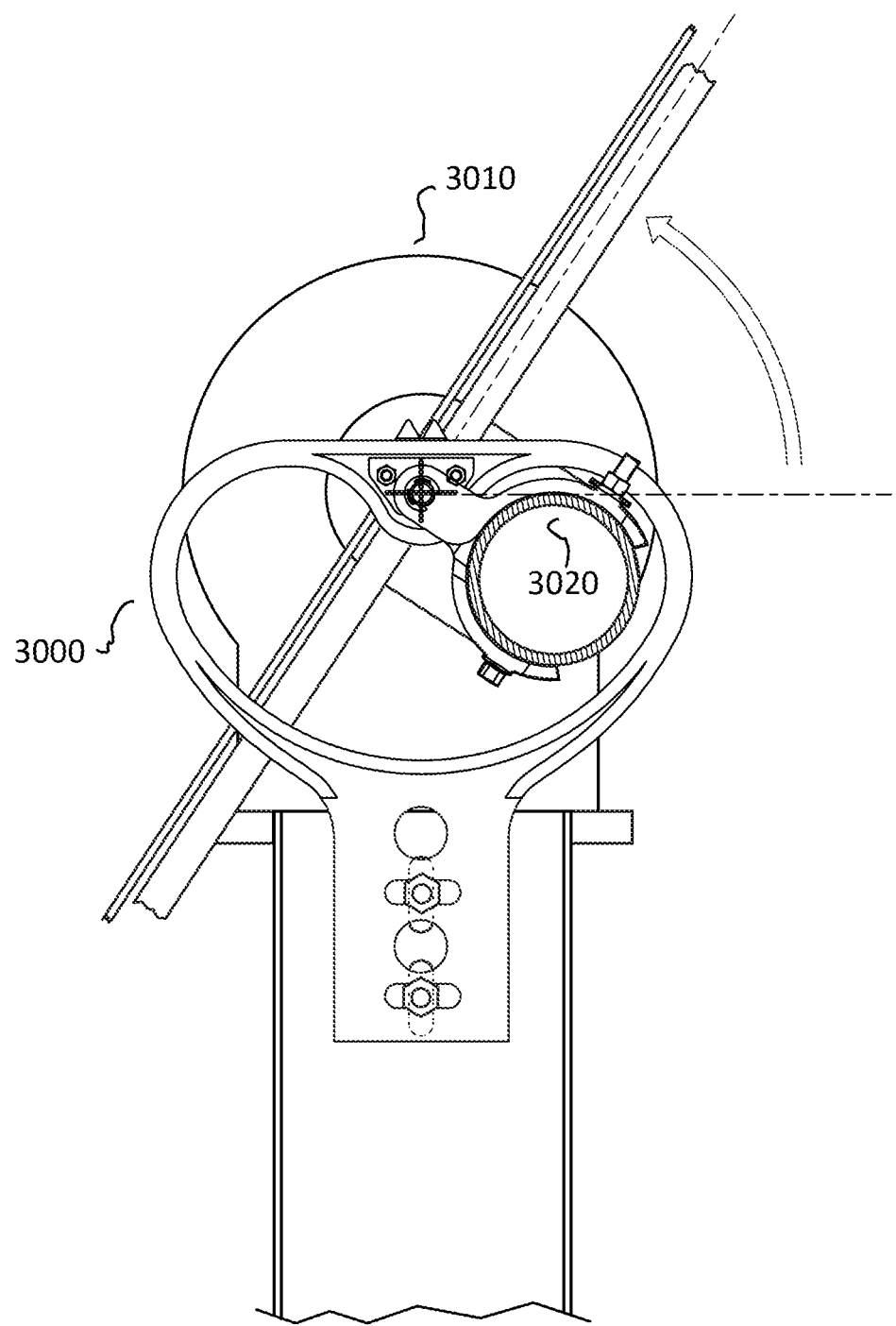

FIGS. 30 through 32 illustrate an in-line view of the clamp assembly 3000 and the drive assembly 3010 in multiple configurations according to embodiments of the present invention. As shown, the crank is in a lower position, which allows for the torque tube 3020 to be at its lowest position in an example. As the drive device moves the crank, the torque tube 3020 swings from the lowest position to an elevated position in a radial manner along a first direction or an elevated position in a radial manner along a second direction, as shown. As the torque tube 3020 rotates, the plurality of solar panels fixed to the torque tube also rotate along a path from a first spatial region to a second spatial region. As shown, each of the inner regions of the lobes acts as a stop for the torque tube 3020 or an override for the torque tube 3020. Of course, there can be other variations.

Figure 33:
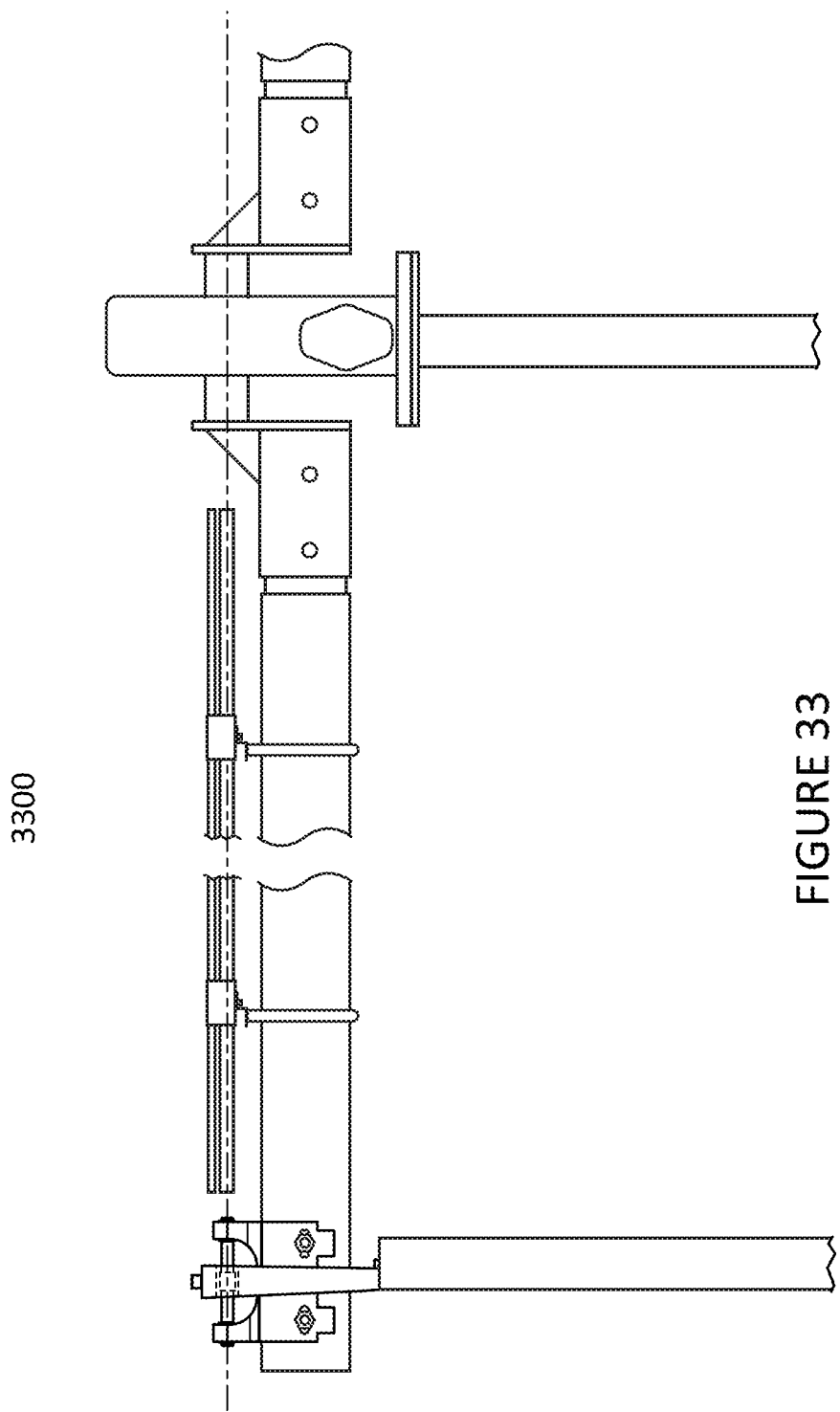
FIG. 33 is a side view diagram of the tracker apparatus according to an embodiment of the present invention.

FIG. 33 is a side view diagram of the tracker apparatus 3300 according to an embodiment of the present invention. As shown is a side view diagram of the torque tube, solar panels with frames, and clamp housing and structure.

FIGS. 34 and 35 are simplified side view diagrams of a torque tube 3400 according to an embodiment of the present invention. As shown, each of the torque tubes has a plurality of openings 3410 on each end for affixing to either the clamp or drive device cylinder. Each of the torque tubes also has a plurality of openings 3410 for clamps configured to hold the tube to a frame coupled to the plurality of solar modules.

Figure 36:
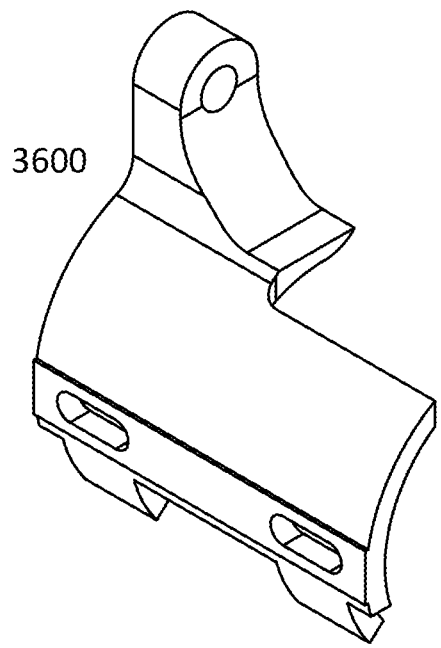
FIGS. 36, 37, and 38 are simplified perspective-view, side view, and front view diagrams of a clamp member according to an embodiment of the present invention.
Figure 37:
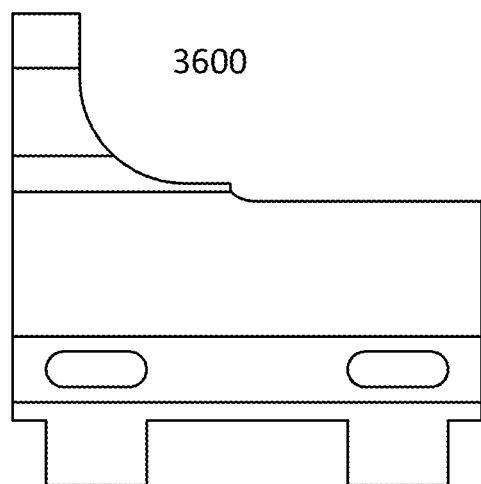
Figure 38:
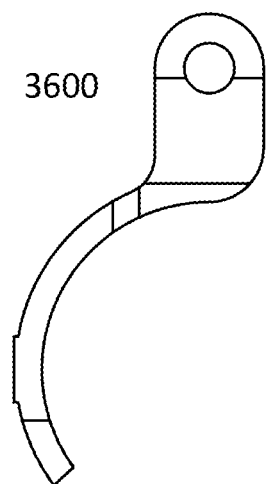

FIGS. 36, 37, and 38 are simplified perspective-view, side view, and front view diagrams of a clamp member or half clam shell member 3600 according to an embodiment of the present invention. As shown are the clam shell members, including pin opening to be coupled to the spherical bearing, and a plurality of slots for bolts to hold the torque tube in place and for adjustment.

Figure 39:
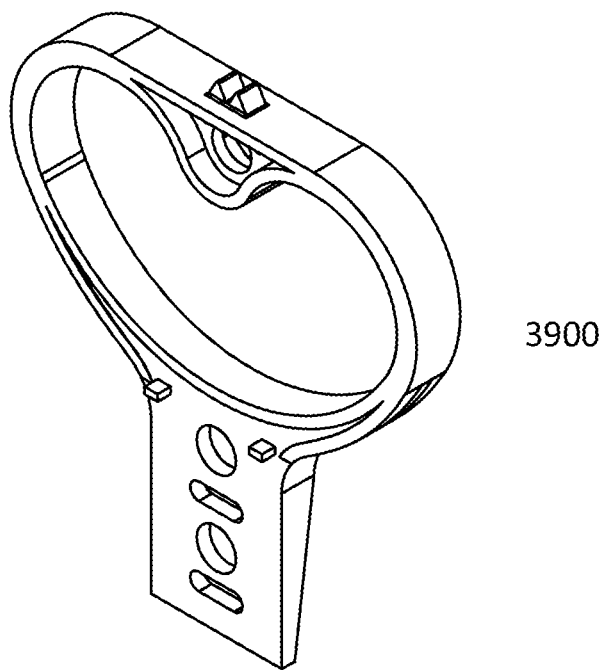
FIGS. 39 and 40 are simplified perspective-view and side view diagrams of a clamp housing according to an embodiment of the present invention.
Figure 40:
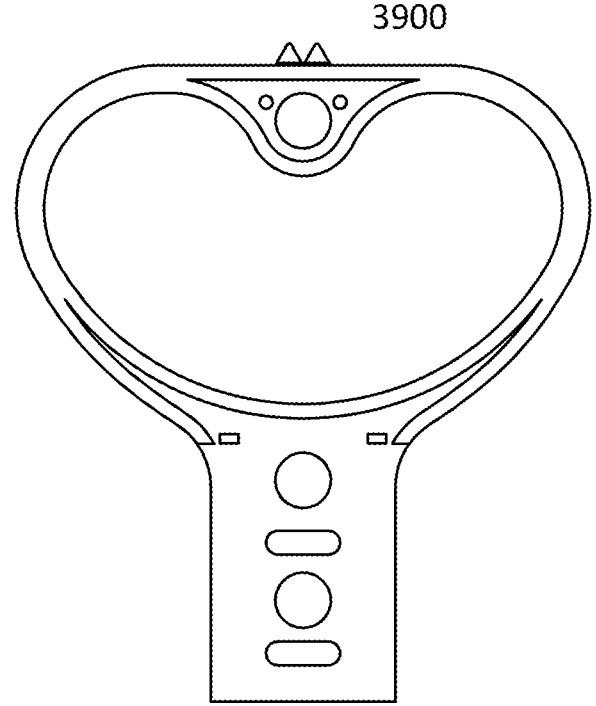
Figure 41:
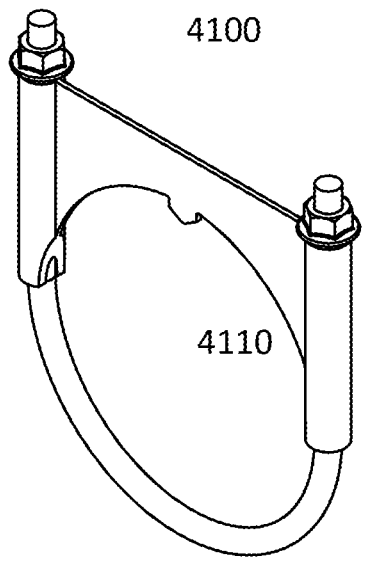
FIGS. 41, 42, 43, and 44 are simplified diagrams of component(s) for a U-bolt member according to an embodiment of the present invention.
Figure 42:
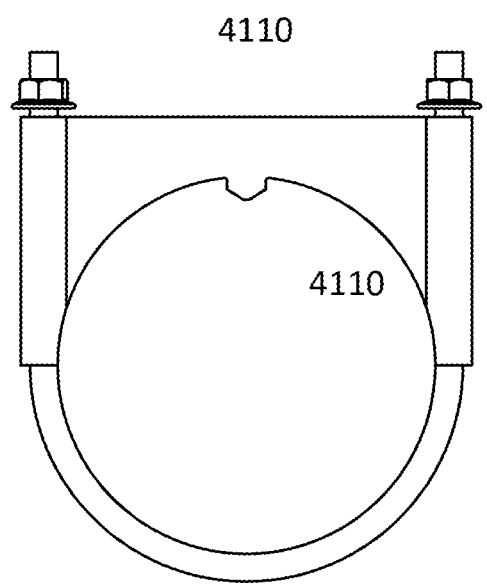
Figure 43:
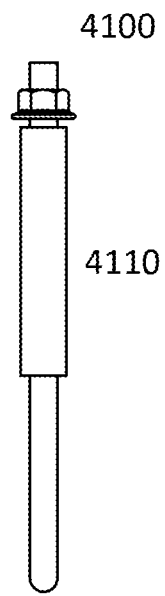
Figure 44:
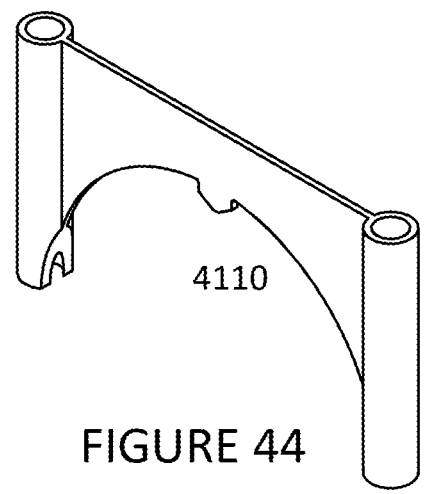

FIGS. 39 and 40 are simplified perspective-view and side view diagrams of a clamp housing 3900 according to an embodiment of the present invention. As shown is the clamp housing 3900 configured as a heart like shape, with tongue.

The tongue has a recessed region, and an opening or slot for the spherical bearing. The housing 3900 also has a member to be coupled to the pier structure.

FIGS. 41, 42, 43, and 44 are simplified diagrams of component(s) for a U-bolt member 4100 according to an embodiment of the present invention. As shown is a U-bolt member 4100 and a pair of nuts to secure the U-bolt. The components also includes an upper clamp 4110 with a protrusion to be coupled to a notch or opening in the torque tube to present any movement between the torque tube and U-bolt member 4100. That is, the protrusion acts as a stop to hold the U-bolt in place.

Figure 45:
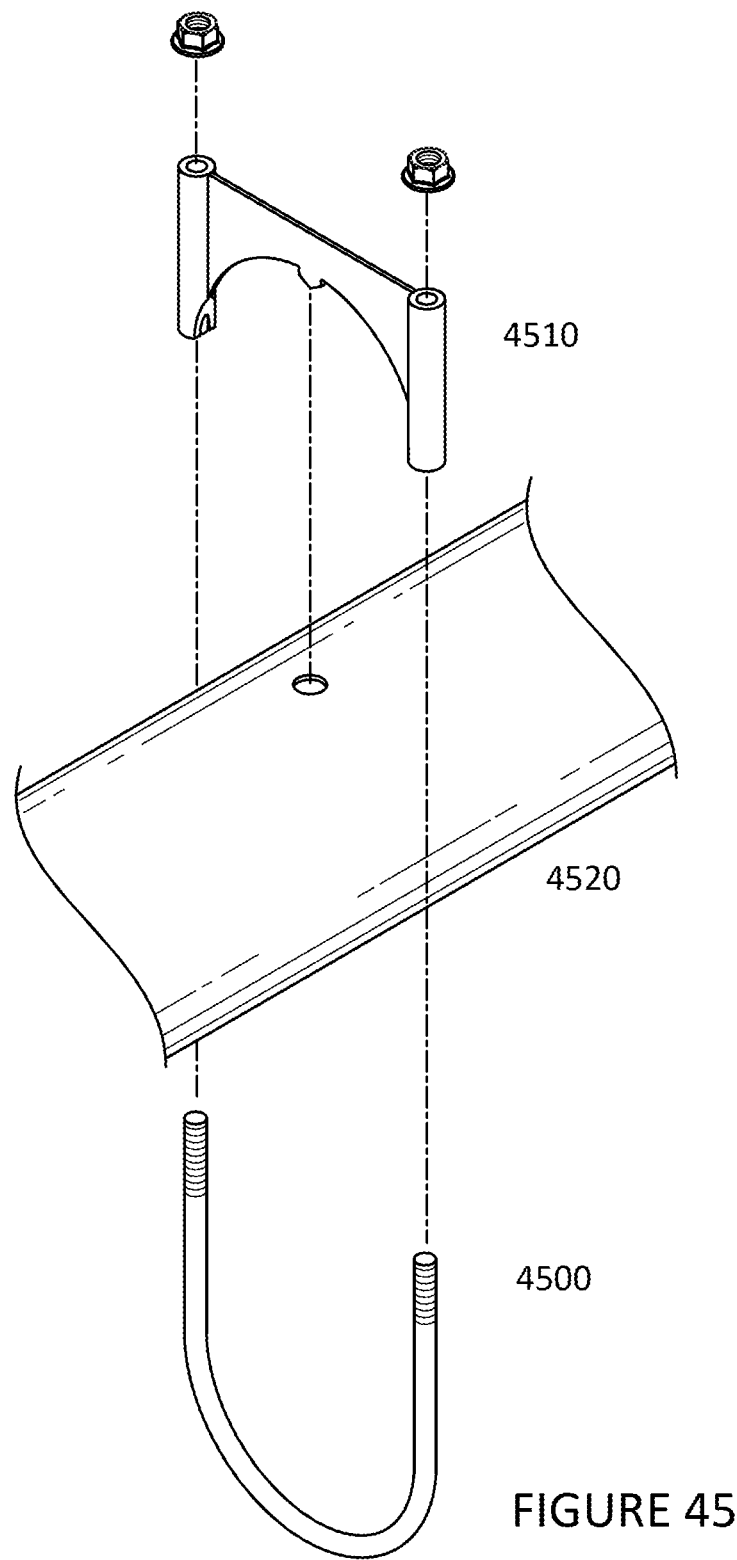
FIGS. 45, 46, and 47 are simplified diagrams illustrating a method of configuring a U-bolt member to a torque tube according to an embodiment of the present invention.
Figure 46:
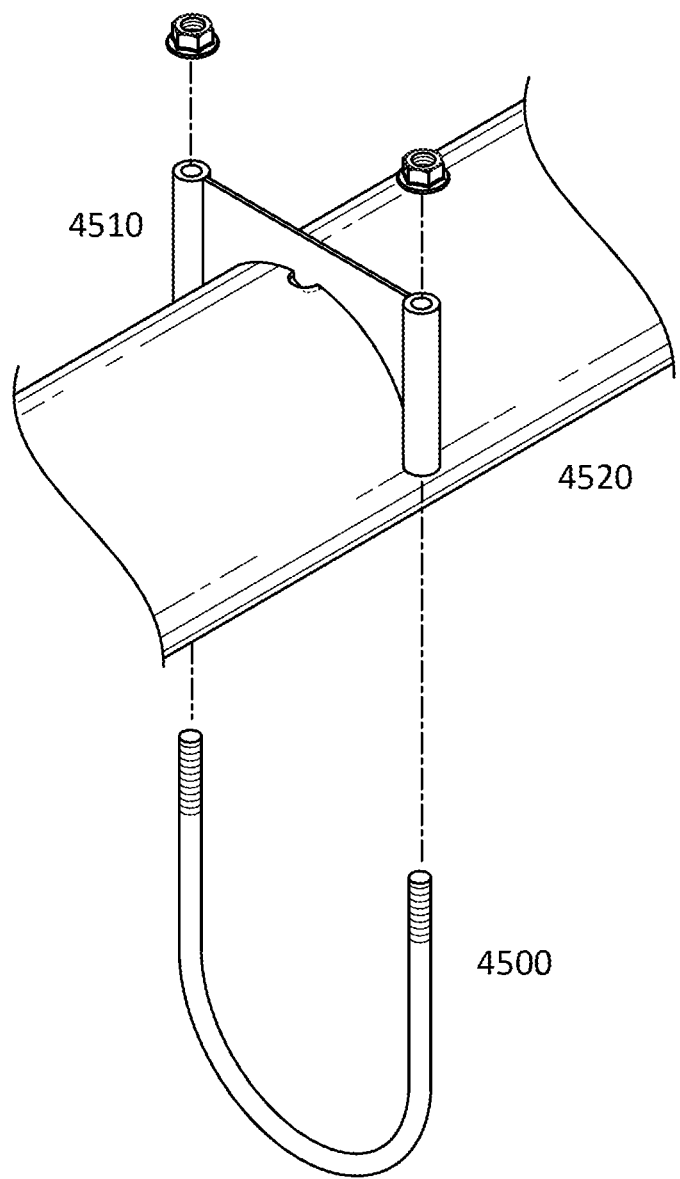
Figure 47:
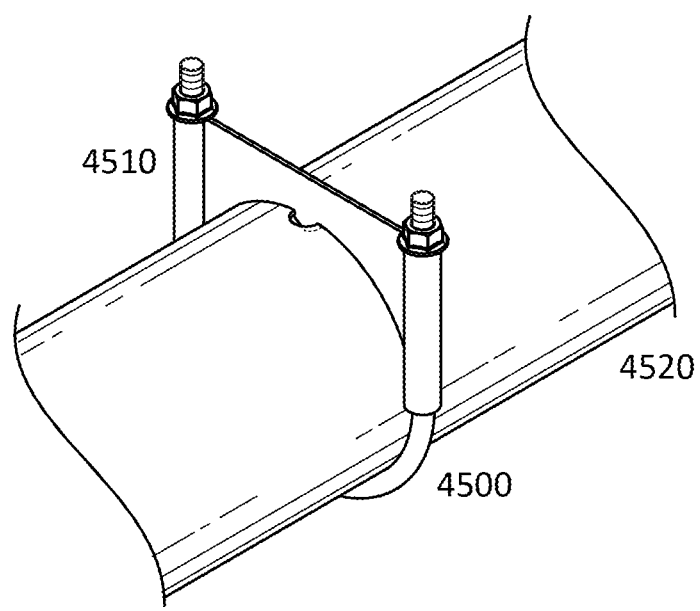

FIGS. 45, 46, and 47 are simplified diagrams illustrating a method of configuring a U-bolt member to a torque tube 4520 according to an embodiment of the present invention. As shown are U-bolt coupled to a periphery of the torque tube 4520. The clamp member 4510 including protrusion, which has an thinner portion and thicker portion, coupled to a notch in the torque tube. A pair of bolts fastens and secures the clamp member 4510 and U-bolt 4500 in place to hold the frame structure, which couples to the plurality of solar modules.

FIGS. 48 and 49 illustrate various views of a tracker apparatus 4800 according to an embodiment of the present invention. As shown, the torque tube and tracker apparatus 4800 are in a normal rest position.

Figures 50, 51:
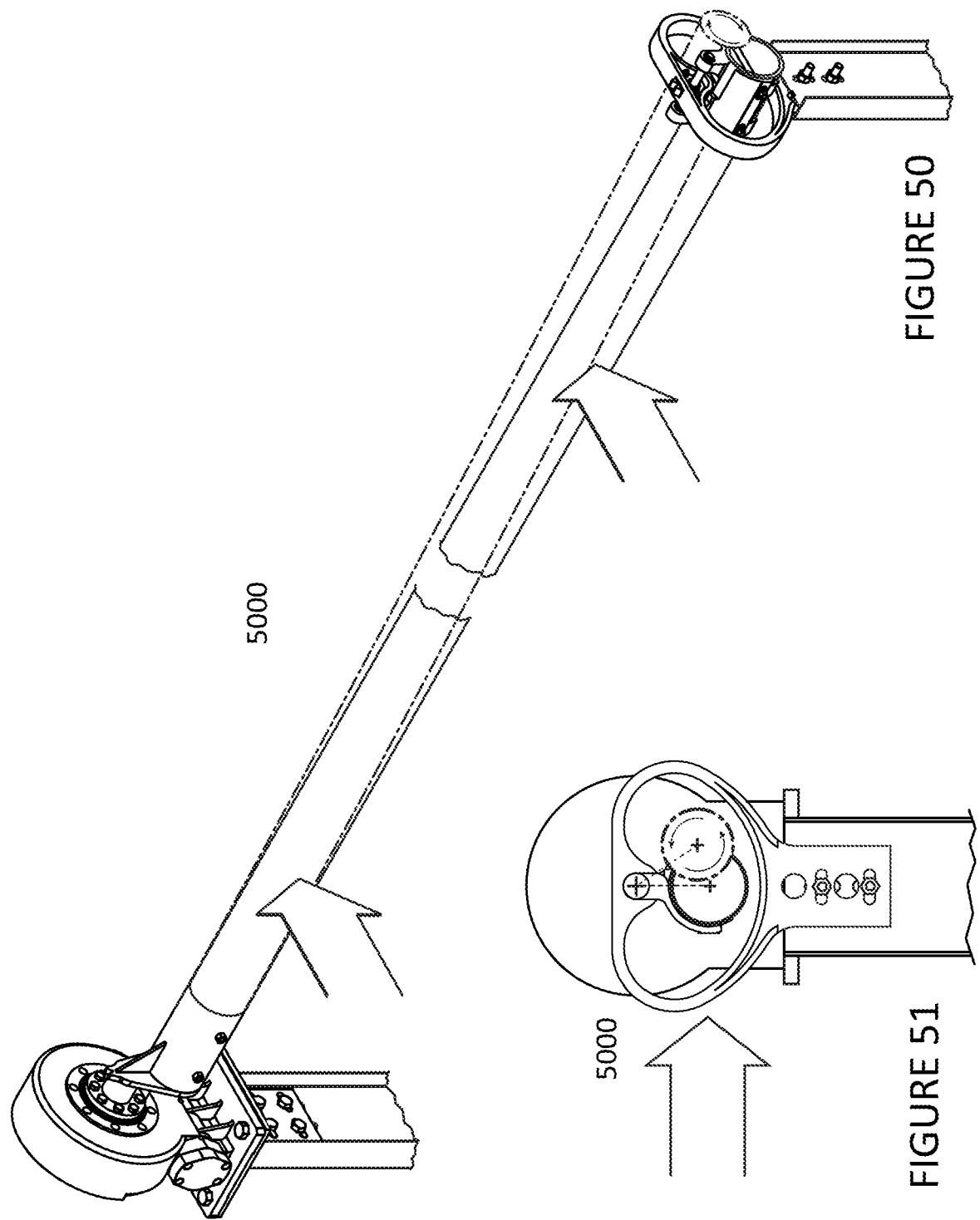
FIGS. 50 and 51 illustrate views of a tracker apparatus according to an embodiment of the present invention.

FIGS. 50 and 51 illustrate views of a tracker apparatus 5000 according to an embodiment of the present invention. As shown, a lateral force is provided against a direction normal to the length of the torque tube, which causes one end of the torque tube to move in the lateral direction, while the other end remains fixed in an example.

Figure 52:
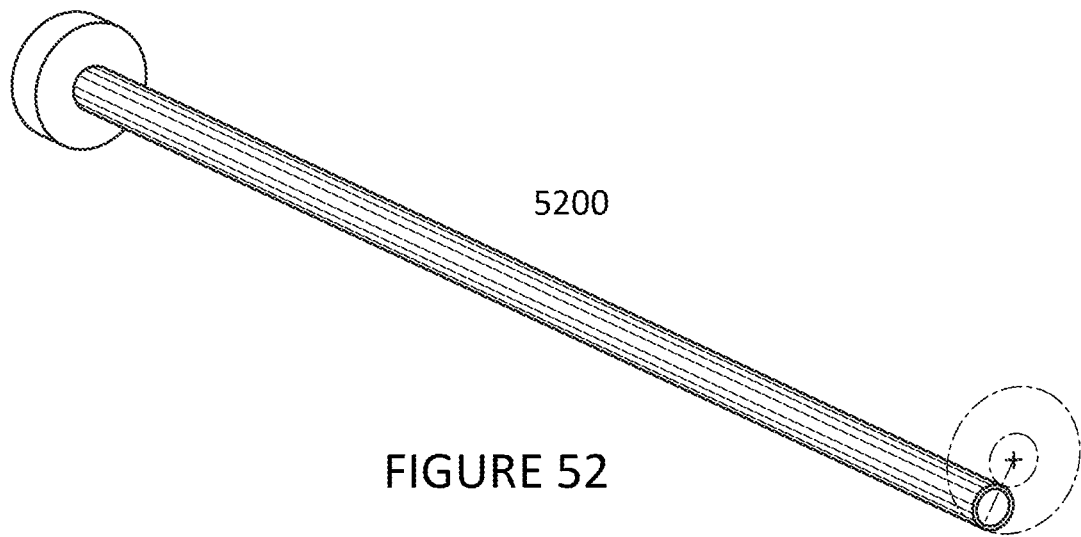
FIGS. 52 and 53 illustrate an illustration of a torque tube according to an embodiment of the present invention.
Figure 53:
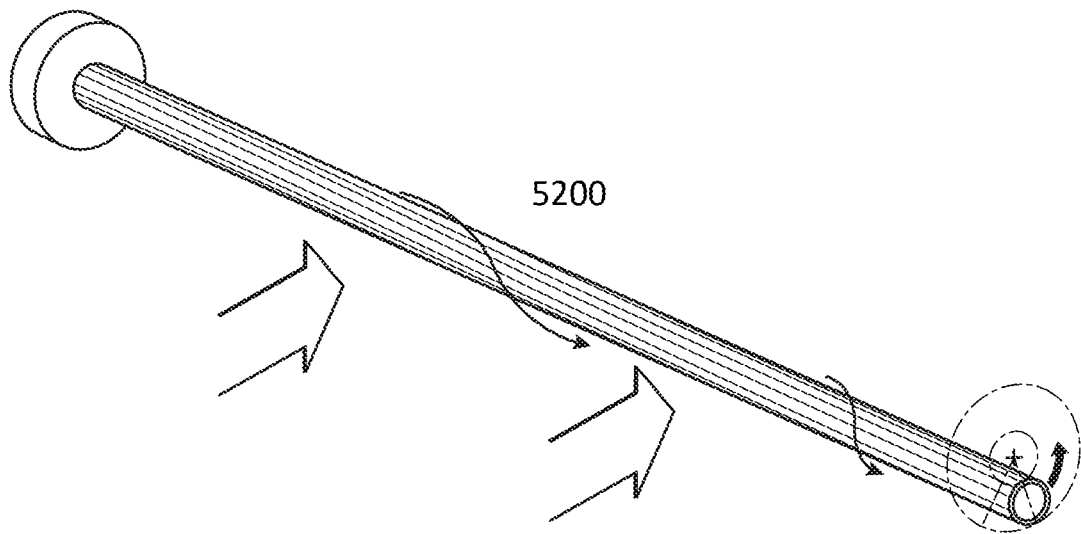

FIGS. 52 and 53 illustrate an illustration of a torque tube 5200 according to an embodiment of the present invention. As shown, the torque tube 5200 rotates and swings in a radial manner upon being subjected to the lateral force, in an example. The torque tube 5200 stops against an inner side of one of the lobes of the clamp housing.

Figure 54:
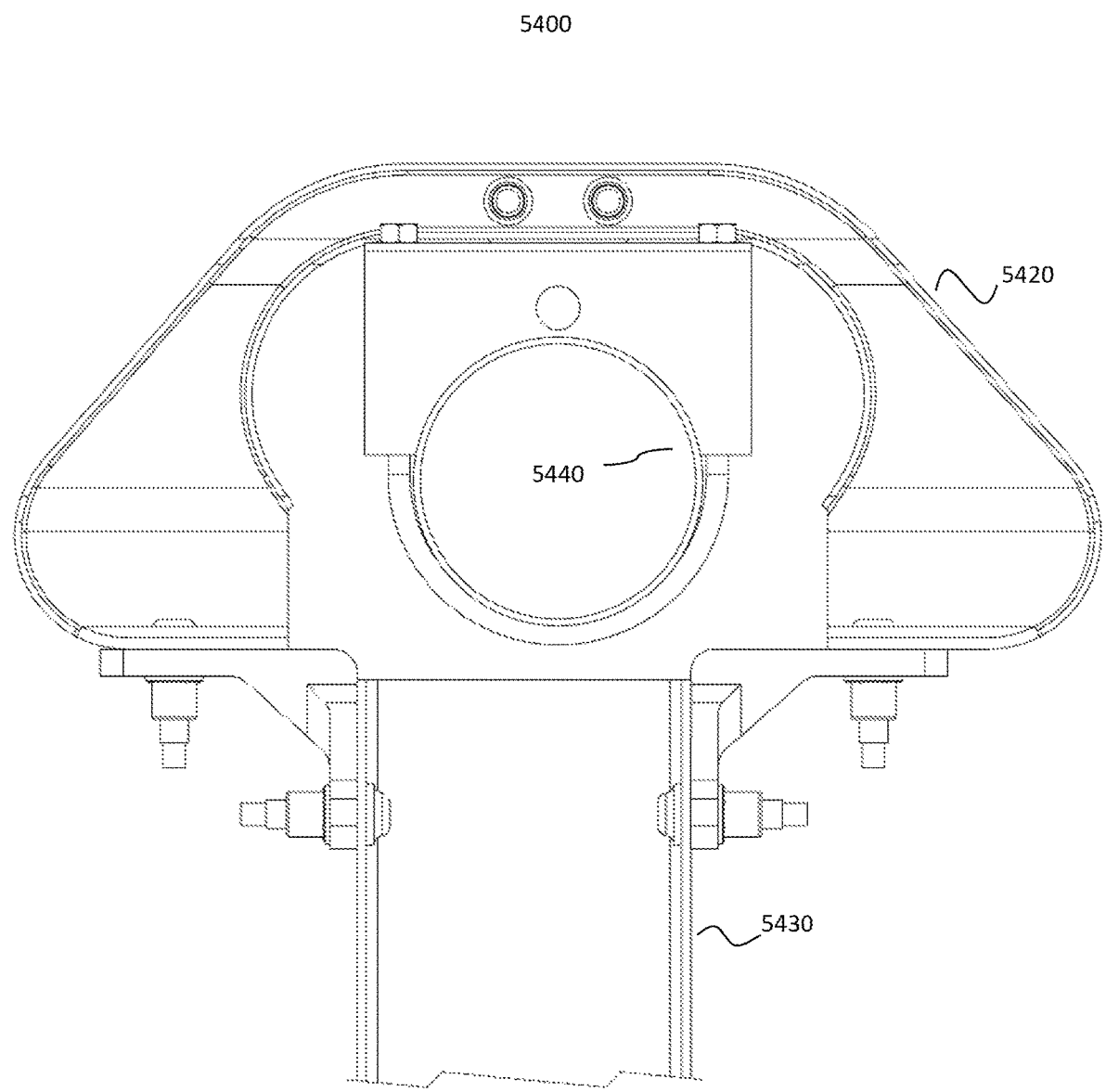
FIG. 54 is a front view diagram of a clamp assembly according to an example of the present invention.
Figure 55A:
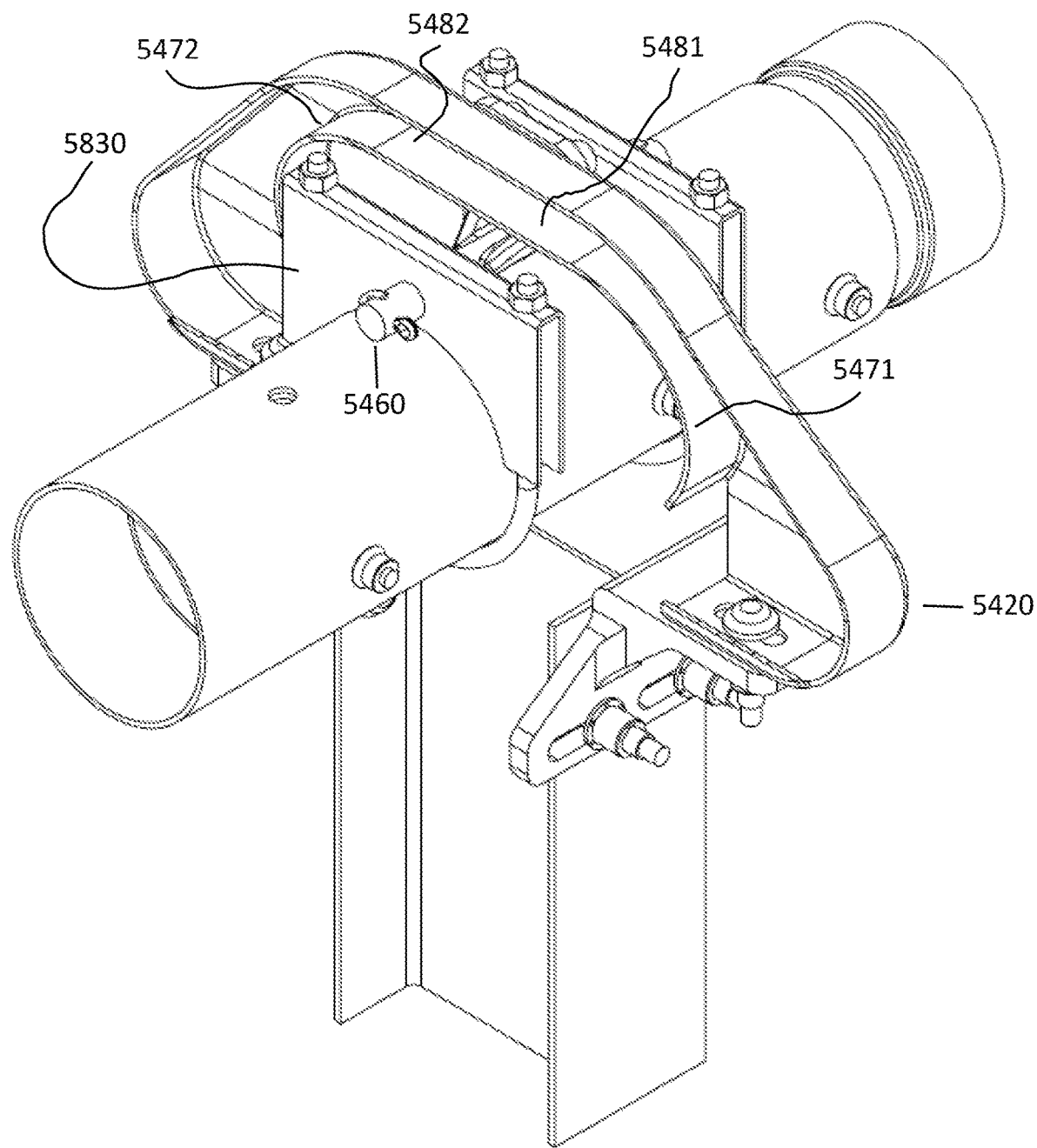
FIGS. 55A, 55B, 55C, 55D, and 55E illustrates various views of the clamp assembly including a perspective view in a central position, a perspective view in a first stop position, a perspective view in a second stop position, a side-view, and a top view in examples of the present invention.
Figure 55B:
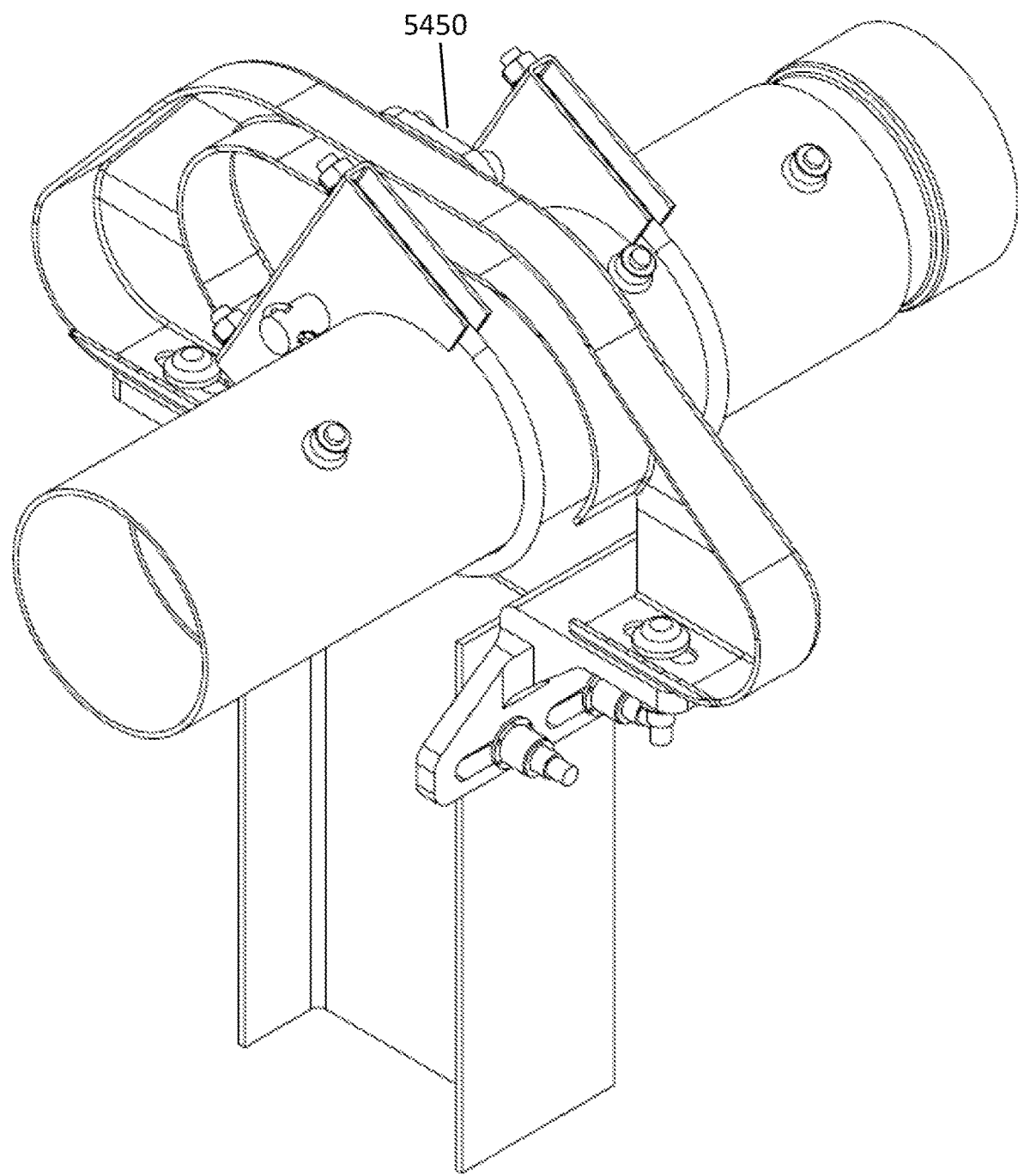
Figure 55C:
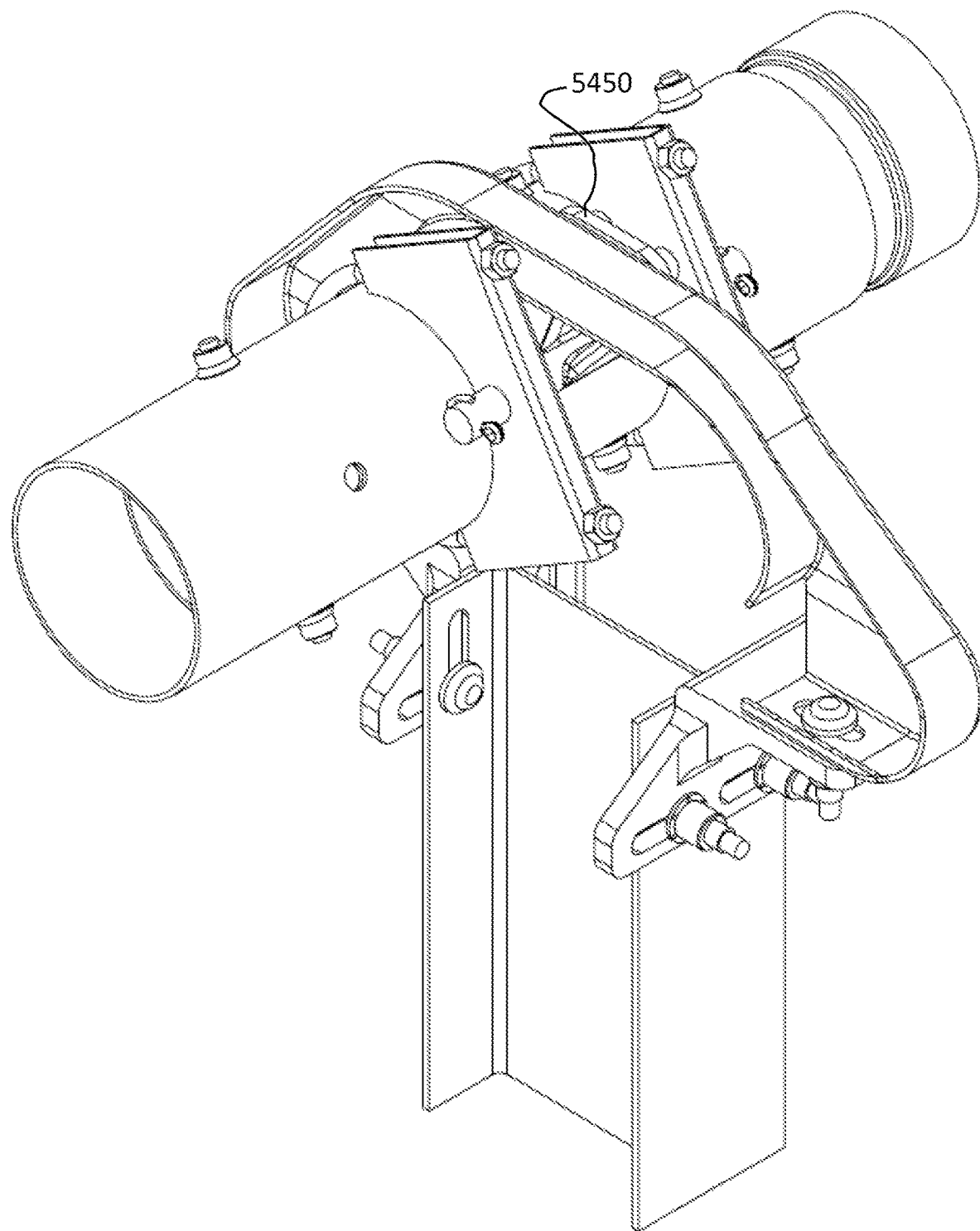
Figure 55D:
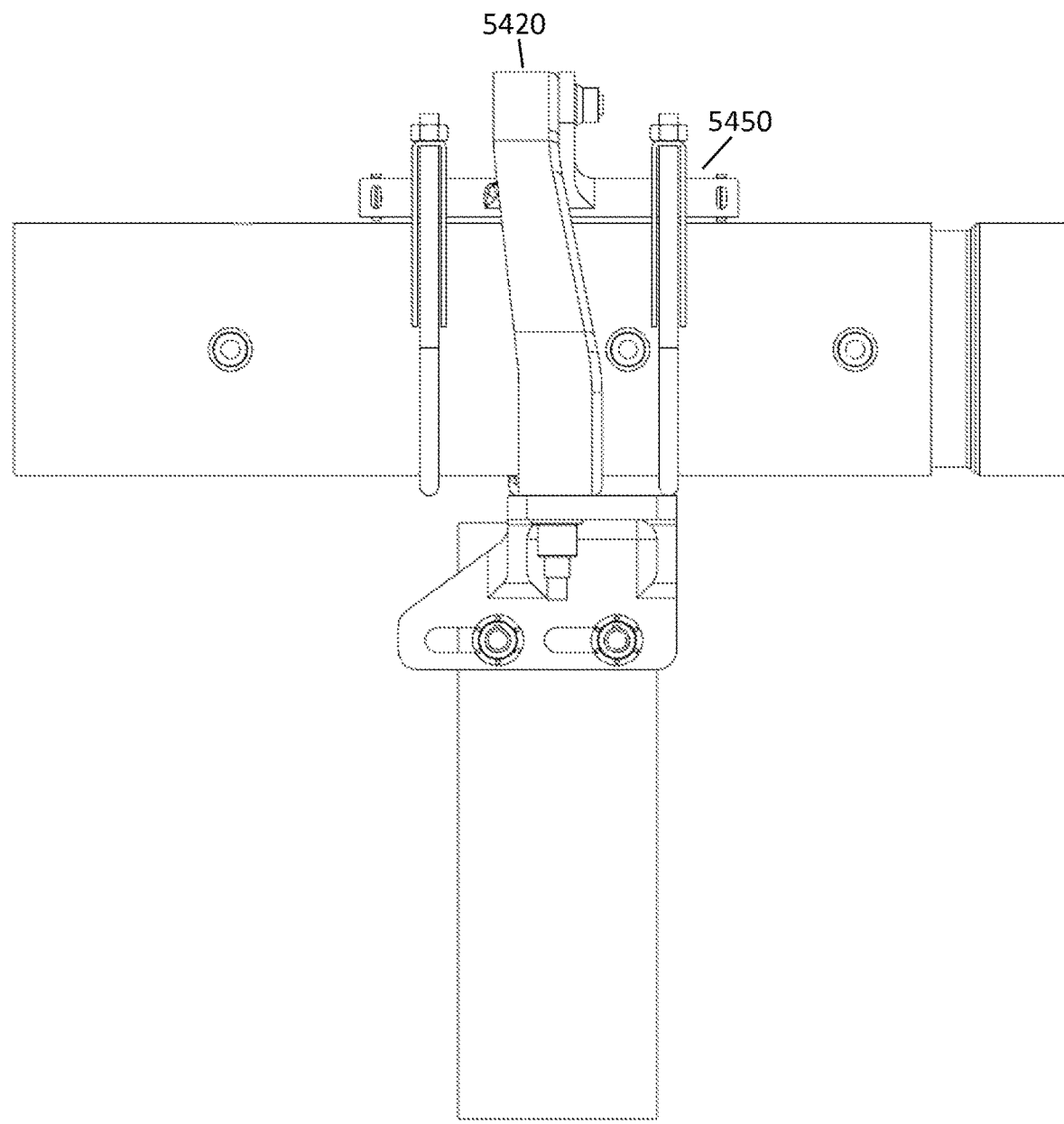
Figure 55E:
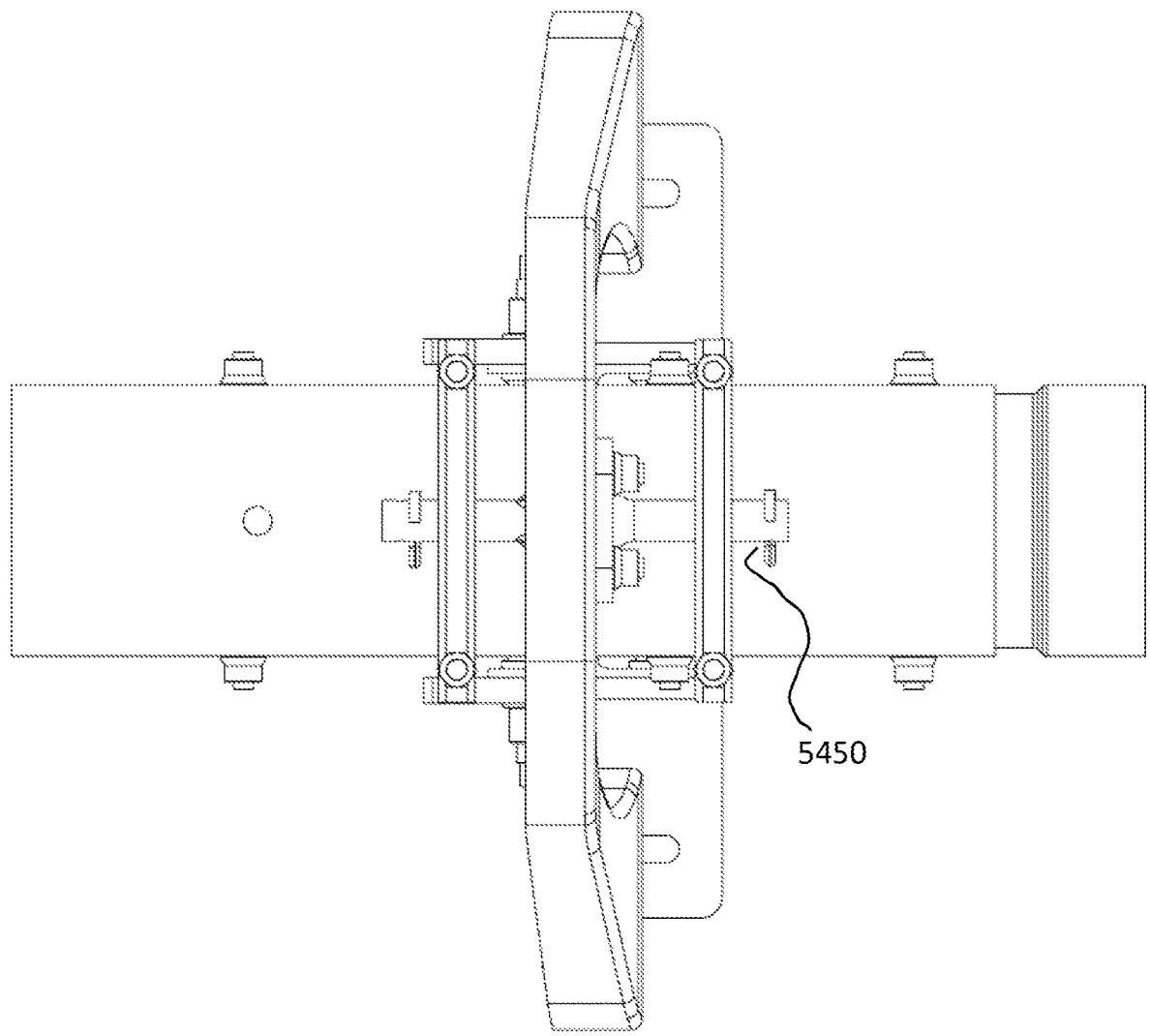

FIG. 54 is a front view diagram of a clamp assembly 5400 according to an example of the present invention. As shown is a front view of a solar tracker apparatus, and in particular a clamp assembly 5400 configured for a torque tube 5440. In an example, the clamp assembly 5400 has a support structure configured as a frame 5420 having configured by a first anchoring region and a second anchoring region. As shown, the first anchoring region is coupled to a pier support 5430 using a nut and bolt fastener. The second anchoring region is coupled to a pier support 5430 using a nut and bolt fastener. In an example, the frame structure is shaped as a loop that is symmetric and can also be non-symmetric in other examples. As shown, the support structure being configured from a thickness of metal material, such as high grade steel or other metal material with sufficient strength. In an example, the support structure is stamped from the thickness of metal material. In an example, the support structure is configured from a stamped steel comprising a Q345 steel or other suitable material. In an example, the support structure being configured in an upright manner, and has a major plane region configured within the frame structure. As shown, the major plane region has an opening to allow the torque tube 5440 and related support members to move within the opening.

In an example, the torque tube 5440 is coupled to a pivot device 5450 configured on the support structure. In an example, the torque tube 5440 suspending on the pivot device 5450 and aligned within the opening of the support and configured to be normal to the plane region. In an example, the torque tube 5440 is configured on the pivot device 5450 to move about an arc in a first direction or in a second direction such that the first direction is in a direction opposite to the second direction. As mentioned, the support structure comprises the frame 5420 configured with the opening. As shown, the frame 5420 has a first stop region 5471 within a first inner region of the frame 5420 and a second stop region 5472 within a second inner region of the frame 5420 and configured to allow the torque tube 5440 to swing in a first direction within the opening and stop against the first stop region 5471 and swing in a second direction within the opening and stop against the second stop region 5472. In an example, the first stop region 5471 comprises a first flat region 5481 and the second stop region 5472 comprises a second flat region 5482 such that the first flat region 5481 and the second flat region 5482 are coupled to each other via a continuous length of metal material having a predefined width configured as a portion of the frame.

In an example, (not shown), the assembly is coupled to a drive device configured to cause the torque tube to swing in the first direction and swing in the second direction. In an example, the pivot device is configured to allow the torque tube to move about an arc direction, while being fixed in other spatial domains. In an example, the pivot device comprises a pin structure configured in a sleeve or bearing assembly that is coupled to the frame structure.

FIG. 55 is a front view diagram of a clamp assembly 5400 in a stop position according to an example of the present invention. As shown, the frame 5420 having a first stop region 5471 within a first inner region of the frame 5420 and a second stop region 5472 within a second inner region of the frame 5420 and configured to allow the torque tube 5440 to swing in a first direction within the opening and stop against the first stop region 5471 and swing in a second direction within the opening and stop against the second stop region 5472; and further comprising a drive device configured to cause the torque tube 5440 to swing in the first direction and swing in the second direction.

FIGS. 55A, 55B, 55C, 55D, and 55E illustrates various views of the clamp assembly including a perspective view in a central position, a perspective view in a first stop position, a perspective view in a second stop position, a side-view, and a top view in examples of the present invention. As shown, the pivot device 5450 comprises a pin structure 5460 configured in a sleeve or bearing assembly. In an example, the pivot device 5450 comprising a first U-bolt clamp and a second U-bolt clamp coupling a first portion of the torque tube 5440 and a second portion of the torque tube 5440, respectively. In an example, the pin structure 5460 is coupling the first U-bolt clamp and the second U-bolt clamp through a pair of openings, and is configured normal to a major plane of each U-bolt clamp. In an example, the pin, which is between each of the U-bolts, is configured to the sleeve or bearing assembly, which is coupled to a portion of the frame structure, to allow the torque tube 5440 to pivot about the pin structure 5460 while the first U-bolt clamp and the second U-bolt clamp firmly engage with the first portion of the torque tube 5440 and the second portion of the torque tube 5440. As shown, the pin structure 5460 is fixed to the U-bolt claims using the pair of openings, and a key placed on each side of the pine structure to prevent the pin structure 5460 to slide either direction outside of the U-bolt clamp. As also shown, the bearing or sleeve assembly is bolted or fixed to the frame structure.

Figure 56:
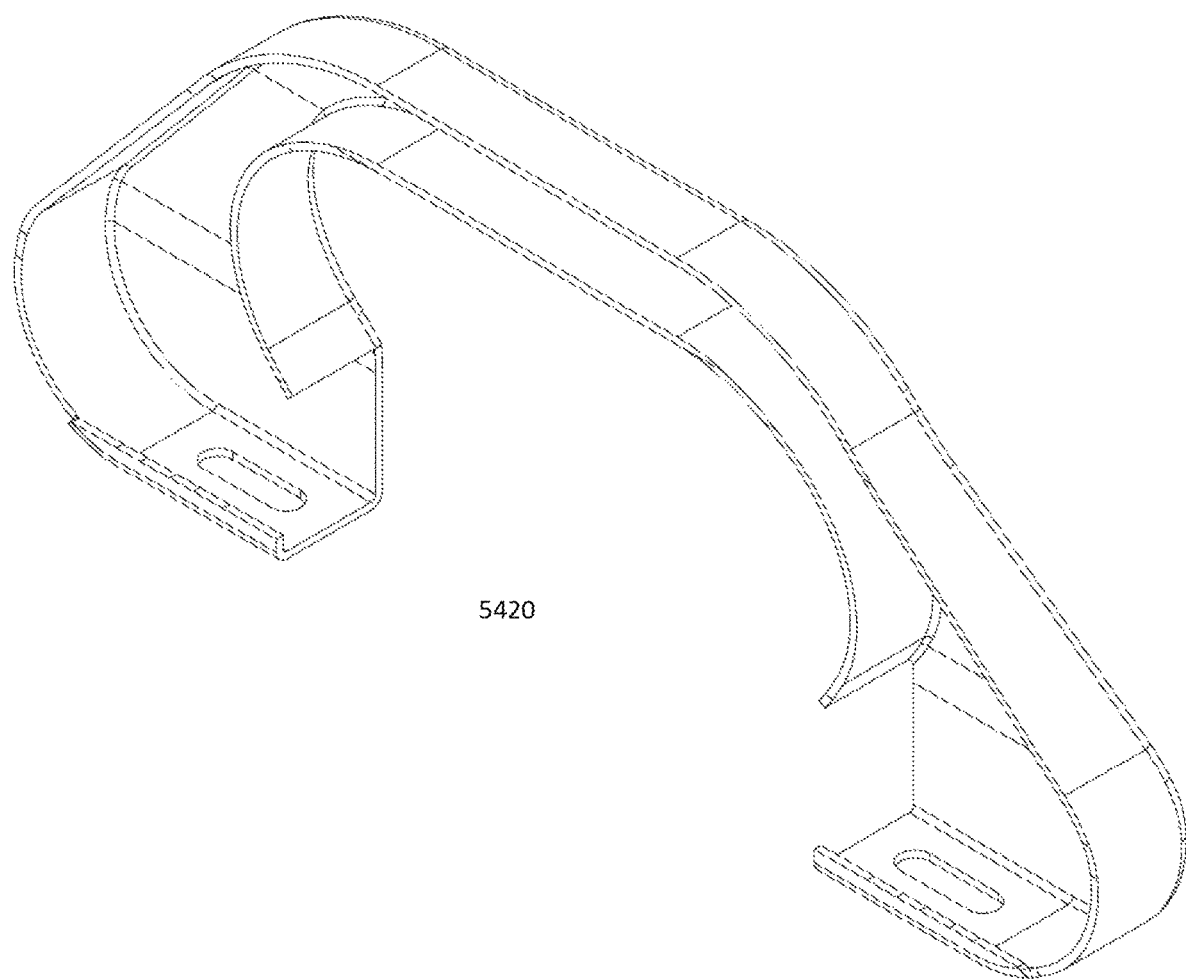
FIG. 56 is a perspective view of a frame structure to be configured for the clamp assembly according to an example of the present invention.

FIG. 56 is a perspective view of a frame structure to be configured for the clamp assembly 5400 according to an example of the present invention. As shown, the frame structure is configured as the loop with an open region. As shown, the open region is symmetric in shape. Two anchor regions, including flats each of which is fitted with a slot to allow the frame structure to be moved either way for adjustment purposes.

FIG. 57 illustrates a top view diagram, a front view diagram, and a side view diagram of the frame structure to be configured for the clamp assembly according to an example of the present invention. As shown, the top view (as shown on the upper portion of the drawings) illustrates a member with constant width, while there can be variations. The front view shows the open region configured within the loop structure or frame 5420, and anchor regions, which have flats. The side view is also shown (along right hand side of drawings). Further details of the present structures can be found throughout the present specification and more particularly below.

Figure 58:
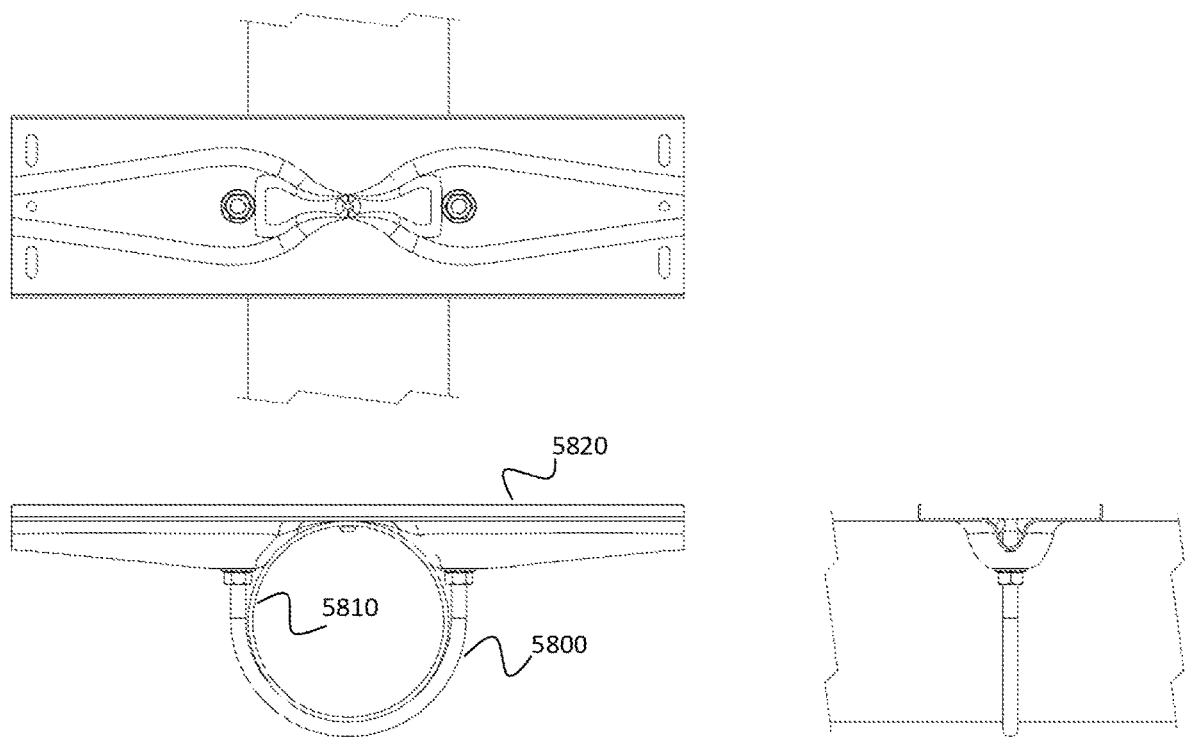
FIG. 58 illustrates a top view diagram, a front-view diagram, and a side view diagram of a U-bolt configured on a torque tube for a solar panel bracket according to an example of the present invention.

FIG. 58 illustrates a top view diagram, a front-view diagram, and a side view diagram of a U-bolt 5800 configured on a torque tube 5810 for a solar panel bracket (or frame structure) according to an example of the present invention. As shown, the top view (top portion of drawings) shows a clamp support 5820 with saddle region configured to the outer portion (not shown) of a portion of the torque tube 5810. As shown, the saddle region is coupled intimately with the portion of the torque tube 5810. A flat region including a pair of openings on each end serve as a bracket for attachment of a solar panel or panels in an example. As shown in the bottom left hand side, the front view has a clamping U-bolt coupling a portion of the torque tube 5810 and is configured to the clamp support 5820. As shown on the right hand side, the side view shows a leg or bolt of a U-bolt 5800 configured on one side of the torque tube 5810 and coupled to the clamp support 5820. The other side has a similar configuration, including leg or bolt of the U-bolt 5800 and torque tube 5810.

Figure 59:
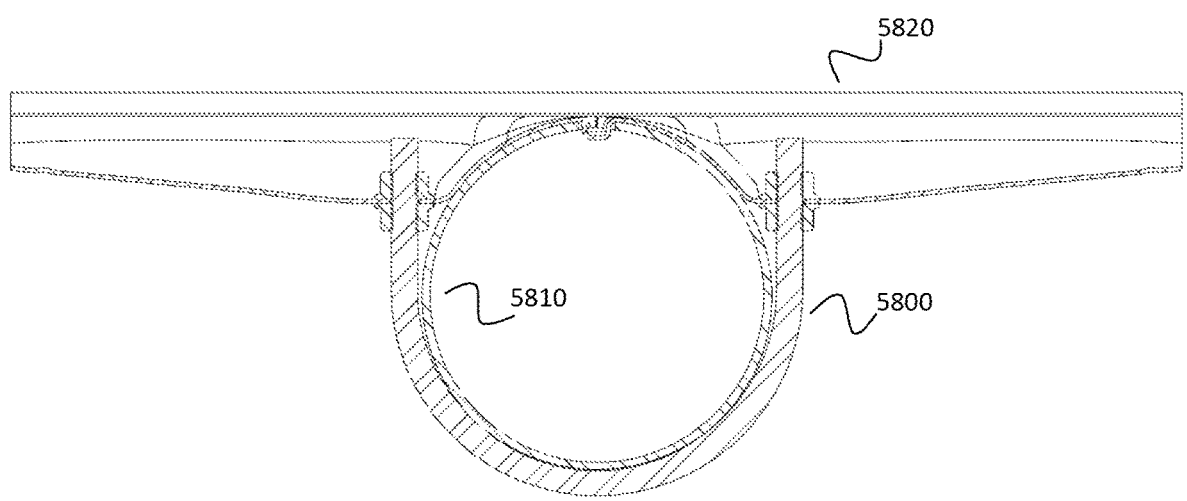
FIG. 59 illustrates a front view diagram of the U-bolt configured to a torque tube for a solar panel bracket according to an example of the present invention.

FIG. 59 illustrates a front view diagram of the U-bolt 5800 configured to a torque tube 5810 for a solar panel bracket according to an example of the present invention. In an example, the clamp support member comprising a first end and a second end and has a length in between the first end and the second end. A width is also included. In an example, the clamp support member being configured a saddle region having a first opening and a second opening and a inner opening such that a first leg of a U-bolt 5800 is inserted into the first opening and a second leg of the U-bolt 5800 is inserted into the second opening while a clamp member 5830 is positioned to hold the U-bolt 5800 in place to secure a portion of the torque tube 5810 to an opposite side of the saddle region while the clamp member 5830 is in intimate contact with the inner opening using a male portion provided within the inner opening to fit the male portion within the inner opening.

Figure 60:
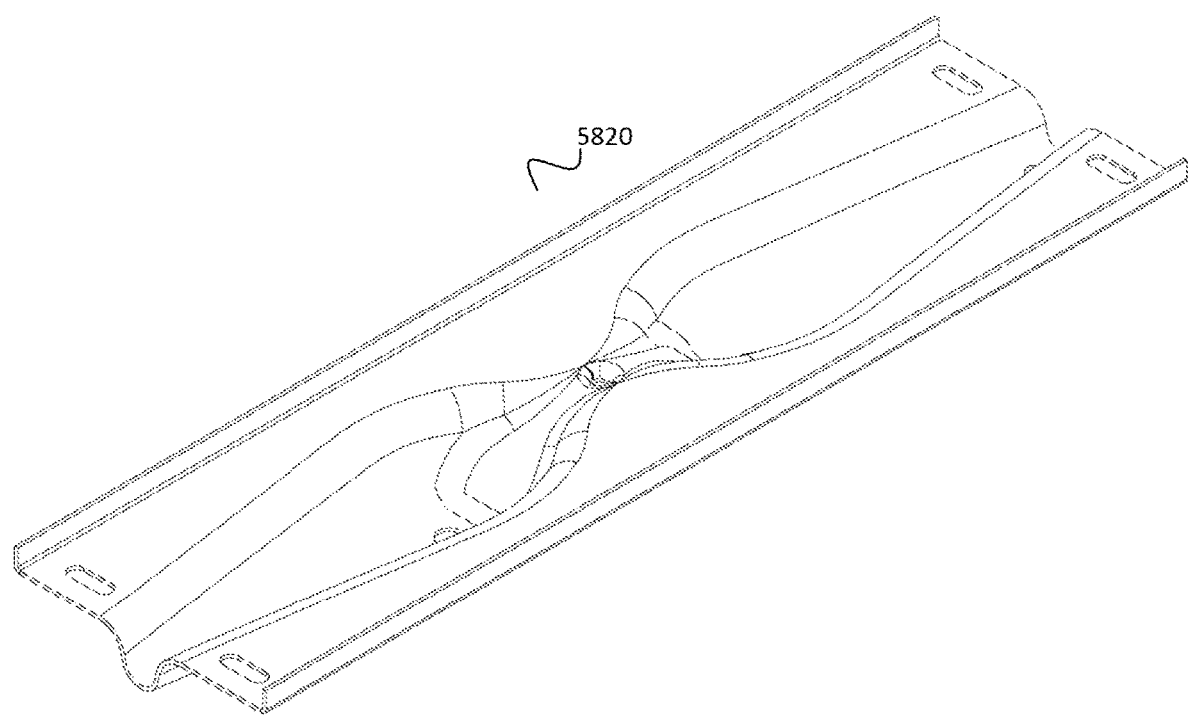
FIG. 60 illustrate a perspective view of a support member for the U-bolt configured to a torque tube for a solar panel bracket according to an example of the present invention.

FIG. 60 illustrate a perspective view of a support member for the U-bolt 5800 configured to a torque tube 5810 for a solar panel bracket according to an example of the present invention. In an example as shown, the support member the first end and the second end and has the length in between the first end and the second end. The width is also included. In an example, the clamp support member 5820 has a saddle region having a first opening and a second opening and a inner opening such that a first leg of a U-bolt 5800 is inserted into the first opening and a second leg of the U-bolt 5800 is inserted into the second opening while a clamp member 5830 is positioned to hold the U-bolt 5800 in place to secure a portion of the torque tube 5810 to an opposite side of the saddle region while the clamp member 5830 is in intimate contact with the inner opening using a male portion provided within the inner opening to fit the male portion within the inner opening.

Figure 61:
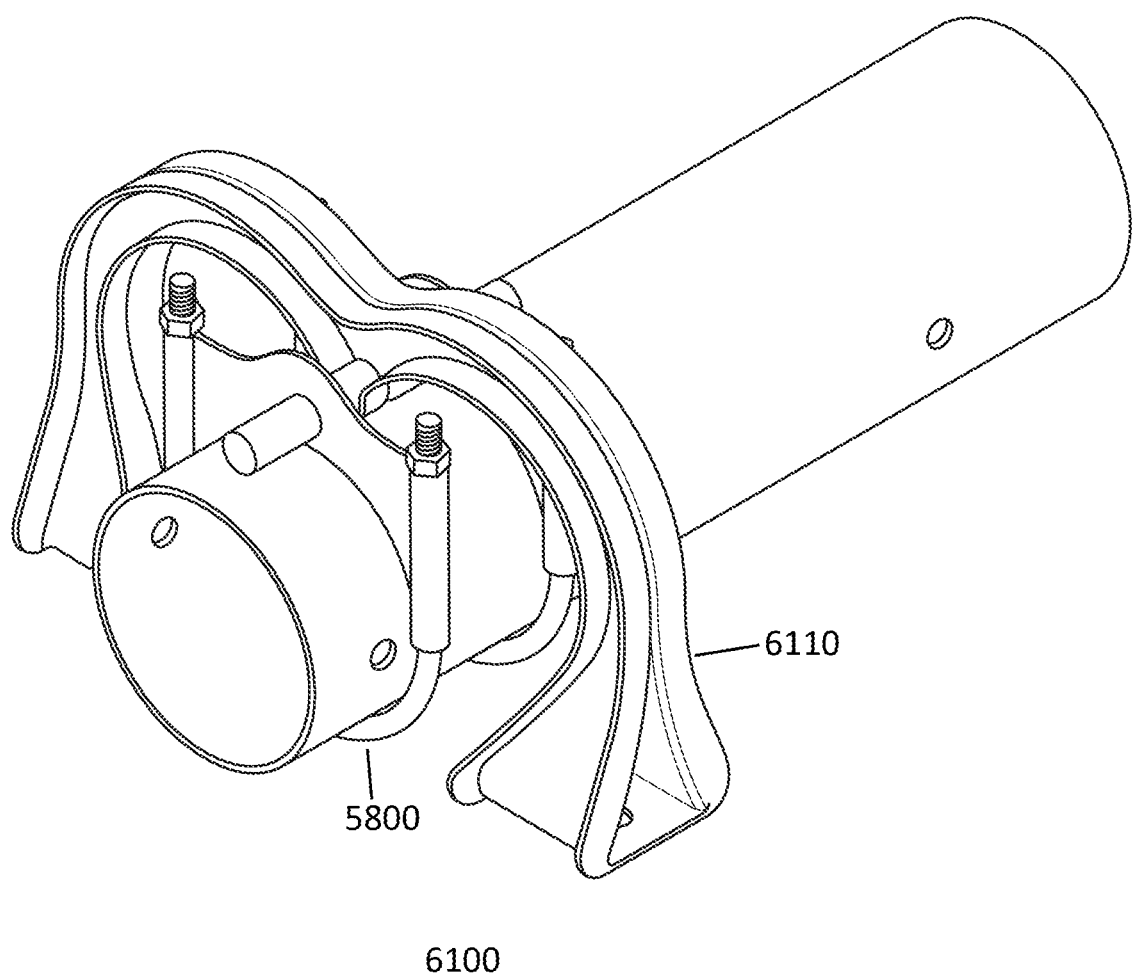
FIG. 61 is a perspective view of a claim assembly according to an example of the present invention.

FIG. 61 is a perspective view of a clamp assembly 6100 according to an example of the present invention. As shown is a perspective view of a solar tracker apparatus, and in particular a clamp assembly 6100 configured for a torque tube. In an example, the clamp assembly 6100 has a support structure configured as a frame 6110 having configured by a first anchoring region and a second anchoring region. The frame 6110 also has a butterfly shape or heart shape configured with a pair of lobes configured about a recessed region, which is for supporting a pin structure. As shown, the first anchoring region is coupled to a pier support using a nut and bolt fastener. The second anchoring region is coupled to a pier support using a nut and bolt fastener. In an example, the frame structure 6110 is shaped as a pair of loops that are symmetric and can also be non-symmetric in other examples. As shown, the support structure being configured from a thickness of metal material, such as high grade steel or other metal material with sufficient strength. In an example, the support structure is stamped from the thickness of metal material. In an example, the support structure is configured from a stamped steel comprising a Q345 steel or other suitable material. In an example, the support structure being configured in an upright manner, and has a major plane region configured within the frame structure 6110. As shown, the major plane region has an opening to allow the torque tube and related support members to move within the opening.

In an example, the torque tube is coupled to a pivot device configured on the support structure, and in particular the recessed region. In an example, the torque tube suspending on the pivot device and aligned within the opening of the support and configured to be normal to the plane region. In an example, the torque tube is configured on the pivot device to move about an arc in a first direction or in a second direction such that the first direction is in a direction opposite to the second direction. As mentioned, the support structure comprises the frame configured with the opening. As shown, the frame has a first stop region within a first inner region of the frame and a second stop region within a second inner region of the frame and configured to allow the torque tube to swing in a first direction within the opening and stop against the first stop region and swing in a second direction within the opening and stop against the second stop region. In an example, the first stop region comprises a first flat region and the second stop region comprises a second flat region such that the first flat region and the second flat region are coupled to each other via a continuous length of metal material having a predefined width configured as a portion of the frame.

In an example, (not shown), the assembly is coupled to a drive device configured to cause the torque tube to swing in the first direction and swing in the second direction. In an example, the pivot device is configured to allow the torque tube to move about an arc direction, while being fixed in other spatial domains. In an example, the pivot device comprises a pin structure configured in a sleeve or bearing assembly that is coupled to the frame structure.

Figure 62:
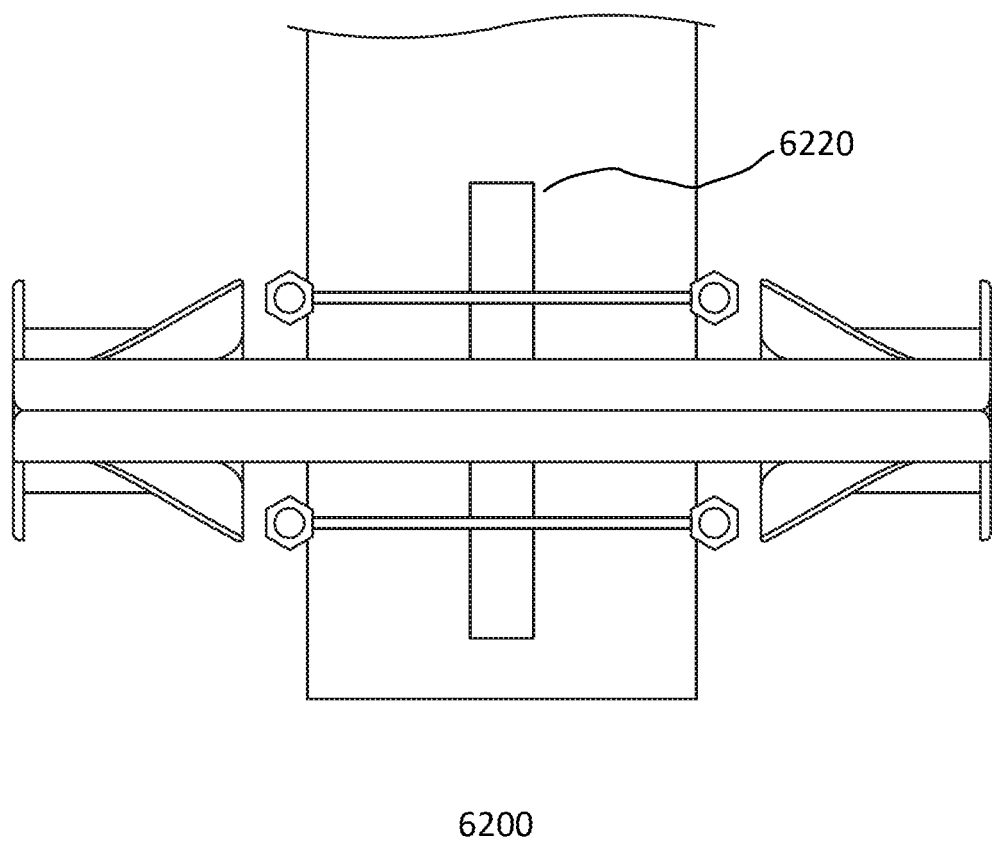
FIG. 62 is a top view diagram of a clamp assembly according to an example of the present invention.

FIG. 62 is a top view diagram of a clamp assembly 6200 according to an example of the present invention. As shown, the pivot device comprises a pin structure 6220 configured in a sleeve or bearing assembly, which is fixed on the recessed region (not shown). In an example, the pivot device comprising a first U-bolt clamp and a second U-bolt clamp coupling a first portion of the torque tube and a second portion of the torque tube, respectively. In an example, the pin structure 6220 is coupling the first U-bolt clamp and the second U-bolt clamp through a pair of openings, and is configured normal to a major plane of each U-bolt clamp. In an example, the pin 6221, which is between each of the U-bolts, is configured to the sleeve or bearing assembly, which is coupled to a portion of the frame structure 6210, to allow the torque tube to pivot about the pin structure 6220 while the first U-bolt clamp and the second U-bolt clamp firmly engage with the first portion of the torque tube and the second portion of the torque tube. As shown, the pin structure 6220 is fixed to the U-bolt claims using the pair of openings, and a key placed on each side of the -pin structure to prevent the pin structure 6220 to slide either direction outside of the U-bolt clamp. As also shown, the bearing or sleeve assembly is bolted or fixed to the frame structure 6210. A pair of spacers can be configured on each side of the recessed regions to maintain the spacing of the pair of U-bolt clamps.

Figure 63:
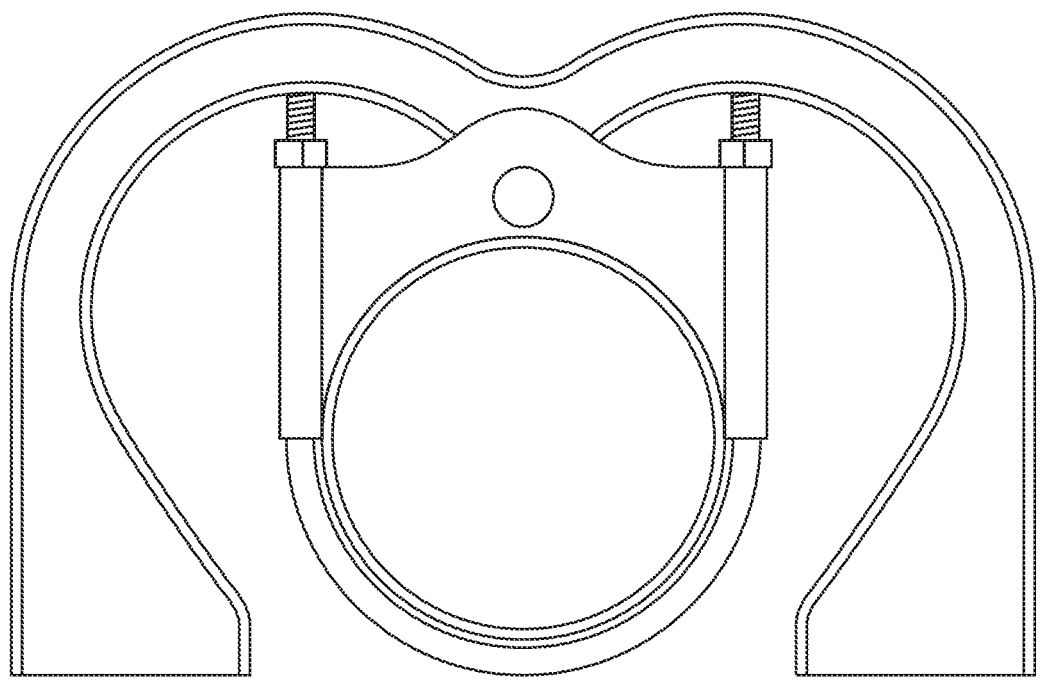
FIG. 63 is a front view diagram of a clamp assembly according to an example of the present invention.
Figure 64:
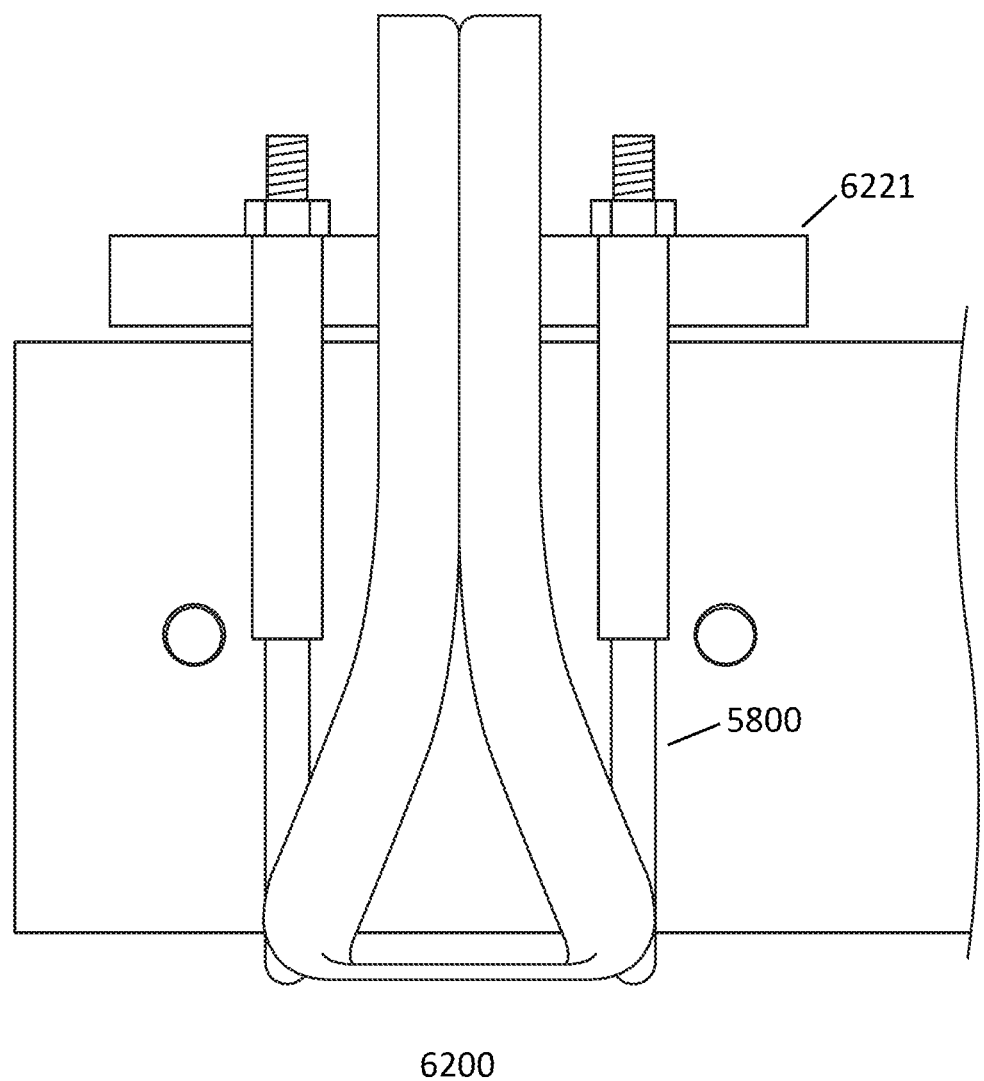
FIG. 64 is a side view diagram of a clamp assembly according to an example of the present invention.

FIG. 63 is a front view diagram of a clamp assembly 6200 according to an example of the present invention. FIG. 64 is a side view diagram of a clamp assembly 6200 according to an example of the present invention.

Figure 65:
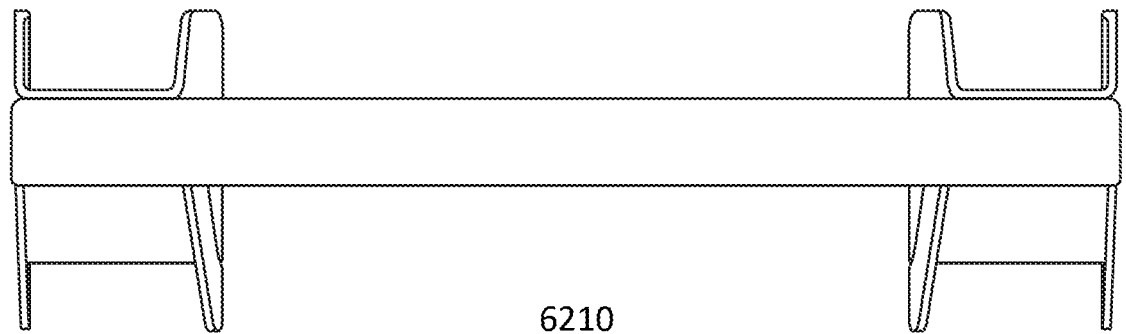
FIG. 65 illustrates a top view diagram of a frame structure to be configured for the clamp assembly according to an example of the present invention.
Figure 66:
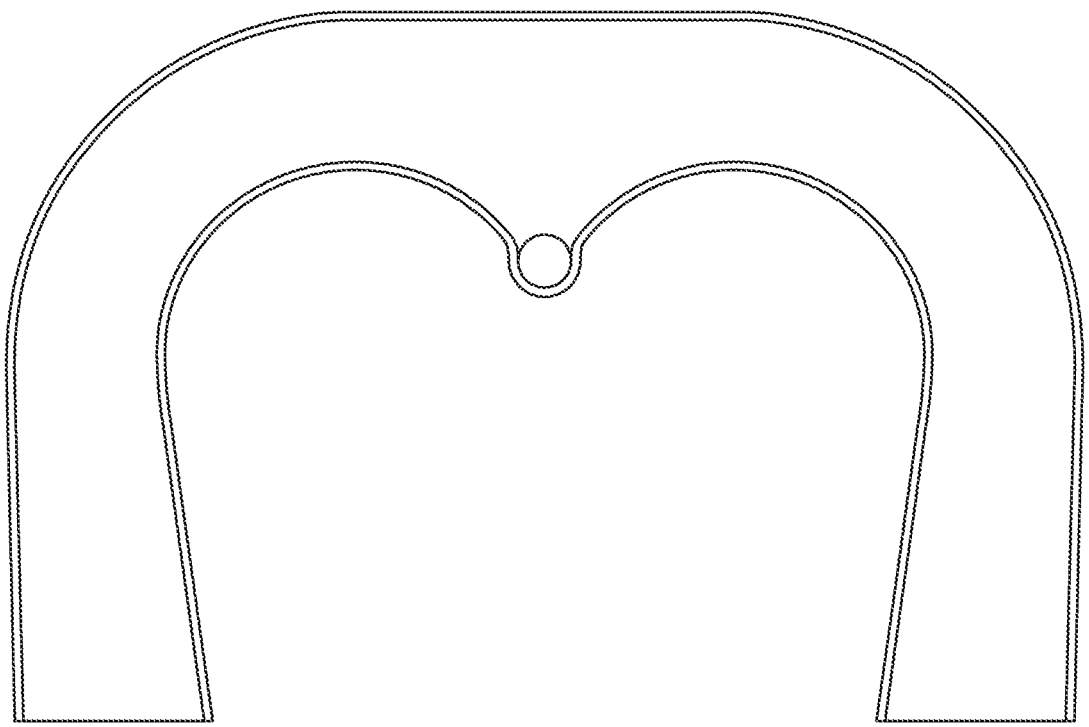
FIG. 66 illustrates a front view diagram of a frame structure to be configured for the clamp assembly according to an example of the present invention.
Figure 67:
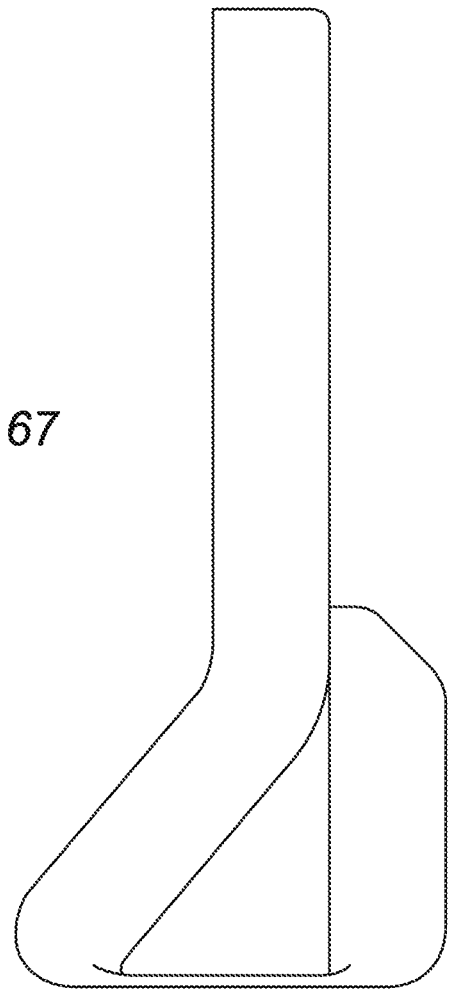
FIG. 67 illustrates a side view diagram of a frame structure to be configured for the clamp assembly according to an example of the present invention.
Figure 68:
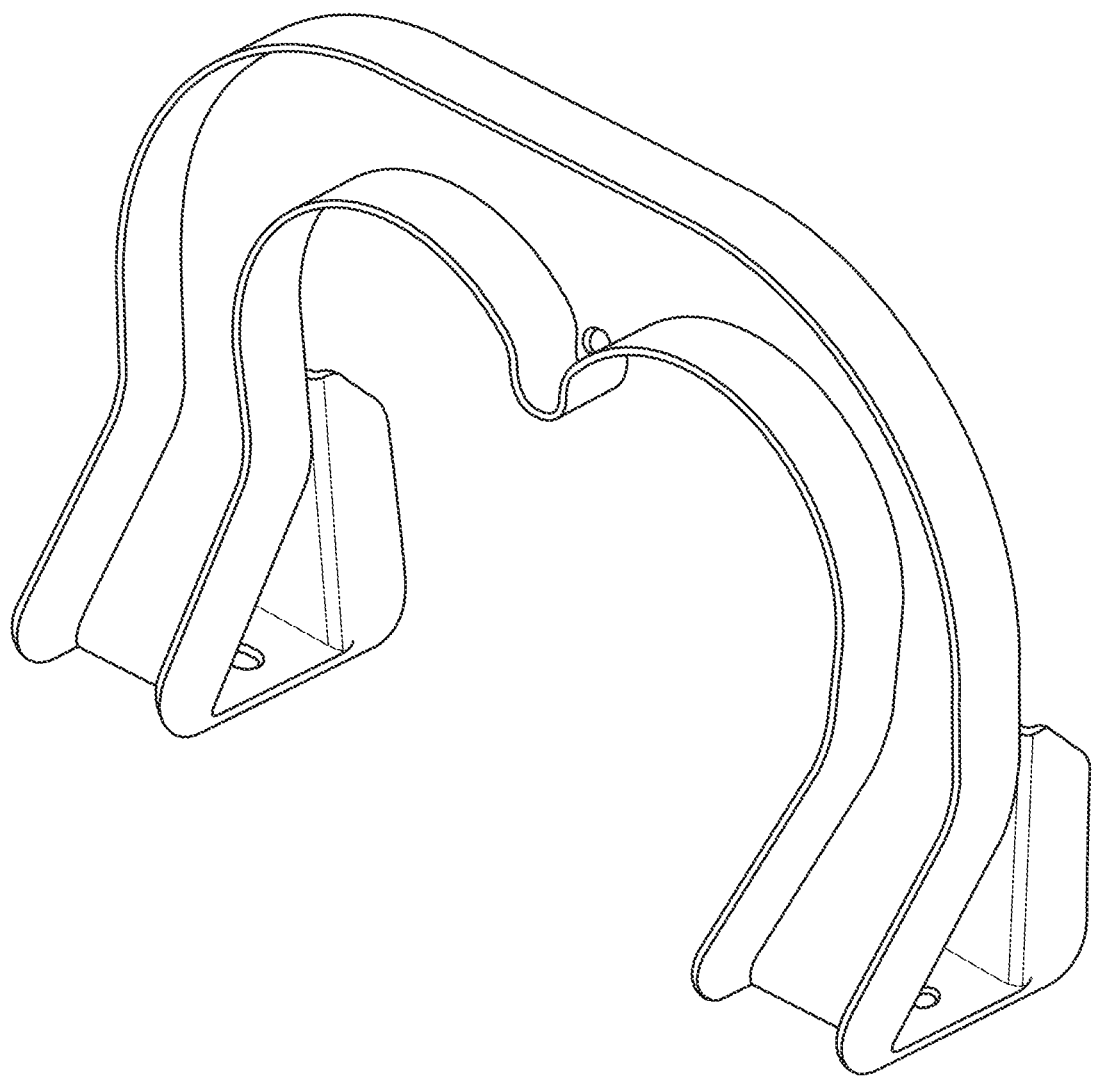
FIG. 68 is a perspective view of a frame structure to be configured for the clamp assembly according to an example of the present invention.

FIG. 65 illustrates a top view diagram of a frame structure 6210 to be configured for the clamp assembly 6200 according to an example of the present invention. FIG. 66 illustrates a front view diagram of a frame structure 6210 to be configured for the clamp assembly 6200 according to an example of the present invention. FIG. 67 illustrates a side view diagram of a frame structure 6210 to be configured for the clamp assembly 6200 according to an example of the present invention. FIG. 68 is a perspective view of a frame structure 6210 to be configured for the clamp assembly 6200 according to an example of the present invention.

Figure 69:
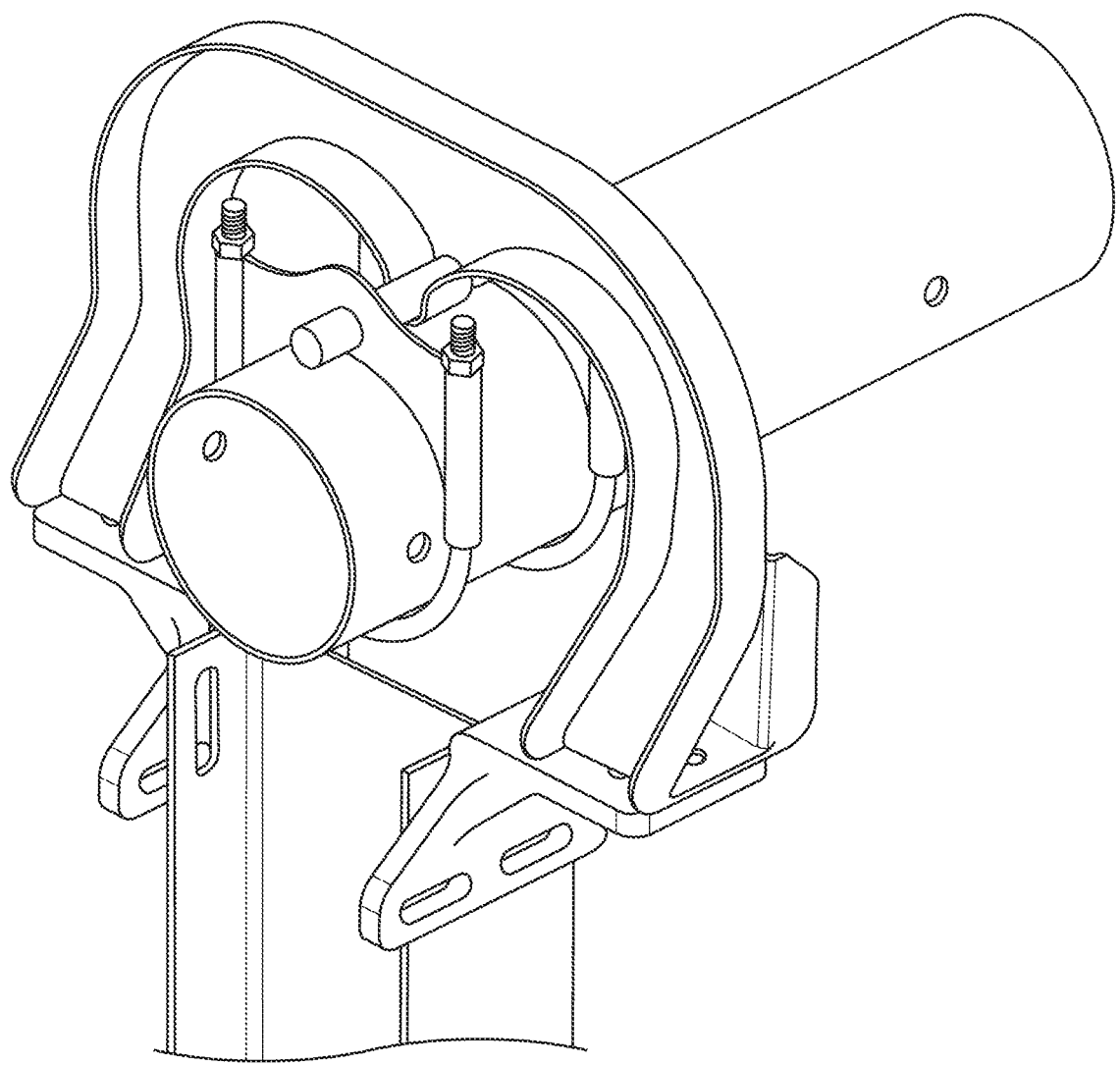
FIG. 69 is a perspective view of a claim assembly on a pier structure according to an example of the present invention.
Figure 70:
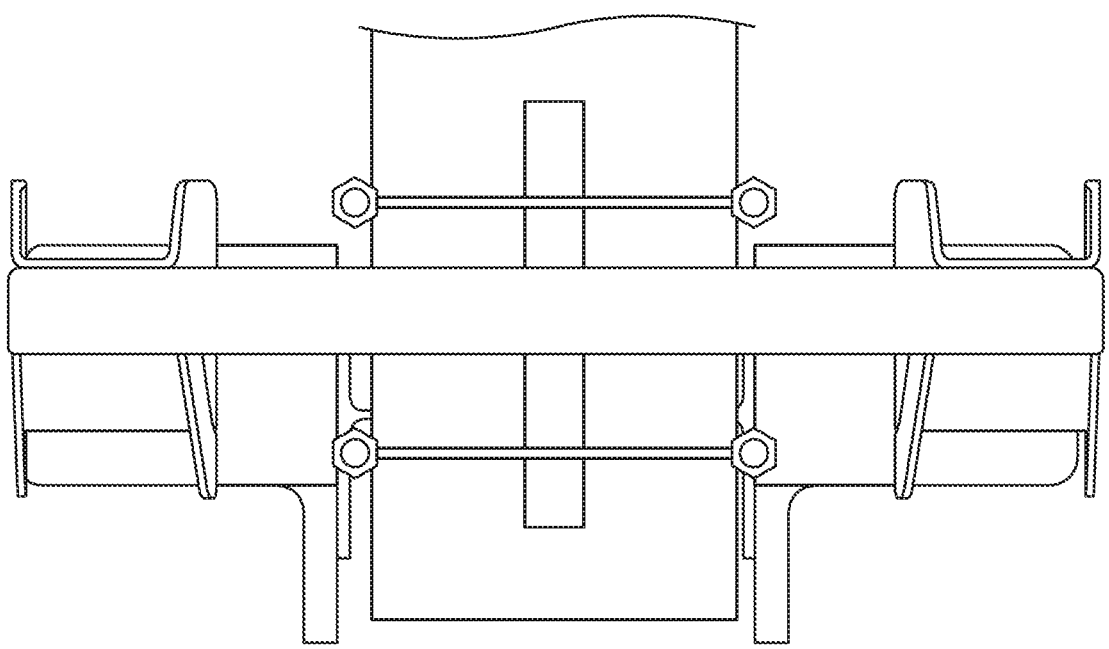
FIG. 70 is a top view diagram of a clamp assembly on a pier structure according to an example of the present invention.
Figure 71:
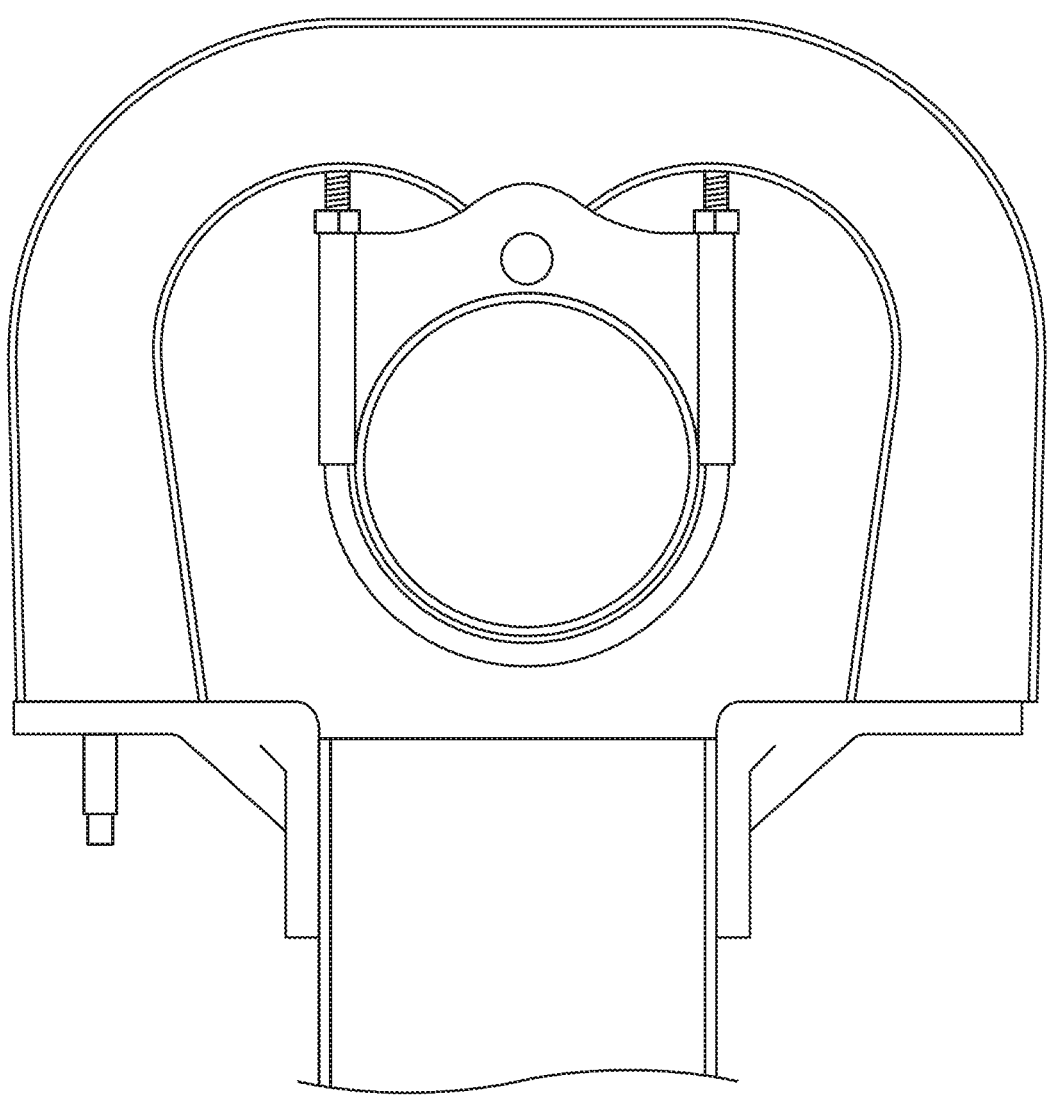
FIG. 71 is a front view diagram of a clamp assembly on a pier structure according to an example of the present invention.
Figure 72:
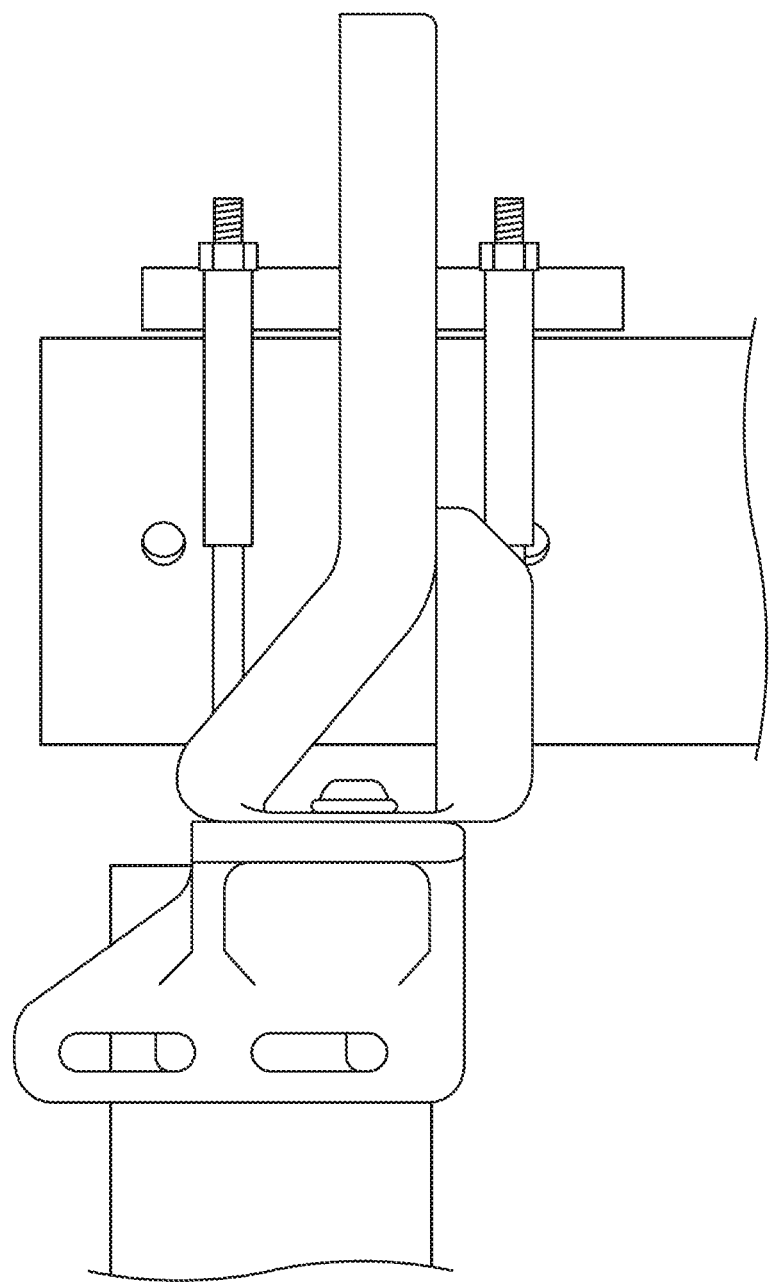
FIG. 72 is a side view diagram of a clamp assembly on a pier structure according to an example of the present invention.

FIG. 69 is a perspective view of a claim assembly 6900 on a pier structure according to an example of the present invention. FIG. 70 is a top view diagram of a clamp assembly 7000 on a pier structure according to an example of the present invention. FIG. 71 is a front view diagram of a clamp assembly 7100 on a pier structure according to an example of the present invention. FIG. 72 is a side view diagram of a clamp assembly 7200 on a pier structure according to an example of the present invention. As shown, the clamp assembly can be moved about in various directions using slotted openings on each of the anchor structures or support members. Of course, there can be other variations, modifications, and alternatives.

In an example, the present parts and elements can be made of suitable material, such as steel, aluminum, or other alloys. Additionally, such steel and/or alloys and/or aluminum can be cast, stamped, or welded, or combinations thereof. Of course, there can be other variations, modifications, and alternatives. In an example, the drive motor is operable to move the torque tube about a center of rotation and is substantially free from a load. In an example, the drive motor moves the torque tube about the center of rotation at substantially a same force from a first radial position to a second radial position.

As used herein, the terms "first" "second" "third" or "n" are used in a manner that should be broadly interpreted, and do not necessarily imply order. In an example, the terms can also be used to imply order, or can be used to imply a similar or same step and/or element. Of course, there can be other variations, modifications, and alternatives.

In example of a technique that can be employed to shape the various elements described is a hydro-forming process, which was originally derived back in Sep. 8, 1959 under U.S. Pat. No. 2,902,962, which is hereby incorporated by reference (the '962 patent), including any and all other patents that have cited the subject '962 patent, titled MACHINES FOR SHAPING HOLLOW TUBULAR OBJECTS filed Jan. 7, 1955, by M. M. GARVIN. The '962 patent relates to a machine for shaping a hollow metal tubular blank in a mold or die, the blank being bulged to the contour of the cavity of the mold by supplying increasing volumes of liquid under pressure to the interior of the blank or work piece and supplying metal into the portion of the blank within the cavity of the mold from an un-deformed portion of the blank to maintain wall thickness in the bulged portion of the blank. Of course, there can be other variations, modifications, and alternatives.

It is understood that the examples and embodiments described herein are for illustrative purposes only and that various modifications or changes in light thereof will be suggested to persons skilled in the art and are to be included within the spirit and purview of this application and scope of the appended claims.

I claim:

1. A solar tracker apparatus, the apparatus comprising:
   a support structure configured as a frame having configured by a first anchoring region and a second anchoring region, the support structure being configured from a thickness of metal material, the support structure being configured in an upright manner, and having a major plane region;
   a pivot device configured on the support structure;
   a torque tube configured to be suspended on the pivot device and aligned within an opening of the support and configured to be normal to the plane region, the torque tube being configured on the pivot device to move about an arc in a first direction or in a second direction such that the first direction is in a direction opposite to the second direction, and
   a clamping U-bolt configured to couple a portion of the torque tube to the pivot device.

2. The apparatus of claim 1 wherein the support structure is stamped from the thickness of metal material.

3. The apparatus of claim 1 wherein the pivot device is configured to allow the torque tube to move about an arc direction, while being fixed in other spatial domains.

4. The apparatus of claim 1 wherein the pivot device comprises a pin structure configured in a sleeve or bearing assembly; the pivot device comprising a first U-bolt clamp and a second U-bolt claim configured to couple a first portion of the torque tube and a second portion of the torque tube, respectively, such that the pin structure couples to the first U-bolt clamp and the second U-bolt clamp and is configured to the sleeve or bearing assembly to allow the torque tube to pivot about the pin structure while the first U-bolt clamp and the second U-bolt clamp firmly engage with the first portion of the torque tube and the second portion of the torque tube.

5. The apparatus of claim 1 wherein the support structure is configured from a stamped steel comprising a Q345 steel.

6. The apparatus of claim 1 further comprising a pier device configured to support the support structure by the first anchoring region and the second anchoring region.

7. The apparatus of claim 1 wherein the support structure comprises the frame configured with an opening, the frame having a first stop region within a first inner region of the frame and a second stop region within a second inner region of the frame and configured to allow the torque tube to swing in a first direction within the opening and stop against the first stop region and swing in a second direction within the opening and stop against the second stop region; and further comprising a drive device configured to cause the torque tube to swing in the first direction and swing in the second direction, the first stop region comprises a first flat region and the second stop region comprises a second flat region such that the first flat region and the second flat region are coupled to each other via a continuous length of metal material having a predefined width configured as a portion of the frame.

8. The apparatus of claim 1 further comprising a clamp support member configured to a portion of the torque tube for attachment of a solar panel, the clamp support member comprising a first end and a second end, the clamp support member comprising a length in between the first end and the second end, the clamp support member comprises a width, the clamp support member being configured a saddle region having a first opening and a second opening and a inner opening such that a first leg of a U-bolt is inserted into the first opening and a second leg of the U-bolt is inserted into the second opening while a clamp member is positioned to hold the U-bolt in place to secure a portion of the torque tube to an opposite side of the saddle region while the clamp member is in intimate contact with the inner opening using a male portion provided within the inner opening to fit the male portion within the inner opening; the saddle region comprising a bottom region for coupling to the portion of the torque tube.

9. The apparatus of claim 1 further comprising a clamp support member configured to a portion of a torque tube for supporting a solar panel, the clamp support member comprising a first end and a second end, the clamp support member comprising a length in between the first end and the second end, the clamp support member comprises a width, the clamp support member being configured a saddle region having a first opening and a second opening and a inner opening such that a first leg of a U-bolt is inserted into the first opening and a second leg of the U-bolt is inserted into the second opening while a clamp member is positioned to hold the U-bolt in place to secure a portion of the torque tube to an opposite side of the saddle region while the clamp member is in intimate contact with the inner opening using a male portion provided within the inner opening to fit the male portion within the inner opening; wherein the support structure comprises the frame configured with an opening, the frame having a first stop region within a first inner region of the frame and a second stop region within a second inner region of the frame and configured to allow the torque tube to swing in a first direction within the opening and stop against the first stop region and swing in a second direction within the opening and stop against the second stop region; and further comprising a drive device configured to cause the torque tube to swing in the first direction and swing in the second direction.

10. A solar tracker apparatus, the apparatus comprising:
a support structure configured as a frame having configured by a first anchoring region and a second anchoring region, the support structure being configured from a thickness of metal material, the support structure being configured in an upright manner, and having a major plane region;
a pivot device including a pin structure configured in a sleeve or bearing assembly and configured on the support structure, wherein the pivot device is configured to allow the torque tube to move about an arc direction, while being fixed in other spatial domains; and a torque tube configured to be suspended from the pivot device and aligned within an opening of the support and configured to be normal to the plane region, the torque tube being configured on the pivot device to move about an arc in a first direction or in a second direction such that the first direction is in a direction opposite to the second direction; wherein the support structure comprises the frame configured with an opening, the frame having a first stop region within a first inner region of the frame and a second stop region within a second inner region of the frame and configured to allow the torque tube to swing in a first direction within the opening and stop against the first stop region and swing in a second direction within the opening and stop against the second stop region; and further comprising a drive device configured to cause the torque tube to swing in the first direction and swing in the second direction.

11. The apparatus of claim 10 wherein the support structure is stamped from the thickness of metal material.

12. The apparatus of claim 10 further comprising a clamping U-bolt coupling a portion of the torque tube to the pivot device; wherein the support structure is configured from a stamped steel comprising a Q345 steel.

13. The apparatus of claim 10 further comprising a pier device configured to support the support structure by the first anchoring region and the second anchoring region; and further comprising a clamp support member configured to a portion of the torque tube, the clamp support member comprising a first end and a second end, the clamp support member comprising a length in between the first end and the second end, the clamp support member comprises a width, the clamp support member being configured a saddle region having a first opening and a second opening and a inner opening such that a first leg of a U-bolt is inserted into the first opening and a second leg of the U-bolt is inserted into the second opening while a clamp member is positioned to hold the U-bolt in place to secure the portion of the torque tube to an opposite side of the saddle region while the clamp member is in intimate contact with the inner opening using a male portion provided within the inner opening to fit the male portion within the inner opening.

14. The apparatus of claim 10 further comprising a clamp support member configured to a portion of the torque tube, the clamp support member comprising a first end and a second end, the clamp support member comprising a length in between the first end and the second end, the clamp support member comprises a width, the clamp support member being configured a saddle region having a first opening and a second opening and a inner opening such that a first leg of a U-bolt is inserted into the first opening and a second leg of the U-bolt is inserted into the second opening while a clamp member is positioned to hold the U-bolt in place to secure the portion of the torque tube to an opposite side of the saddle region while the clamp member is in intimate contact with the inner opening using a male portion provided within the inner opening to fit the male portion within the inner opening; wherein the support structure comprises the frame configured with an opening, the frame having a first stop region within a first inner region of the frame and a second stop region within a second inner region of the frame and configured to allow the torque tube to swing in a first direction within the opening and stop against the first stop region and swing in a second direction within the opening and stop against the second stop region; and further comprising a drive device configured to cause the torque tube to swing in the first direction and swing in the second direction.

* * * * *